(12) United States Patent
Sayre et al.

(10) Patent No.: US 9,279,214 B2
(45) Date of Patent: Mar. 8, 2016

(54) PBO FIBERS WITH IMPROVED MECHANICAL PROPERTIES WHEN EXPOSED TO HIGH TEMPERATURES AND HIGH RELATIVE HUMIDITY

(71) Applicant: Battelle Memorial Institute, Columbus, OH (US)

(72) Inventors: Jay R Sayre, New Albany, OH (US); Vince McGinniss, Columbus, OH (US); C Byron Tolbert, Orient, OH (US); Kelly J Jenkins, Hilliard, OH (US); Jeffrey L Ellis, Gahanna, OH (US); Tim B Hutson, Columbus, OH (US); Sundee Angel, Kingston, OH (US); Rachel Thurston, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 14/391,984

(22) PCT Filed: Apr. 11, 2013

(86) PCT No.: PCT/US2013/036141
§ 371 (c)(1),
(2) Date: Oct. 10, 2014

(87) PCT Pub. No.: WO2014/011278
PCT Pub. Date: Jan. 16, 2014

(65) Prior Publication Data
US 2015/0067940 A1     Mar. 12, 2015

Related U.S. Application Data

(60) Provisional application No. 61/622,638, filed on Apr. 11, 2012.

(51) Int. Cl.
| | | |
|---|---|---|
| *D06M 13/513* | (2006.01) |
| *D06M 23/10* | (2006.01) |
| *B29C 35/02* | (2006.01) |
| *C08K 5/5435* | (2006.01) |
| *F41H 1/02* | (2006.01) |
| *B29K 83/00* | (2006.01) |
| *B29L 31/00* | (2006.01) |

(52) U.S. Cl.
CPC ......... *D06M 13/513* (2013.01); *B29C 35/0227* (2013.01); *C08K 5/5435* (2013.01); *D06M 23/105* (2013.01); *F41H 1/02* (2013.01); *B29K 2083/00* (2013.01); *B29L 2031/731* (2013.01)

(58) Field of Classification Search
None
See application file for complete search history.

(56) References Cited

U.S. PATENT DOCUMENTS

| | | | |
|---|---|---|---|
| 5,102,723 | A | 4/1992 | Pepin |
| 5,397,847 | A | 3/1995 | Harris et al. |

(Continued)

FOREIGN PATENT DOCUMENTS

| | | |
|---|---|---|
| CN | 101235590 | 8/2008 |
| CN | 102675825 | 9/2012 |
| WO | WO 2008/093867 | 8/2008 |

OTHER PUBLICATIONS

Sayre et al, Annual Technical Conference, Society of Plastics Engineers, 68th, pp. 1037-1041, 2010.*

*Primary Examiner* — Erma Cameron
(74) *Attorney, Agent, or Firm* — Diederiks & Whitelaw, PLC

(57) ABSTRACT

A method of treating fibers to improve resistance to high temperatures and relative humidity includes providing poly (p-phenylene-2,6-benzobisoxazole) (PBO) fibers, exposing the PBO fibers to an atmosphere of supercritical $CO_2$ saturated with an epoxy silane, i.e. 3-glycidoxypropyl methyldimethoxysilane. The PBO fibers are subjected to a first pressurizing and heating stage at a first temperature (50° C.) for a first period of time. The PBO fibers are then subjected to a second pressurizing and heating stage including increasing the temperature to a second temperature (110° C.) and holding at the second temperature for an additional period of time. The PBO fibers include 2-5 wt % of 3-glycidoxypropyl methyldimethoxysilane after diffusing the $CO_2$ out of the PBO fibers. The fibers are particularly useful in making lightweight body armor system components.

13 Claims, 36 Drawing Sheets

(56) References Cited

U.S. PATENT DOCUMENTS

| | | |
|---|---|---|
| 6,845,513 B2 | 1/2005 | Field et al. |
| 7,235,290 B2 | 6/2007 | Vallittu et al. |
| 7,238,766 B2 | 7/2007 | Keller et al. |
| 7,449,535 B2 | 11/2008 | Keller et al. |
| 2003/0060540 A1* | 3/2003 | Rowan .......................... 523/222 |
| 2005/0193459 A1 | 9/2005 | Field et al. |
| 2009/0141425 A1 | 6/2009 | Dueber et al. |
| 2009/0238964 A1 | 9/2009 | Keller et al. |
| 2009/0239070 A1 | 9/2009 | Keller et al. |
| 2010/0043630 A1* | 2/2010 | Sayre et al. .................. 89/36.02 |
| 2010/0304137 A1* | 12/2010 | McKnight et al. ............. 428/392 |

* cited by examiner

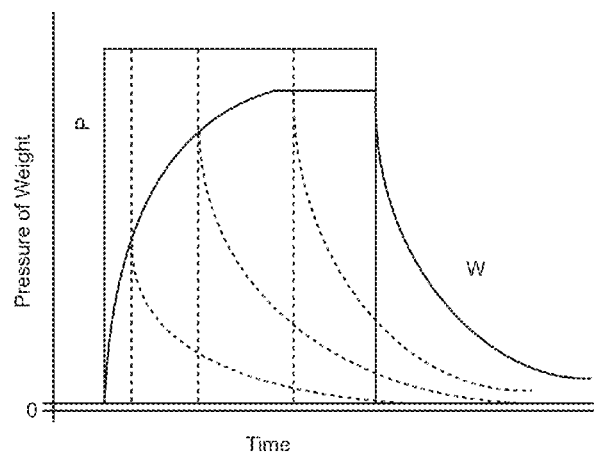
FIG. 6b
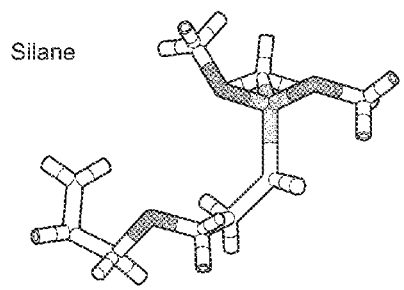
FIG. 7
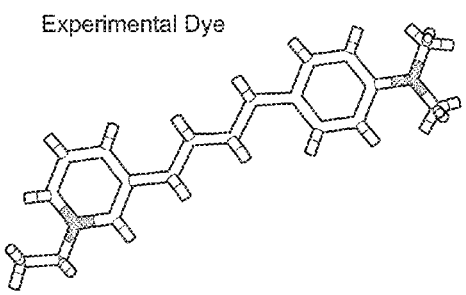 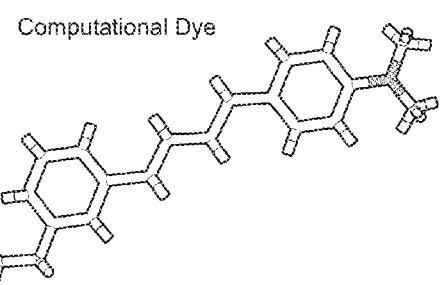
FIG. 8a          FIG. 8b

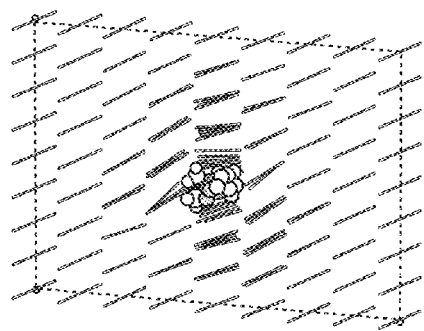 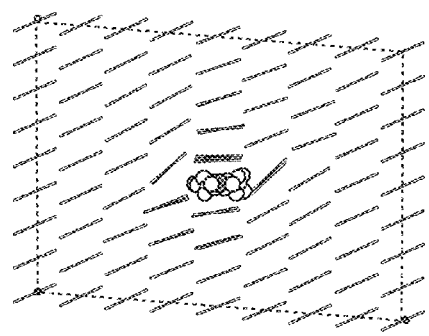
FIG. 9a  FIG. 9b
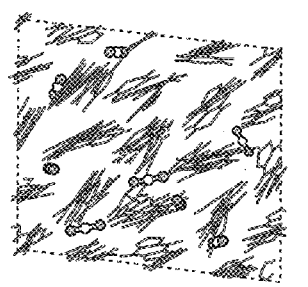 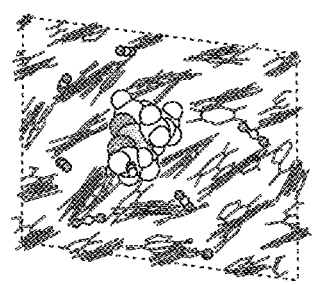 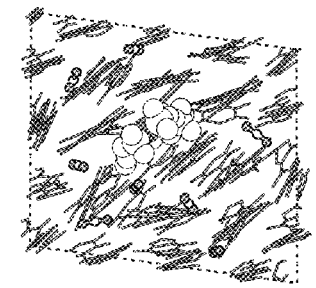
FIG. 10a  FIG. 10b  FIG. 10c

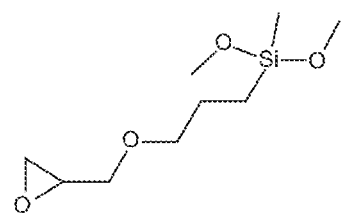
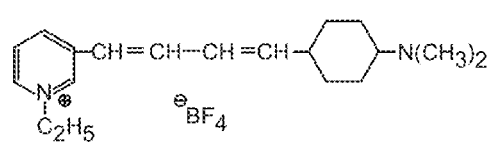
FIG. 11a  FIG. 11b
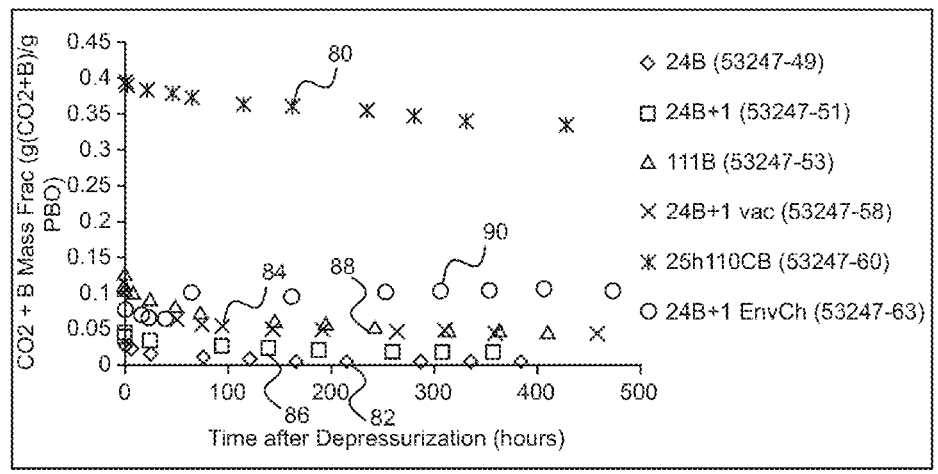
FIG. 12

PBO fiber backbone

Benzoxazole 2-phenylbenzoxazole 2,6-diphenyl[1,3]oxazolo[4,5-f][1,3]benzoxazole 2-aminophenol 4,6-diaminoresorcinol dihydrochloride

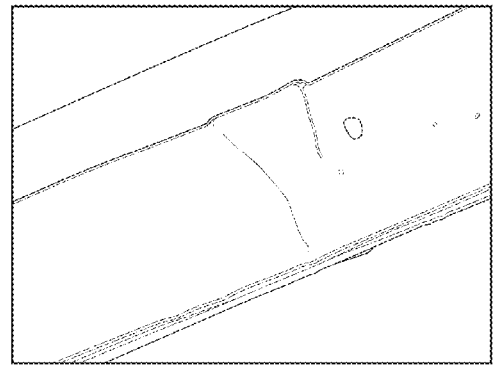
FIG. 53
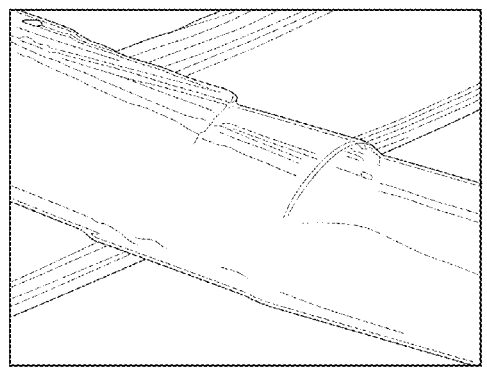 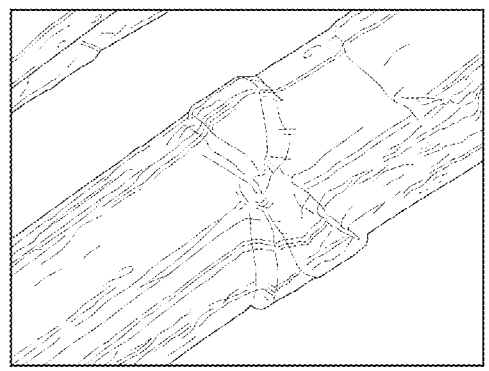
FIG. 54a                FIG. 54b

CROSSLINKED POLYMER
STRUCTURES

PBO FIBERS WITH IMPROVED MECHANICAL PROPERTIES WHEN EXPOSED TO HIGH TEMPERATURES AND HIGH RELATIVE HUMIDITY

CROSS REFERENCE TO RELATED APPLICATIONS

This application represents a National Stage application of PCT/US2013/036141 entitled "PBO Fibers with Improved Mechanical Properties when Exposed to High Temperatures and High Relative Humidity" filed Apr. 11, 2013, pending which claims the benefit of U.S. Provisional Patent Application Ser. No. 61/622,638, filed on Apr. 11, 2012, entitled "PBO Fibers with Improved Mechanical Properties when Exposed to High Temperatures and High Relative Humidity," in the name of Sayre et al., the contents of which are hereby incorporated by reference.

STATEMENT REGARDING FEDERALLY SPONSORED RESEARCH OR DEVELOPMENT

This invention was made with government support under Contract No. W911QY-08-C-0123, CLIN0008, OPP100733 awarded by the U.S. Naval Health Research Center. The government has certain rights in the invention.

BACKGROUND OF THE INVENTION

The present invention relates to a method of treating Poly (p-phenylene-2,6-benzobisoxazole) (PBO) fiber to reduce the effects of heat and moisture on the fiber.

Poly(p-phenylene-2,6-benzobisoxazole) (PBO) fiber is a high strength and high modulus fiber. However, PBO fiber degrades rapidly when exposed to moisture and heat. Methods of modifying the surface of PBO fibers have previously been developed. For example, Chinese Patent Document No. CN 101235590 discloses dipping the PBO fiber into a chemical solution and then ultrasonically treating the fiber to modify the surface of the fiber. However, there is a further need for a method of reducing the detrimental effects of moisture and heat on PBO fibers.

Elimination or reduction of the detrimental effects on PBO fiber caused by exposure to moisture and heat would provide a stable high performance fiber that may be used in lightweight armor systems. Improvements in the mechanical properties of PBO fibers through secondary chemical process modifications of base level fibers, would allow for a treated and improved PBO fiber that can be incorporated into lightweight soft armor systems and Fiber Reinforced Plastics (FRPs) for combat helmets and backings to ceramic for small arms protection.

SUMMARY OF THE INVENTION

In general, the invention is directed to a method for treating PBO fibers to improve the fibers' resistance to heat and moisture. An aspect of this invention concerns using a secondary treatment process that infuses active chemicals into the fibers to react with or remove the residual phosphoric acid in the fibers to improve the mechanical properties of PBO fibers when exposed to high temperature and high relative humidity (RH).

More specifically, PBO fibers are treated with supercritical $CO_2$ (sc$CO_2$) with additive B (3-glycidoxypropyl methyldimethoxysilane). The fibers are pressurized to 2,500 psig at 50° C. for 24 hours. The temperature is then increased to 110° C. at 2,500 psig and held for an additional hour before releasing the fibers. The treatment with sc$CO_2$ and additive B infuses active chemicals into the PBO fibers to react with or remove the residual phosphoric acid in the fibers. This leads to improved mechanical properties of PBO fibers when exposed to high temperature and high relative humidity (RH).

Aspects of the invention are based on applied research focused on proof-of-concept studies and feasibility assessments for life extending treatment of PBO fiber. PBO fiber mechanical property improvements were made through secondary chemical process modifications of base level fibers. Additional information was also gathered of the physical and morphological changes on the fibers. The treated and improved PBO fiber can be used in various environments, but particularly can be incorporated into lightweight soft armor systems and Fiber Reinforced Plastics (FRPs) for combat helmets and backings to ceramic for small arms protection.

In connection with developing the invention, fundamental knowledge of PBO fiber and its interactions with other molecules were obtained. Gravimetric measurements, fluorescence microscopy, and modeling techniques were used to determine the sorption of $CO_2$, dye, and epoxy silane into PBO fibers. Rheology measurements and infrared spectroscopy were used to determine the interactions that the epoxy silane had with model compounds and PBO fiber. Infrared spectroscopy techniques (transmission and attenuated total reflectance (ATR)) and fluorescence spectroscopy were used to analyze the degradation of fibers exposed to high temperature/high humidity or phosphoric acid. Liquid chromatography followed by mass spectroscopy was used to determine potential degradation products of PBO aged in high temperature/high humidity. A method was developed to better identify degradation products of aged PBO fiber. Scanning electron microscopy (SEM) was used to study the physical characteristic of the fibers before and after treatment and aging. Tensile testing of the fibers was used to determine the effect of the supercritical $CO_2$ (sc$CO_2$) treatment.

Gravimetric measurements of the PBO fiber after sc$CO_2$ treatment with additive B (3-glycidoxypropyl methyldimethoxysilane) were performed to optimize the fiber treatment conditions. The measurements showed the fibers can hold up to 5 wt. % of $CO_2$ at 50° C. and 2500 psig, and the $CO_2$ can take several hundred hours to diffuse out at ambient conditions. The $CO_2$ atmosphere surrounding the fibers was saturated with a dye (Pyridine 1), and it was shown by fluorescence microscopy that the dye preferentially partitioned to physically defected areas. The $CO_2$ atmosphere surrounding the fibers was saturated with additive B, and it was shown that up to 5 wt. % additive B remained sorbed in or on the fiber after the $CO_2$ had diffused out, for the same temperature, pressure and time of processing. Molecular modeling of dye and additive B in the fiber showed that the disruption of the PBO backbone was less with dye than with additive B with $CO_2$ present due to their relative sizes. Overall, the studies showed that the supercritical $CO_2$ treatment conditions were properly engineered to allow additive B to diffuse into the fiber and react as designed.

Rheological measurements and Fourier Transform Infrared Spectrometry (FTIR) spectroscopy were used to determine how additive B reacted with model compounds and PBO fiber to show that additive B had the proper chemical functionality to slow the degradation of PBO. The viscosity of additive B was shown to increase when in the presence of phosphoric acid due to a cross-linking reaction. A viscosity increase was also observed when additive B was put into contact with PBO fiber, it is hypothesized that the residual phosphoric acid in the fiber initiated the cross-linking reaction. The model compounds with amine functionality reacted with additive B. It was inferred from FTIR spectra that additive B substituted the amine protons or hydroxyl groups on the model compound to form a new larger molecule. This larger molecule seemingly is the reason for the increase in viscosity.

Infrared spectroscopy techniques (transmission and ATR) and fluorescence spectroscopy were used to analyze the degradation of fibers exposed to high temperature (T)/high relative humidity (RH) or phosphoric acid to isolate the fiber degradation mechanism. PBO fibers were analyzed for differences before and after aging (T/RH and phosphoric acid). It was found by fluorescence spectroscopy and confirmed by infrared transmission spectroscopy that one of the degradation products of phosphoric acid treated PBO fiber was 2-phenyl benzoxazole (one of the model compounds). Fluorescence spectroscopy was able to identify a different degradation product for the T/RH aged PBO fiber, but in this case the fluorescence pattern did not match one of the model compounds, and infrared transmission spectroscopy could not isolate the exact molecule. Liquid chromatography followed by mass spectroscopy was used to identify possible degradation products of the T/RH aged PBO fiber as structures with molecule weights of 293 and 337 grams per mole.

Information on the physical and morphological changes of the PBO fibers was gathered via SEM. It was seen from this visual evidence that the surface morphology of the treated samples was nearly identical to that of the untreated and non-aged samples even after 120 days of exposure to elevated temperature and relative humidity. More striking was the difference between treated and untreated samples. The untreated samples had observable, long defects parallel to the fiber axis after 120 days of exposure that were not present in the treated samples during the same duration of exposure.

The modulus, tenacity, and strain at max load for PBO fiber samples were statistically analyzed. Three sets of fibers were compared, untreated fiber aged at 70° C./90% RH, $scCO_2$ B+1' treated fibers aged at 70° C./90% RH, and untreated phosphoric acid soaked fibers. The tenacity of the PBO fiber decreased for all samples with respect to time, and the difference in the slope was statistically significant between the three sets of fibers. The phosphoric acid soaked fibers decreased at the highest rate, the untreated fibers decreased at a slower rate, and the B+1' fibers decreased the slowest. This data indicated that the $scCO_2$ B+1' treatment had a significant effect of decreasing the rate at which fiber tenacity decreases. The strain at max load data show the same trends (all decreasing with time) and same order as the tenacity data. Similarly, the $scCO_2$ B+1' treatment had a significant effect of decreasing the rate at which fiber stain at max load decreases.

A better understanding of PBO fiber thermodynamics, mass transfer, physics, and chemistry was accomplished. Major advancements were made in understanding the interactions of $scCO_2$ and additive B with PBO fiber from both computer modeling and experimental standpoints. The knowledge gleaned was used to optimize the treatment process of the PBO fibers. Degradation products of both temperature/humidity and phosphoric acid aged fibers were identified using analytical techniques, which provided better understanding of the degradation mechanism. SEM micrographs of PBO fibers before and after aging offered visual evidence of the failure mode. Aging studies of PBO fibers were conducted over longer times than previous studies. Although tensile testing of aged fibers did not show mechanical property improvements, it did indicate that the B+1' treatment makes a statistically significant difference in extending the useful life of the fiber when compared to untreated fiber.

In connection with one aspect of the invention, a new way to determine the end of life of a bulletproof jacket that has seen an extended exposure to T/RH has been identified. That is, based on a methanol extraction of the fibers resulting in a compound that has a 400 nm fluorescence peak, the ability to quantify the amount of this compound(s) present in the fibers and determine its exact structure from FTIR and mass spec analysis exists. At the very least is presented the ability to compare a field sample mass spec with the mass spectra peaks observed by aging fibers at T/RH conditions. Therefore, there is a recognized relationship between artificial aging and actual field sample environments. If there are amines present as part of the T/RH long term degradation process then there are other additives that have faster reaction kinetics with amines than with epoxy silane functional additives. For example, the rate of primary or secondary amines reacting with different classes of compounds can be generally ranked as follows: isocyanates>anhydrides>aromatic epoxy resins>aliphatic epoxy resins>epoxy silanes.

A number of different compounds from several known classes of materials that react with amines, particularly those systems that have the highest probability for intercepting any amine degradation products generated during T/RH stress and aging testing, can be employed with the invention. The systems are computer modeled on the molecular level, tested for viscosity and functional group changes in the presence of the PBO fiber by viscometry and FTIR, selected based on at least a gravimetrical absorption efficiency into the fiber, with the goal being to bring the slope of the tenacity curve, with respect to time closest, to neutral. The closer the slope is to neutral, the slower the PBO fiber will degrade, and the longer the PPE made of this material remains near its virgin state. Overall, one object of the invention is to minimize PBO fiber degradation. Another object is to provide soft, lightweight soldier PPE made of the modified PBO fiber to meet the required ballistic performance over its specified service life period.

Additional objects, features and advantages of the invention will become more readily apparent from the following detailed description, particularly when taken in conjunction with the drawings.

BRIEF DESCRIPTION OF THE DRAWINGS

FIG. 6b illustrates a determination of adsorption kinetics from desorption runs after varied adsorption periods;

FIG. 7 is a molecular structure of the epoxy silane molecule;

FIG. 8a is a molecular structure for cationic dye;

FIG. 8b is a molecular structure for neutral dye used for calculations;

FIG. 9a is a PBO supercell including an epoxy silane molecule;

FIG. 9b is a PBP supercell including a dye molecule;

FIG. 10a illustrates a PBO crystal supercell with 8 $CO_2$ molecules;

FIG. 10b illustrates 8 $CO_2$ molecules plus one epoxy silane molecule;

FIG. 10c illustrates 8 $CO_2$ plus one dye molecule;

FIG. 11a is a chemical structures of Additive B;

FIG. 11b chemical structure of Pyridine 1;

FIG. 12 is a plot of the sorption of Additive B in PBO fiber using $scCO_2$;

FIG. 53 is a SEM micrograph of an untreated and un-aged PBO fiber;

FIG. 54*a* illustrates B+1' treated fibers at 70° C./90% RH, exposed for 120 d;

FIG. 54*b* illustrates untreated fibers at 70° C./90% RH, exposed for 120 d;

DETAILED DESCRIPTION OF THE INVENTION

Poly(p-phenylene-2,6-benzobisoxazole) (PBO) fiber is a high strength and high modulus fiber. Unfortunately, recent failures in the field have revealed that the fiber degrades rapidly when exposed to moisture and heat. Approaches to eliminate these detrimental effects would provide armor designers with a stable high performance fiber to be used in their lightweight systems. In accordance with the present invention, a treatment process was developed to infuse active chemicals into the fibers to react with or remove the residual phosphoric acid in the fibers. This led to improved mechanical properties of PBO fibers when exposed to high temperature and high relative humidity (RH).

Figure 1:
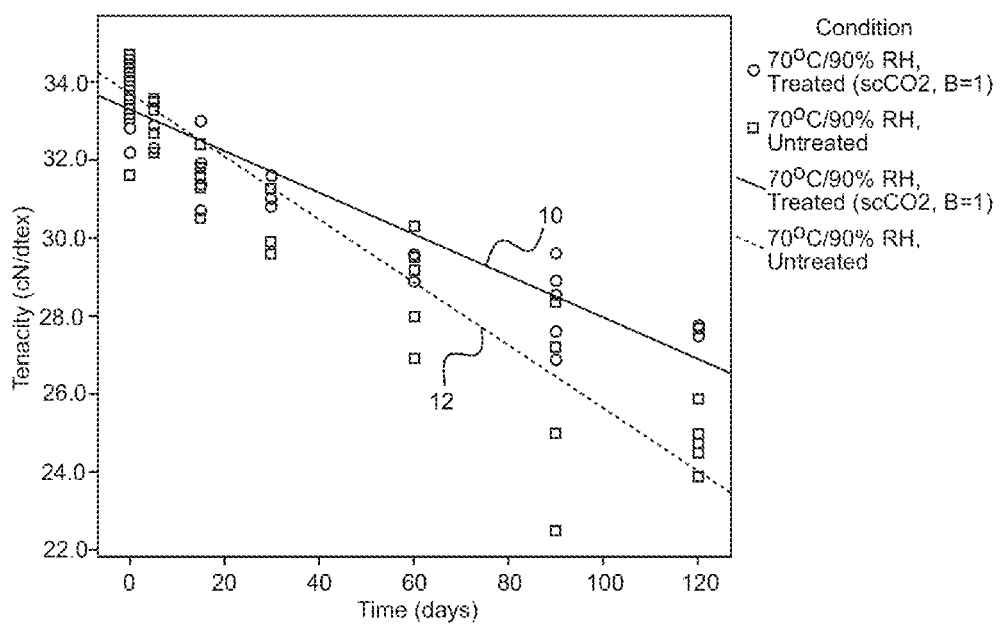
FIG. 1 is a plot of illustrating the statistical significant difference between treated and untreated PBO fiber tenacity with respect to aging time.

Accelerated aging was performed on treated specimens using supercritical $CO_2$ (sc$CO_2$) as the carrier. In general, treatment with 3-glycidoxypropyldimethoxymethylsilane (designated B+1') resulted in properties that were lower initially, before aging, but the properties improved during aging or were neutral compared to the baseline. At 60 days, the properties had generally reached parity with the baseline and were predicted to continue improving. This was the only treatment that consistently showed a statistically significant improvement with aging time. This is shown in FIG. 1 by the statistical significant difference between the treated and untreated PBO fiber tenacity with respect to aging time. FIG. 1 illustrates how the tenacity of B+1' treated fiber decreases, as indicated at 10, at a statistically significant slower rate than untreated fiber, as indicated at 12. The other treatments had a neutral or negative effect.

A treatment process was also developed to improve the mechanical properties of PBO fibers when exposed to high temperature and high RH. The effects of different epoxy silanes, amines, and amino silanes on the degradation of PBO model compounds were examined to identify reactions taking place that led to the degradation of the PBO fiber and what reaction pathways stabilize the fiber and prevent it from degrading further from physical and/or chemical failure mechanisms. Various sc$CO_2$ processing conditions were also studied to determine which had a great effect on the PBO fiber. Applied research also focused on proof-of-concept studies and feasibility assessments.

Attempts were made to replicate the mechanical property improvements made through secondary chemical process modifications of base level fibers. Additional information was also gathered of the physical and morphological changes on the fibers. Radiation effects were also quantified and laboratory-scale proof-of-concept studies were completed.

These materials improvements can be incorporated into lightweight soft armor systems and Fiber Reinforced Plastics (FRPs) for combat helmets and backings to ceramic for small arms protection. Based thereon, it has been determined that chemical modifications to PBO fibers using a unique combination of active infusing chemicals and a supercritical infusion process can improve the long-term mechanical properties of PBO leading to lighter weight armor systems.

The sorption of $CO_2$ into PBO fibers will now be described. Supercritical $CO_2$ (sc$CO_2$) works well as a solvent due to having liquid-like density and gas-like transport properties. It has been shown in the literature that sc$CO_2$ is soluble in many different polymers (Ram B. Gupta, 2007). An extensive search of the literature was unable to produce solubility data for polybenzobisoxazole (PBO). Therefore, the goal of this task was to determine the solubility and diffusion time of sc$CO_2$ in PBO fibers.

As received PBO fibers, designated AS0911 (Toyobo Inc., Japan) were soaked in 99.9% $CO_2$ (Praxair) at 2500 psig and 50° C. A 0.5 L autoclave containing the fiber was pressurized using an ISCO 260D syringe pump, and heated using heating tape with a feedback controller attached. The soak time was varied from 4 to 111 hours. At the end of the soak time, the pressure was released as quickly as possible (<1 min), the autoclave was opened, and the fibers were removed and placed on a 4 digit analytical balance (Mettler Toledo), where the mass was recorded for the next hour.

Figure 2:
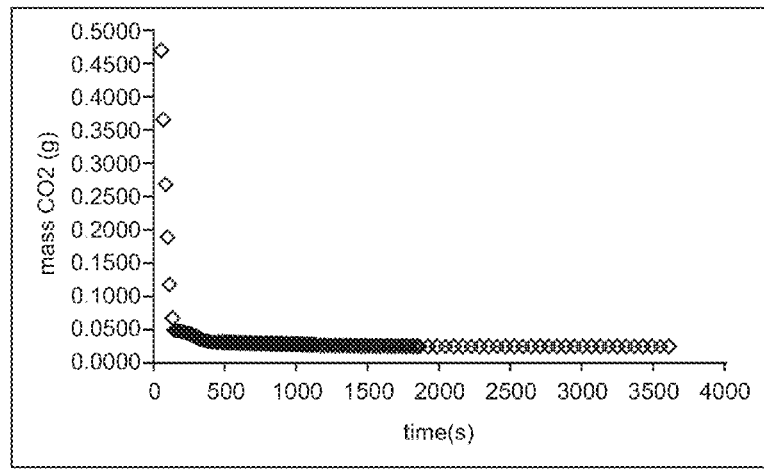
FIG. 2 is a plot of $CO_2$ desorption data after 24 hours of soaking.

With reference to FIG. 2, the $CO_2$ desorption data from each of the different soaking times (4, 16, 24, 111 hours) all had the same general shape. FIG. 2 illustrates $CO_2$ desorption data after 24 hours of soaking. The initial several hundred seconds have a completely different slope than the remainder of the data; this mass loss is likely due to something other than diffusion of $CO_2$ out of the PBO fiber. Fick's Law mandates that diffusion of a single species out of the fiber should be a smooth continuous curve with respect to time, not a function with a point of discontinuity due to two different slopes. The mass loss could be accounted for by desorption of adsorbed $CO_2$ from the surface of the PBO fiber or it could be water condensation evaporating off of the fibers. During depressurization, the autoclave and PBO fibers are significantly cooled, which leads to increased probability that water from the humidity in the air will condense on them. Once the fibers warm back up to room temperature the water returns to the air, thus a mass loss can be seen. In either case, to accurately model the $CO_2$ in the PBO fiber these initial data points must be removed, so all data points below 450 seconds was not used for the analysis moving forward.

Figure 3:
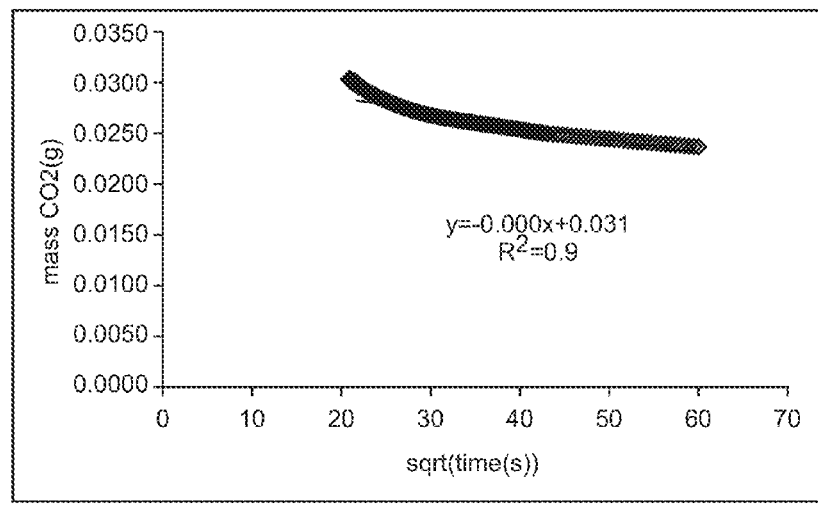
FIG. 3 illustrates $CO_2$ mass in PBO fiber versus time during desorption after soaking for 4 hours.

The equation for the diffusion of mass in a solid cylinder (Crank, 1956) was used to model the desorption of $CO_2$ out of the PBO fiber. It can be seen below in (Equation 1).

$$\frac{M_t}{M_\infty} = 1 - \sum_{n=1}^{\infty} \frac{4}{a^2 \alpha_n^2} e^{-D a_n^2 t} \quad \text{(Equation 1)}$$

Where $M_t$ is the mass of the $CO_2$ in the PBO fiber at time t, $M_\infty$ is the mass of $CO_2$ in PBO fiber at time infinity (saturation mass), a is the radius of the PBO fiber, $\alpha_n$ is the coefficient used in solving Bessel function of the first kind of order zero ($J_0(a\ \alpha_n)=0$) for its n roots, D is the diffusion coefficient of $CO_2$ through PBO, and t is time. This equation is valid to use if the desorption follows Fickian diffusion. An experimental way to check to see if the data follows Fickian diffusion is if a plot of $CO_2$ mass in the PBO fiber versus the square root of time is linear, within a reasonable error (Ana Rita C. Duarte, 2006). FIG. 3 shows experimental data to validate Fickian diffusion. In general, FIG. 3 illustrates $CO_2$ mass in PBO fiber versus time during desorption after soaking for 4 hours. The data in FIG. 3 was fit to (Equation 1, where the intercept of the linear fit line is the mass of $CO_2$ in the PBO fiber at the end of the 4 hours of soaking. Time zero is the time just after $CO_2$ depressurization. In this case, 0.0312 g of $CO_2$ absorbed into the PBO fiber after 4 hours at 2500 psig at 50° C.

For this 4 hour case, it is now established that $M_{t=0}$=0.0312 g and that $M_\infty$=0 g, which leaves $M_{0<t<\infty}$, D, and t as the unknowns in (Equation 1). The radius of the fiber, $\alpha$, was measured to be 5 micron via optical microscopy, and 982 fibers per roving was calculated from manufacturer's data.

Figure 4:
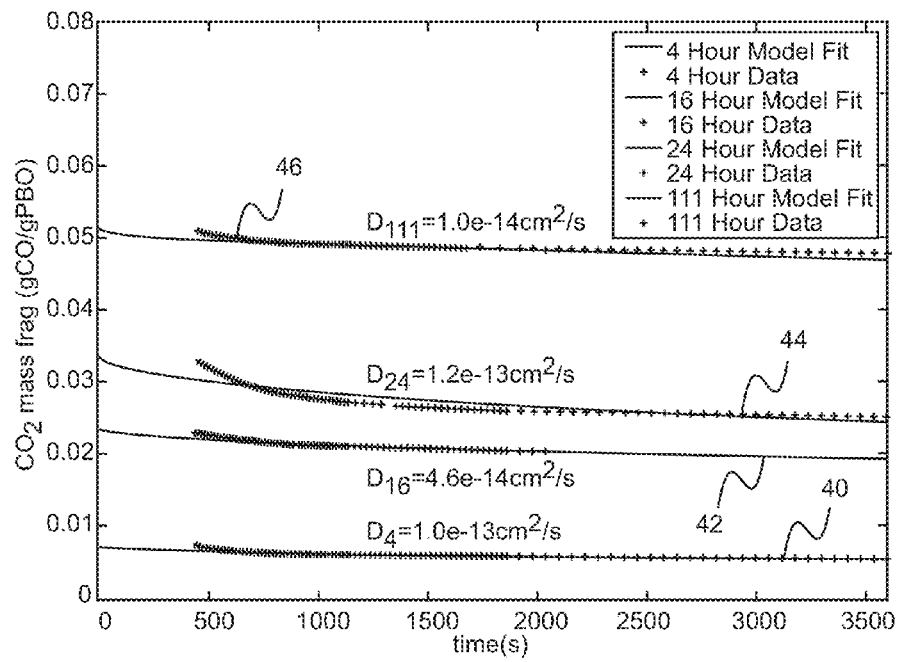
FIG. 4 illustrates experimental data and model fits for absorption of $CO_2$ in PBO fibers each of four (4) different soak times.

FIG. 4 illustrates experimental data and model fits for each of four (4) different soak times. A diffusion coefficient, D, was chosen, time was incremented and $M_t$ was solved for at all times. The sum of the square errors between the calculated $M_t$ and the experimental data was found for each D, until a minimum error was obtained. The results of the modeling are displayed in FIG. 4, where the data between different soak times has been normalized by the initial weight of the PBO fiber to give the mass fraction of $CO_2$ in the PBO fiber. The $CO_2$ mass desorbing from one PBO fiber was multiplied by 982, since one roving was used in each experiment. The results of a four hour soak time are indicated at 40. The results of a 16 hour soak time are indicated at 42, a 24 hour soak time is indicated at 44 and a 111 hour soak time is indicated at 46.

Figure 5:
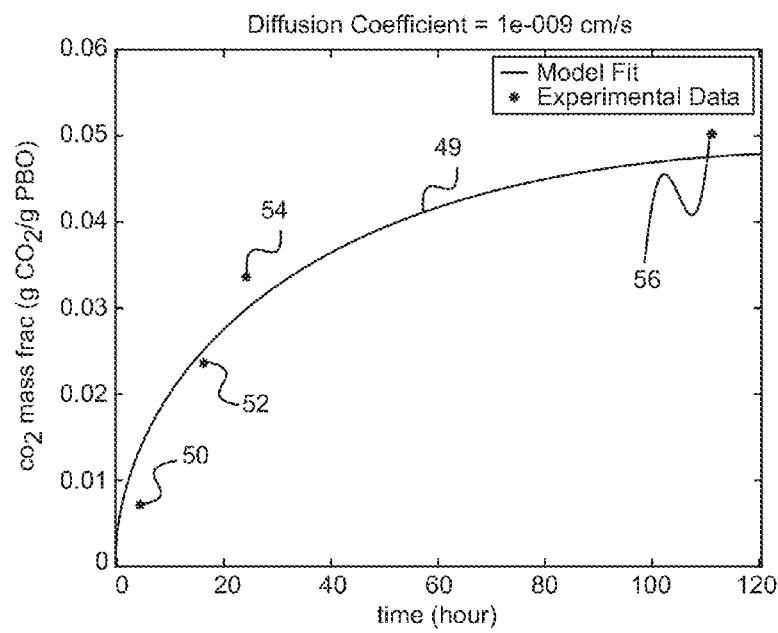
FIG. 5 illustrates a $CO_2$ absorption curve from the four normalized $M_{t=0}$ data points, plotted and modeled in the same manner as the desorption curves, as displayed in FIG. 4.

The model fits, as shown by solid lines in FIG. 4, provided further evidence that the initial mass of $CO_2$ calculated for each soak time was valid. From the four normalized $M_{t=0}$ data points, a $CO_2$ absorption curve 49 was plotted and modeled in the same manner as the desorption curves, as displayed in FIG. 5. The $M_{t=0}$ for a soak time of 4 hours is indicated at 50, $M_{t=0}$ for a soak time of 16 hours is indicated at 52, $M_{t=0}$ for a soak time of 24 hours is indicated at 54, and $M_{t=0}$ for a soak time of 111 hours is indicated at 56. At the soak time of 111 hours, it was assumed that the $CO_2$ and PBO fibers were in thermodynamic equilibrium, thus the absorption curve asymptotes to the $CO_2$ mass fraction data point after 111 hours of soaking.

Figure 6A:
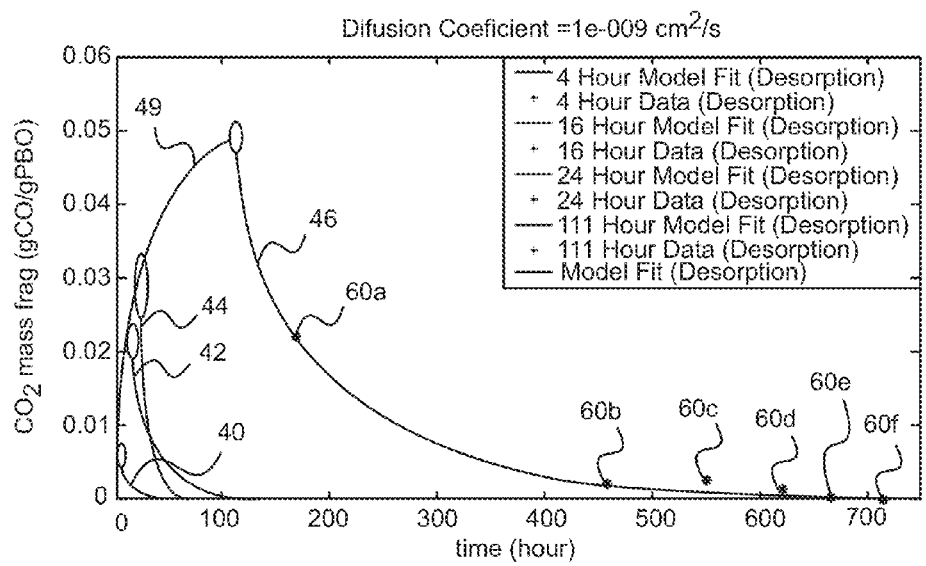
FIG. 6a illustrates absorption kinetics from desorption runs after varied absorption periods.

All four desorption curves, 42, 44, 46, 48 and adsorption curve 49, as well as the experimental data, are plotted together in FIG. 6a. The general shapes of the curves shown in FIG. 6a match well with the theoretical schematic found in the literature (K. Johnston, 1989), as illustrated in FIG. 6b. Also on the plot in FIG. 6a are six more data points, 60a-60f, to validate the model fit, all at times greater than 166 hours. These points were not used to fit the diffusion coefficient of the model, but were instead used to validate it, which they do well, based on the small error. Therefore, it has been shown that by taking one hour of data after depressurization, the entire desorption curve can be accurately modeled.

Gravimetric measurements show that the fibers can hold up to 5 wt. % of $CO_2$ at 50° C. and 2500 psig, and that the $CO_2$ can take several hundred hours to diffuse out at ambient conditions. The modeling implemented proved to be valid when compared with measurements made hundreds of hours after the initial $CO_2$ depressurization of the fibers. The study has shown that a very good understanding of the interaction of $scCO_2$ with PBO fibers now exists.

$CO_2$ may be used as a carrier for other molecules into PBO. To validate or refute whether chemical modifications can improve the long-term mechanical properties of PBO fibers, an in-depth analysis of the chemical method through molecular modeling is performed here. That is, molecular modeling of small molecules into PBO fiber will be described. This method involves the use of $scCO_2$ as a transport media to deliver an epoxy silane capable of effectively crosslinking in the presence of the residual acid. The challenge is there is no reasonable experimental method to determine the amount of the epoxy silane that is in the fiber after the exposure.

Therefore, the goal of this task was to explore whether molecular modeling could be used to provide information on the possible infusion of the epoxy silane into the PBO fiber. We have determined the interaction energies between PBO and the epoxy silane or a dye. We also used existing models of PBO to examine the distortion of the PBO fiber due to introduction of $CO_2$, the epoxy silane, or the dye. From this information, we can draw conclusions about the infusion of the epoxy silane into PBO fiber relative to the infusion of the dye.

This section outlines the computational methods used to predict the infusion of small molecules into PBO fibers. The initial PBO crystal structure was taken from literature (A. V. Frantine, 1989). The PBO unit cell is composed of two separate PBO monomers spaced along the x-axis. The long axis of the monomers is parallel to the z-direction. A PBO 2×4×4 supercell was then constructed and force minimized using the COMPASS (Sun, 1998) force field to obtain the starting structure for the calculations. A second PBO 2×4×4 supercell, which contained two termination defects and partial alignment disorder, was also used for calculations. This supercell has previously been shown to better describe the mechanical properties of PBO fibers.

The effect of intercalation of molecules into PBO was determined by inserting the desired quantity and types of molecules into the PBO supercell, partially minimizing the cell with fixed lattice parameters, then allowing the cell to completely minimize including lattice relaxation. The increase in energy due to insertion of the molecules into PBO was determined by subtracting the energies of the starting PBO supercell and the individual molecules from the energy of the supercell. The volume change due to inclusion of the epoxy silane or dye was determined by subtracting the volume of the supercell containing the same number of $CO_2$ molecules from the volume of the supercell with $CO_2$ and epoxy silane or dye.

As a second measure of the interaction of PBO with the epoxy silane or the dye, the mixing energy for either the dye or the epoxy silane with PBO was also calculated. The mixing energy can be determined from the average coordination numbers and interaction energy $$E_{mix}(T) = \frac{Z_{12}E_{12}(T) + Z_{21}E21(T) - Z_{11}E_{11}(T) - Z_{22}E_{22}(T)}{2}$$

where Zij is the average coordination number (number of molecules of molecule 1 that can be placed around molecule 2) and Eij is the average interaction energy between molecules 1 and 2. For these calculations, a PBO tetramer was used as molecule 2, with excluded volume at the terminal hydrogen atoms. Both the coordination numbers and interaction energies were determined using a Monte Carlo procedure. The energies were evaluated using the COMPASS force field.

FIG. 7 illustrates the structure of epoxy silane. FIG. 8a shows the structure of the cationic dye used in experiments and FIG. 8b illustrates the neutral computational dye molecule that was used in these calculations. The neutral dye was selected to provide similar molecular structure without having any net charge which is difficult to accommodate in the calculations. It is important to note that the epoxy silane has a much less planar structure than the dye, and may have more difficulty in fitting into PBO, which is composed of planar polymers.

The experimental evidence suggests that up to 8% $CO_2$ may diffuse into the fiber, with much of that $CO_2$ quickly outgassing upon the removal of pressure. The single PBO unit cell has molecular formula $C_{28}N_4O_4H_{12}$, giving it 36 heavy (non-hydrogen) atoms. The 2×4×4 supercell thus would have 1152 heavy atoms. A $CO_2$ molecule is composed of 3 heavy atoms, the dye molecule is 21 heavy atoms, and the epoxy silane molecule is 14 heavy atoms. An 8 wt % loading of $CO_2$ into the 2×4×4 PBO supercell would be approximately 30 $CO_2$ molecules, while 2 wt % $CO_2$ loading would be 8 $CO_2$ molecules in the supercell. Loading 1 dye molecule into the supercell is equivalent to about a 2 wt % loading, while loading 1 epoxy silane molecule into the supercell is equivalent to about a 1.5 wt % loading.

As described above, Monte Carlo methods were used to calculate the mixing energy of PBO with either the epoxy silane or the neutral dye. Table 1 shows the mixing energy calculated at a temperature of 300K for both the epoxy silane and the dye. The epoxy silane has higher mixing energy, indicating that it is less likely to mix with the PBO. This can be understood just in terms of the molecular structure. Both PBO and the dye are planar and largely aromatic, so there can be stronger interactions between these two than the interactions between PBO and the epoxy silane, which is saturated.

TABLE 1

Interaction energies between PBO and the epoxy silane or the neutral dye.

| Molecule | $E_{mix}$ (300 K) kcal/mol |
|---|---|
| Neutral dye | 63.88 |
| epoxy silane | 99.67 |

The effect of the intercalation of a single dye or epoxy silane molecule into crystalline PBO has been examined. The calculations were performed using a PBO 4×8×2 supercell to minimize the interaction between the molecules in the x- and y-directions.

FIGS. 9a and 9b illustrate the minimized geometry of a PBO supercell after introduction of the epoxy silane (FIG. 9a) or the dye (FIG. 9b). In this Figure, the z-axis is out of the page. The PBO strands are illustrated and the epoxy silane (FIG. 9a) and dye (FIG. 9b) are depicted with space filling models. Comparison of the two structures shows there is more distortion in the PBO supercell containing the epoxy silane, and the distortion extends further from the epoxy silane. This larger distortion can again be attributed to the shape of the epoxy silane molecule, which makes it more difficult to fit between adjacent PBO strands. It is important to note that the epoxy silane is present at approximately 1.5 wt %, while the dye is present at about 2 wt %.

A combination of $CO_2$ with epoxy silane or dye also alters the PBO supercell. Calculations have been performed using both the crystal 2×4×4 supercell and the PBO 2×4×4 supercell with defects. Table 2 presents the volume change and energy difference associated with incorporating the epoxy silane or dye into the supercell.

TABLE 2

Energy and volume changes for epoxy silane or dye molecules in PBO.

| Unit cell contents | ΔV (Å$^3$) | Energy difference for crystalline PBO unit cell (kcal/mol) | Energy difference for defect-containing PBO unit cell (kcal/mol) |
|---|---|---|---|
| PBO + 8$CO_2$ + neutral dye | 757.8 | 133.8 | 371.8 |
| PBO + 8$CO_2$ + epoxy silane | 679.9 | 125.7 | 463.6 |
| PBO + 16$CO_2$ + neutral dye | 520.1 | 160.4 | 412.7 |
| PBO + 16$CO_2$ + epoxy silane | 683.0 | 258.1 | 427 |
| PBO + 30°$CO_2$ + neutral dye | 306.2 | 73.4 | |
| PBO + 30°$CO_2$ + epoxy silane | 363.0 | 121.6 | |

Although the results are somewhat scattered, overall there is a larger effect due to the incorporation of the epoxy silane into both the crystal and the defective crystal PBO supercells. The volume change is due to the addition of the epoxy silane or dye molecule. The volume increase gets smaller with larger number of $CO_2$ molecules as less volume is needed to accommodate the molecule in the more swollen supercell. It is also interesting to note that more volume is generally needed to fit the epoxy silane, even though its individual molar volume is much less than that of the dye.

The overall effect of the introduction of molecules into PBO is shown in FIGS. 10a-10c. FIG. 10a illustrates a PBO crystal supercell with 8 $CO_2$ molecules, FIG. 10b illustrates 8 $CO_2$ molecules plus one epoxy silane molecule, and FIG. 10c illustrates 8 CO$_2$ plus one dye molecule. Here, it is obvious that the inclusion of even 2 wt % CO$_2$ (8 CO$_2$ molecules) causes widespread disruption of the crystallinity.

Molecular modeling tools were used to look at the relative behavior of an epoxy silane or dye molecule introduced into PBO. The results suggest that the epoxy silane is less energetically favored in PBO, and that the shape of the epoxy silane causes larger steric distortions. The incorporation of even 2 wt % CO$_2$ into the PBO can lead to substantial disruption of the order in the PBO fiber. This disruption of the order in the PBO fiber facilitates incorporation of the epoxy silane into the fiber. These results indicate that scCO$_2$ will likely act to aid the infusion of the epoxy silane into the PBO fiber, although the loading of the epoxy silane will be less than that of the dye used to quantify the degree of infusion.

In one example, gravimetric methods and fluorescence microscopy were used to analyze an amount of (3-glycidoxypropyl)methyldimethoxysilane (additive B) and Pyridine 1 that were loaded into PBO fiber during a scCO$_2$ treatment. This information was used to validate treatment conditions for the fibers.

Additive B and Pyridine 1 were allowed to diffuse into PBO fiber in a scCO$_2$ atmosphere. The chemical structure of additive B ((3-glycidoxypropyl)methyldimethoxysilane) is shown in FIG. 11a and the chemical structure of Pyridine 1 is shown in FIG. 11b. The CO$_2$ treatment time and temperature were varied, while always keeping the CO$_2$ pressure at 2500 psig; all conditions are detailed in Table 3. Enough additive B or Pyridine 1 was put into the high pressure vessel to saturate the CO$_2$ environment. This was verified by visualizing excess Pyridine 1 in the high pressure cell after the soaking. The PBO fibers were weighed immediately prior to the CO$_2$ treatment and then following the treatment out to ~400 hours. Time zero was taken to be the time when the CO$_2$ pressure was released and the fibers were taken out of the high pressure vessel. The weight difference before and after treatment is attributed to the weight gain from CO$_2$ and additive B diffusing into the fiber.

Fluorescence microscopy was performed on the dye infused fibers using an Olympus BH-2 fluorescence microscope with a black and white CCD camera. The images were pseudocolored red because they emit at 700 nm.

TABLE 3

Treatment conditions for PBO fibers with additive B, pressure always at 2500 psig.

| Label | Time (h) | Temperature (° C.) | Storage Cond. |
|---|---|---|---|
| 24 B | 24 | 50 | 25° C., 50% RH |
| 24 B + 1' | Stage 1: 24 | Stage 1: 50 | 25° C., 50% RH |
|  | Stage 2: 1 | Stage 2: 110 |  |
| 111 B | 111 | 50 | 25° C., 50% RH |
| 24 B + 1' vac | Stage 1: 24 | Stage 1: 50 | Room Temp, Vacuum |
|  | Stage 2: 1 | Stage 2: 110 |  |
| 25 h 110° C. B | 25 | 110 | 25° C., 50% RH |
| 24 B + 1' EnvCh | Stage 1: 24 | Stage 1: 50 | 70° C., 90% RH |
|  | Stage 2: 1 | Stage 2: 110 |  |

A gravimetric method was used to determine the mass of additive B remaining in the PBO fiber after the CO$_2$ had diffused out. This weight difference of the fiber is displayed in FIG. 12. This difference initially decreases due to the CO$_2$ diffusion out of the fiber leaving only additive B in the fiber.

From the data, it is evident that a high temperature stage (110° C.) is necessary after a 24 hour treatment to get Additive B to diffuse into the fiber. An exemplary data point for the increased temperature stage of additive B after 25 hours is indicted at 80. The 24 B treatment shows that without the high temperature stage, the mass gain drops back down to zero after 200 hours, meaning that the CO$_2$ has diffused out and there is no additive B left in the fiber. An exemplary data point for additive B after 24 hours is indicted at 82. On the opposite end of the spectrum is the 25 h 110° C. B treatment that had the highest weight gain from the diffusion of additive B into it, as indicated at 80. The 24 B+1' treatment was shown to allow between 2-5 wt. % additive B into the PBO fiber after CO$_2$ had diffused out (e.g. 24 B+1 vac, and 24 B+1). An exemplary data point for additive B plus pyrlidine 1 under vacuum conditions (24 B+1 vac) is indicted at 84 and an exemplary data point for additive B plus pyrlidine 1 (24 B+1) is indicated at 86. Further, an exemplary data point for additive B after 111 hours is indicted at 88 and exemplary data point for additive B plus pyridine after 24 hours in an environmental chamber is indicted at 90.

Several different storage treatments were also studied to see what effect they would have on the desorption rate of CO$_2$ from the fiber, and to see if humidity was playing a role in the weight gain. The fiber from the 24 B+1' vac treatment was placed in a vacuum oven at room temperature to see if the CO$_2$ would desorb faster, but no effect was seen, as indicated at 84. The 24 B+1' EnvCh fibers were placed in an environmental chamber (70° C., 90% RH) after 40 hours and a water uptake was observed, this can be seen as a mass increase as shown at 90 in FIG. 12.

Pyridine 1 was chosen as a tracer molecule into the PBO fiber for two reasons. Pyridine 1 is soluble in scCO$_2$ and it fluoresces brightly. Some background fluorescence from the fiber can be seen, but the Pyridine 1 can be seen due to its bright fluorescence.

Figure 13:
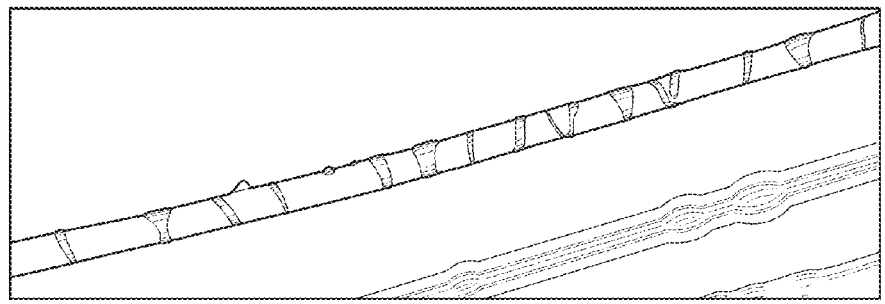
FIG. 13 is a fluorescence image of a PBO fiber after treatment with Pyridine 1 in $scCO_2$.

FIG. 13 is a fluorescence image of a PBO fiber after treatment with Pyridine 1 in scCO$_2$. Fluorescence emitted from PBO fiber soaked. The image was taken through a 20× objective with a 1500 ms exposure time. Visible physical defects can be seen as nodes, which fluoresce more brightly, due to more Pyridine 1 diffusing into these nodes. The physical defects create more free volume in the fiber and allow more Pyridine 1 to diffuse in. Raman spectroscopy, with a 1 micron spot size, was used to confirm that there was no molecular structure difference between a spot with a physical defect and a spot with one on an untreated fiber.

Small molecules, additive B and Pyridine 1, were shown to diffuse into the PBO fiber by gravimetric experiments and fluorescence microscopy, respectively. The 24 B+1' treatment 86 was shown to allow between 2-5 wt. % additive B into the PBO fiber after CO$_2$ had diffused out. The 1 hour 110° C. scCO$_2$ treatment was shown to be necessary for the diffusion of additive B into the PBO fiber, as indicated by 80 in FIG. 12. Without the 110° C. scCO$_2$ treatment no additive B was gravimetrically detected in the fiber. Fluorescence microscopy showed that a fluorescent dye (Pyridine 1) diffused into the areas of the PBO fibers that have physical defects at greater intensity than pristine areas on the fiber. It was confirmed by Raman Spectroscopy that the physical defects in the fibers were not chemically different from the remainder of the fiber. From this data, it is thought that additive B, absorbed by PBO fiber, favorably partitions to the physical defects similarly to Pyridine 1.

Additive B has been shown to react with PBO fiber and model compounds. Rheological measurements and FTIR spectroscopy were used to determine how additive B reacted with model compounds and PBO fiber to show that additive B had the proper chemical functionality for fiber life extension.

Additive B was tested in the presence of phosphoric acid, PBO fibers, and with each model compound and analyzed for a reaction.

Rheological measurements were taken, such as, the viscosity was measured on a TA 2000ex rheometer equipped with a 40 mm 2° cone-and-plate with a 52 micron gap. The viscosity was measured at 20° C., after two minutes of thermal equilibration, in the range of 100-1000 $s^{-1}$.

Infrared analysis of PBO fibers was performed using either a Digilab FTS-60a or Digilab FTS-7000e Fourier transform infrared spectrometer. Spectra were acquired using two methods: attenuated total reflectance (ATR) and transmission. ATR spectra were obtained using the Digilab FTS-60a equipped with a "Split-Pea" ATR accessory (Harrick Scientific) fitted with a silicon ATR crystal. Transmission spectra were obtained using the Digilab FTS-7000e equipped with a Digilab UMA-600 infrared microscope. All spectra were run at 8 $cm^{-1}$ spectral resolution.

Spectra acquired by ATR were pressed against the ATR crystal using the pressure probe provided with the ATR accessory using minimal pressure. Spectra thus obtained tend to emphasize the surface characteristics of the sample. Samples were prepared for transmission spectroscopy by compressing fibers into a thin fibrous layer on a Zinc Selenide (ZnSe) window using a metal probe. Using this method the spectra included the bulk of the fibers and not only the surface.

IR spectra of methanol extracts and washes were obtained by transmission spectroscopy using the infrared microscope. Samples were first dried onto a ZnSe window and spectra of several areas of the extract were acquired.

Additive B polymerizes when in the presence of phosphoric acid. The extent of this reaction was tracked by using viscosity as a measure. The fluid was Newtonian in the shear range measured, so a single value for viscosity is reported.

Figure 14:
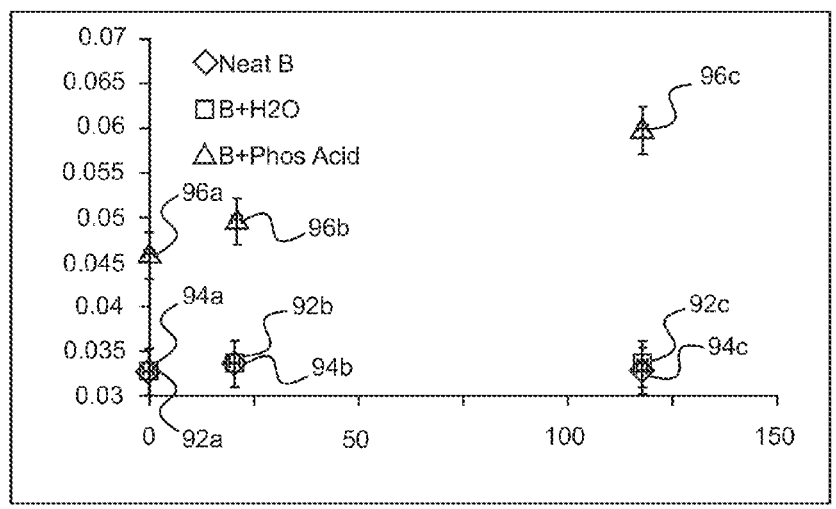
FIG. 14 is a plot of the viscosity of additive B solutions.

FIG. 14 illustrates the viscosity of additive B solutions. Neat additive B was used as a control. Two other samples were prepared. The first was prepared by mixing 2 vol. % of 18 MOhm water into additive B, and the second was prepared by mixing 2 vol. % of 1.8 M phosphoric acid into additive B. All three samples were measured for viscosity shortly after mixing, and then they were stored in clear glass vials in a lab (~20° C., ambient pressure) and measured again after 21 hours and 118 hours. The results from the measurements are in FIG. 14. The error bars represent one standard deviation based on the 10 measurements made between 100 $s^{-1}$ and 1000 $s^{-1}$. The sample with only water and additive B (i.e., no phosphoric acid), as indicated at 92a-92c, had a similar viscosity to the control sample of neat additive B, as indicated at 94a-94c. The sample containing phosphoric acid and additive B, as indicated at 96a-96c, showed a viscosity increase with time, which is believed to be the effect of the polymerization of additive B.

Additive B was put into contact with PBO fiber and the viscosity was measured with respect to time. The purpose of this experiment was to see if residual phosphoric acid in the PBO fibers would react with additive B and cause polymerization, evidenced by a viscosity increase.

Figure 15:
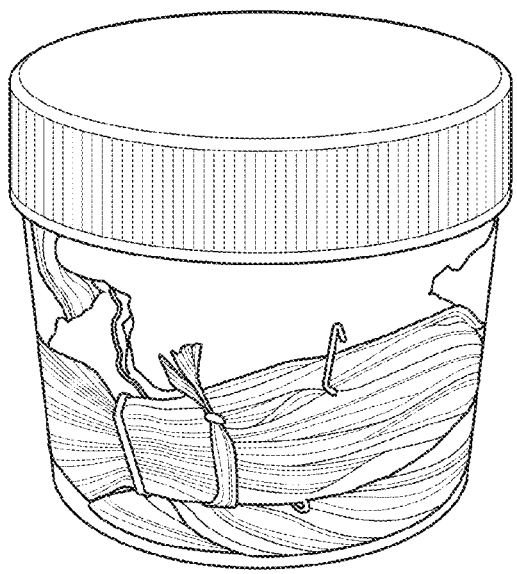
FIG. 15 is a picture of PBO fibers in contact with additive B.

FIG. 15 is a picture of one of the storage jars used to age additive B while in contact with the fibers. The jars contained 10.5 g of PBO fibers, 16 g of additive B, and a PTFE spacer to increase the contact of additive B with the PBO fibers. There were two controls for this experiment. The first control was measuring the viscosity of additive B straight out of the manufacturer's bottle, which was stored at 23° C. The second control was transferring additive B to a jar, with a PTFE spacer in it, and storing it in the oven at 55° C. The jars containing additive B and PBO fibers were stored at two different temperatures (25° C. and 55° C.), to determine if there was a kinetic difference due to temperature on the reaction.

Figure 16:
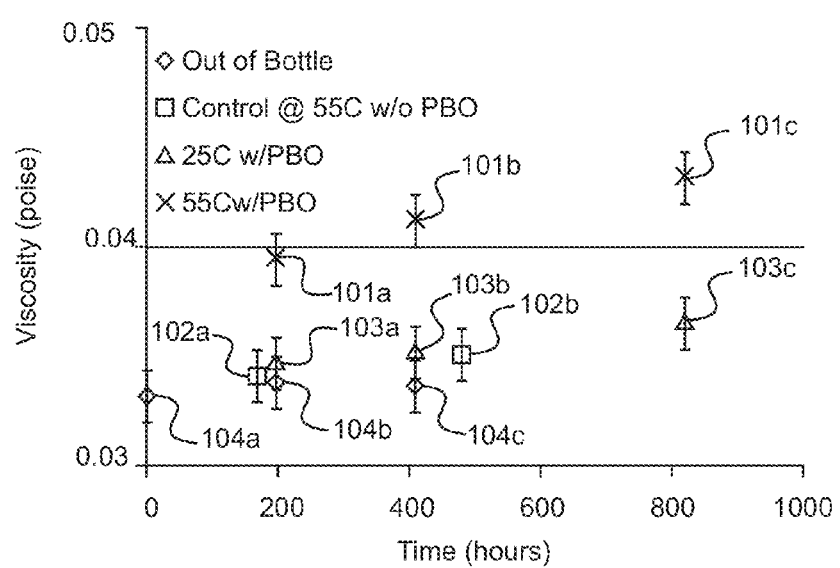
FIG. 16 is a plot of the viscosity of additive B.

FIG. 16 is a plot of the viscosity data from this study. Additive B that was in contact with the PBO fibers at 55° C., as indicated at 101a-101c, has a much higher viscosity, after aging, compared to any other of the samples. This indicates that the reaction is evolving more rapidly at the higher temperature, which is a very common phenomenon. The control (without PBO) at 55° C. shows a slight increase in viscosity with time, as shown by 102a-102b. The sample at 25° C., as indicated at 103a-103c, shows an increase in viscosity, which is likely due to the additive B polymerization reaction. The control sample of additive B out of the bottle, as indicated at 104a-104c, shows slight scatter in viscosity, but not a trend.

Figure 17A:
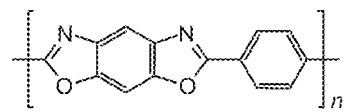
FIG. 17a illustrates the backbone structure of PBO fiber.
Figure 17B:
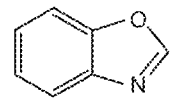
FIG. 17b illustrates the structure of benzoxazole.
Figure 17C:
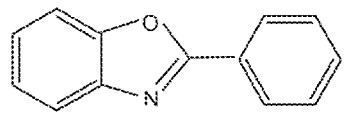
FIG. 17c illustrates the structure of 2-phenylbenzoxazole.
Figure 17D:
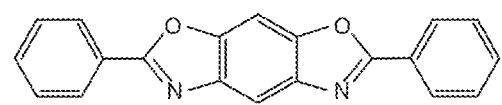
FIG. 17d illustrates the structure of 2,6-diphenyl[1,3]oxazolo[4,5-f][1,3]benzoxazole.
Figure 17E:
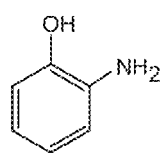
FIG. 17e illustrates the structure of 2-aminophenol.
Figure 17F:
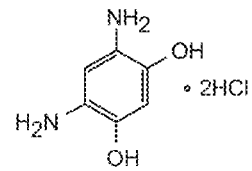
FIG. 17f illustrates the structure of 4,6-diaminoresorcinol dihydrochloride.

In one aspect of the invention, five model compounds were mixed with additive B and monitored for a reaction by Fourier Transform Infrared (FTIR) spectroscopy. The object of this study was to determine what potential reaction products were being formed after the introduction of additive B during the treatment process. The model compounds were chosen as potential PBO fiber degradation products based on the backbone structure of the fiber. FIGS. 17a-17f illustrate the backbone structure of PBO fiber and the five model compounds. In particular, FIG. 17a illustrates the backbone structure of PBO fiber, FIG. 17b illustrates benzoxazole, FIG. 17c illustrates 2-phenylbenzoxazole, FIG. 17d illustrates 2,6-diphenyl[1,3]oxazolo[4,5-f][1,3]benzoxazole, FIG. 17e illustrates 2-aminophenol, and FIG. 17f illustrates 4,6-diaminoresorcinol dihydrochloride.

Figure 18:
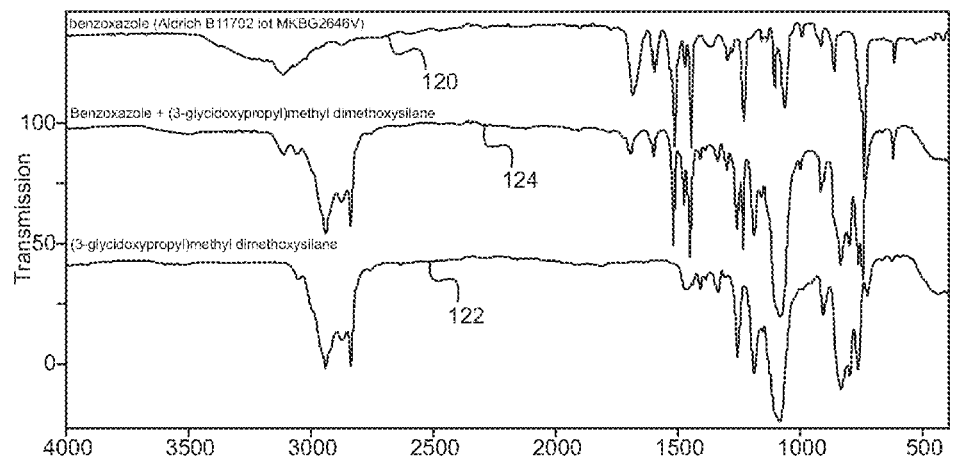
FIG. 18 is a FTIR spectra of benzoxazole with additive B.

The model compounds were each mixed with additive B, where 40% of the total mass of the mixture was additive B. The mixtures were stored at 55° C. for a minimum of 72 hours to allow the reaction to evolve. Benzoxazole dissolved after several minutes of shaking by hand when mixed with additive B. It formed a slightly yellow transparent liquid. After aging at 55° C. the mixture became more yellow. FTIR was used to analyze the starting materials and the product(s), as shown in FIG. 18. The product solution's FTIR spectrum is a mixture of the spectra of the two starting materials. There is no evidence of a reaction between benzoxazole and additive B. In particular, the spectrum for the benzoxazole is indicated at 120, the spectrum for additive B is indicated at 122, and the spectrum for the product is indicated at 124.

Figure 19:
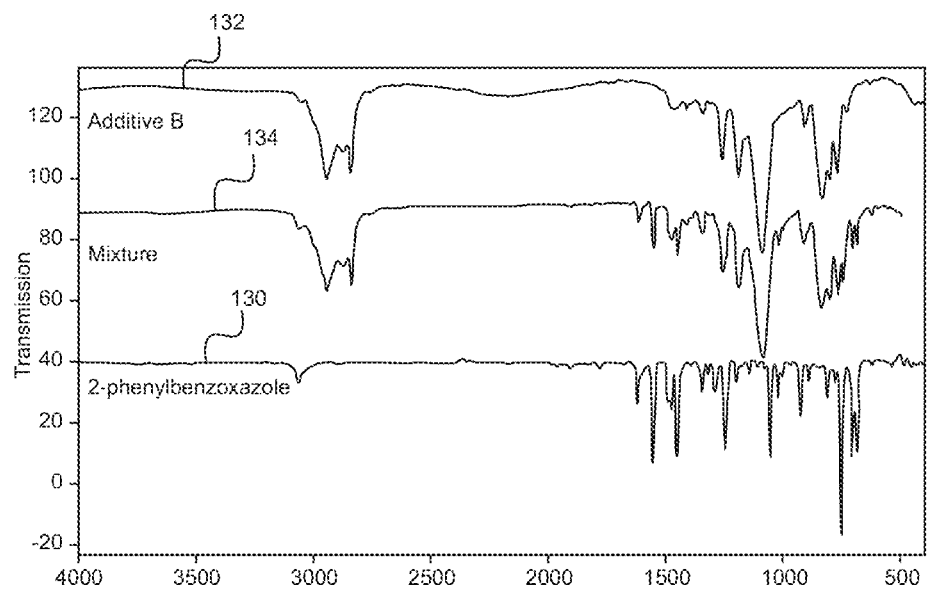
FIG. 19 is a FTIR spectra of 2-phenylbenzoxazole with additive B.

The 2-phenylbenzoxazole was mixed with additive B. Only a small mass (~10 mg) of 2-phenylbenzoxazole was available for this test, so it was not possible to determine solubility at the low volume. FIG. 19 displays the spectra of 2-phenylbenzoxazole with additive B. The mixture spectrum shows no signs of a reaction between the two reactants, only a mixture of them. In particular, the spectrum for 2-phenylbenzoxazole is indicated at 130, the spectrum for additive B is indicated at 132, and the spectrum for the product is indicated at 134.

Figure 20:
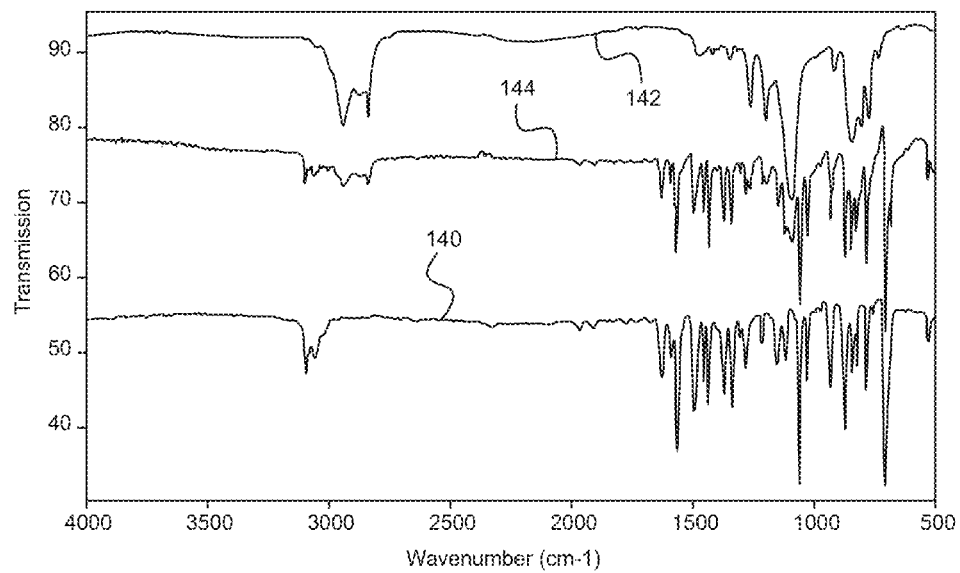
FIG. 20 is a FTIR spectra of 2,6-diphenyl[1,3]oxazolo[4,5-f][1,3]benzoxazole with additive B.

FIG. 20 illustrates the spectra of 2,6-diphenyl[1,3]oxazolo[4,5-f][1,3]benzoxazole with additive B. Only a small mass (~4 mg) of 2,6-diphenyl[1,3]oxazolo[4,5-f][1,3]benzoxazole was available for this test, so it was not possible to determine the solubility at the low volume. In particular, FIG. 20 shows the spectrum of 2,6-diphenyl[1,3]oxazolo[4,5-f][1,3]benzoxazole at 140, additive B at 142 and the mixture at 144. The mixture spectrum shows no signs of a reaction between the two reactants, only a mixture of them.

Figure 21:
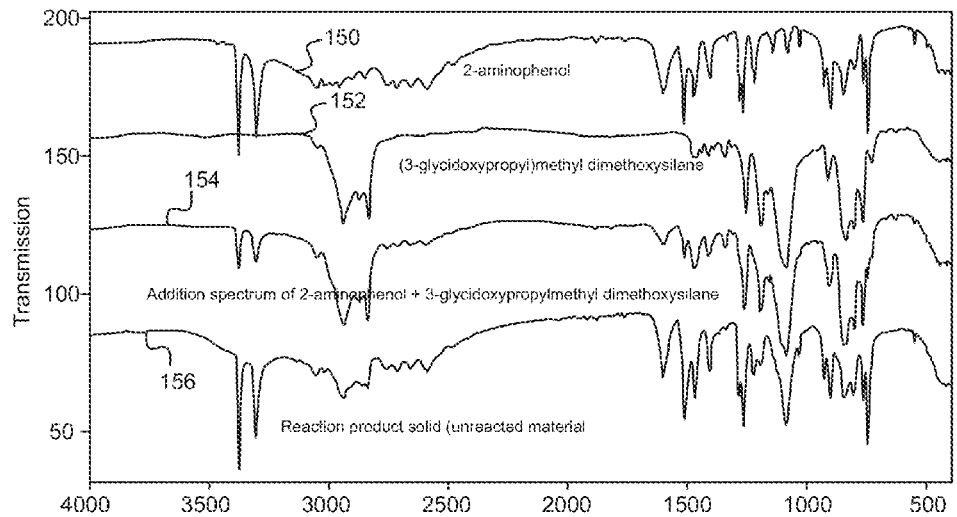
FIG. 21 is a FTIR spectra of 2-aminophenol with additive B (solid product)

FIG. 21 is a FTIR spectra of 2-aminophenol with additive B (solid product). The 2-aminophenol was not soluble in additive B; rather, it formed a yellow-brown slurry. After aging at 55° C. the solid in the mixture was yellow and the liquid was red and the solid was more dense than the liquid. The starting products and each phase of the resulting mixture were analyzed using FTIR. FIG. 21 shows the resulting solid product has the same spectrum as adding the products spectra together, this indicates there is no evidence of a reaction in the solid phase. In particular, the spectrum for 2-aminophenol is indicated at 150, the spectrum for additive B is shown at 152, the addition spectrum of 2-aminophenol and additive B is indicated at 154 and the spectrum of the resulting solid product is indicted at 156.

Figure 22:
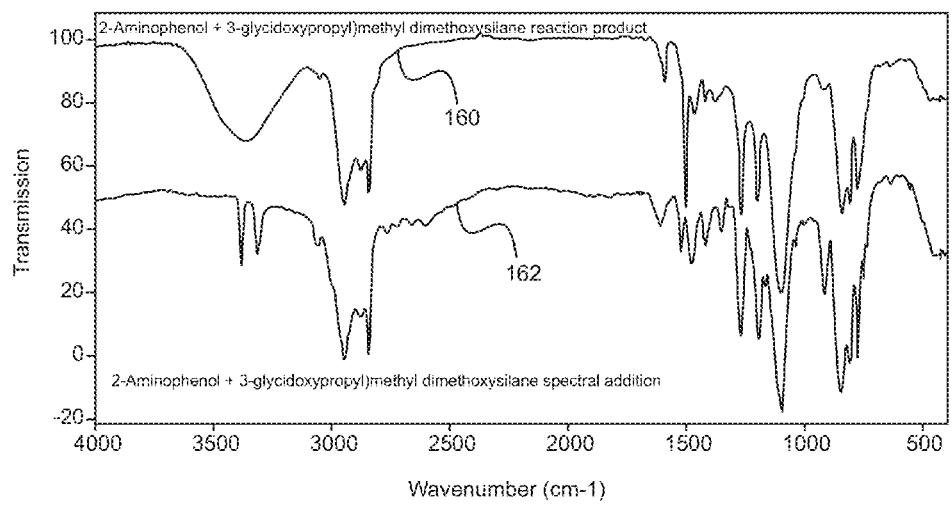
FIG. 22 is an FTIR spectra of 2-aminophenol with additive B liquid reaction product.
Figure 23:
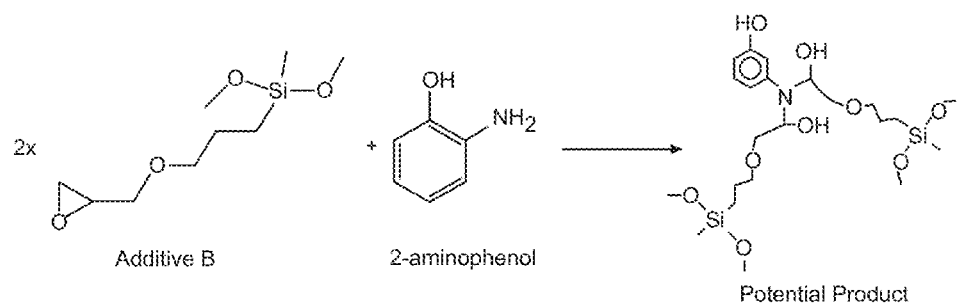
FIG. 23 illustrates one potential product of the 2-aminophenyl and additive B reaction.

FIG. 22 is an FTIR spectra of 2-aminophenol with additive B liquid reaction product. In particular, FIG. 22 shows the FTIR spectrum for the liquid reaction product does not match the FTIR product spectra, thus indicating a reaction has occurred. The spectrum for the reaction product of 2-aminophenol and additive B is indicated at 160. The spectrum for the addition product is indicated at 162. Intramolecular (chelation type) hydrogen bonding results in the very broad —OH envelope (3000-3600 $cm^{-1}$) in the 2-aminophenol spectrum. During the reaction, substitution of amine protons on 2-aminophenol removes the intramolecular hydrogen bonding resulting in —OH shift to ~3300 $cm^{-1}$ and narrowing of the envelope. This type of change in the FTIR spectrum suggests that additive B is substituting the amine protons and/or —OH groups of the 2-aminophenol. FIG. 23 illustrates a potential reaction product of additive B and 2-aminophenol.

Figure 24:
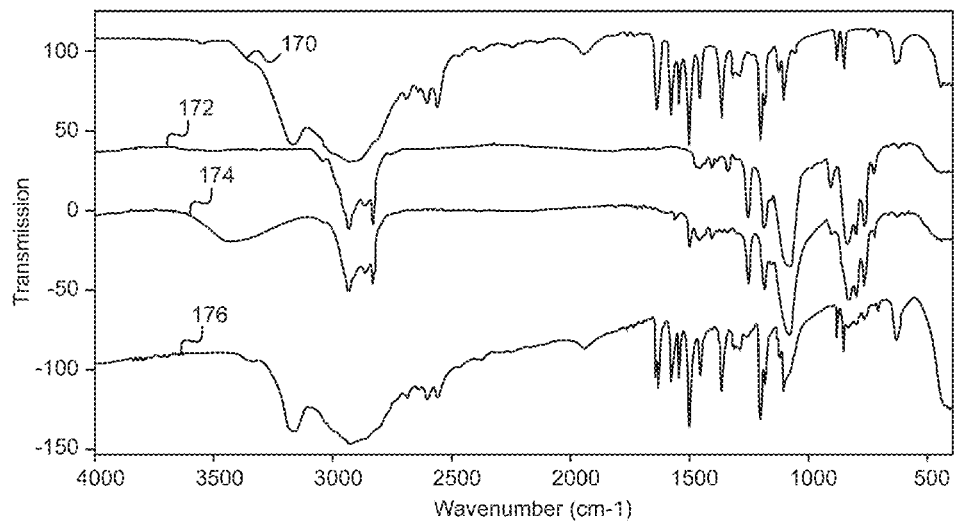
FIG. 24 illustrates a FTIR of 4,6-diaminoresorcinol dihydrochloride with additive B liquid and solid reaction products.

FIG. 24 illustrates a FTIR of 4,6-diaminoresorcinol dihydrochloride with additive B liquid and solid reaction products. The 4,6-diaminoresorcinol dihydrochloride was not soluble in additive B; rather, it formed a yellow-orange slurry. After aging at 55° C. the solid in the mixture was white and the liquid was red; the solid was more dense than the liquid. FIG. 24 displays the spectra of the reactants and both phases of the reactants. Much like the reaction with 2-aminophenol during this reaction, substitution of amine protons on 2,6-diaminoresorcinol dihydrochloride removes the intramolecular hydrogen bonding resulting in —OH shift to ~3300 $cm^{-1}$ and narrowing of the envelope. This type of change in the FTIR spectrum suggests that additive B is substituting the amine protons and/or —OH groups of the 2,6-diaminoresorcinol dihydrochloride. In particular, the spectrum of 4,6-diaminoresorcinol dihydrochloride is indicated at 170, the spectrum of additive B is shown at 172, the spectrum of 4,6-diaminoresorcinol dihydrochloride with additive B liquid is indicated at 174 and the spectrum of 4,6-diaminoresorcinol dihydrochloride with additive B solid is indicated at 176.

In general, the viscosity of additive B was shown to increase when in the presence of phosphoric acid due to a cross-linking reaction. A viscosity increase was also observed when additive B was put into contact with PBO fiber; it is hypothesized that the residual phosphoric acid in the fiber initiated the cross-linking reaction. The model compounds with amine functionality reacted with additive B. It was inferred from FTIR spectra that additive B substituted the amine protons or hydroxyl groups on the model compound to form a new larger molecule. This larger molecule could also give rise to an increase in viscosity.

In one embodiment of the invention, PBO fibers were analyzed using infrared and fluorescence spectroscopy before and after accelerated aging to determine the fiber degradation mechanism. Possible degradation products (i.e., model compounds) were also analyzed using the same techniques to populate an analytical fingerprint library. Using this method allows for positive identification of fiber degradation products if they match the model compounds. Fluorescence spectroscopy has not been previously used to determine PBO degradation. Researchers have studied the hydrolytic stability of the benzoxazole ring using alternate analytical techniques (G. A. Holmes K. R., 2006).

Fluorescence spectroscopy was performed using a Cary "Eclipse" fluorimeter. Fluorescence spectra of fiber samples were obtained using the Cary Eclipse Microplate Reader. Spectra were acquired at 5 nm excitation and emission slit widths. Bundles of fibers were expanded and placed into the microplate wells. Solution spectra were obtained using a standard 1 cm×1 cm fluorescence cuvette. The 90 degree excitation/sensing design of the instrument allows clear solutions to be scanned without the appearance of excitation wavelength scatter appearing in the resulting spectra. Due to the scattering nature of the fibers, these spectra exhibit significant excitation wavelength scatter.

Fluorescence scans were typically acquired over a range of excitation frequencies. These data were typically plotted using "Grams 3D" graphing software to depict the data three dimensionally as well as topographically, using contour plots. Due to the light scattering nature of fluorescence measurements on solid materials (i.e., fibers), spectral artifacts are often observed. The first, and often strongest, spectral artifact results from excitation frequencies that scatter from the sample and are seen by the fluorescence detector. These appear as strong, narrow peaks that increase in wavelength with each increase in excitation wavelength. A second order scattering effect is also often observed in which a series of strong, narrow peaks occur at twice the excitation wavelength. A third spectral artifact can be observed in strongly scattering samples. These artifacts result from a Raman scatter effect and are observed as a series of peaks that are typically offset from the excitation wavelength by a fixed wavelength difference. These peaks represent wavelengths of light that have been absorbed by the sample and re-emitted at a different wavelength. The offset in wavelength from the excitation peak for these features can be variable and is sample material dependent. The peaks can be observed as a series of peaks appearing a fixed distance from each first order excitation scatter peak. Note that the spectral artifacts discussed here often go completely unobserved in solution fluorescence measurements where the solution is clear (no turbidity).

FTIR and fluorescence spectroscopy were performed on all of the model compounds shown in FIGS. 17*a*-17*f* to create a library of FTIR and fluorescence fingerprints of possible PBO fiber and degradation product molecules.

Figure 25:
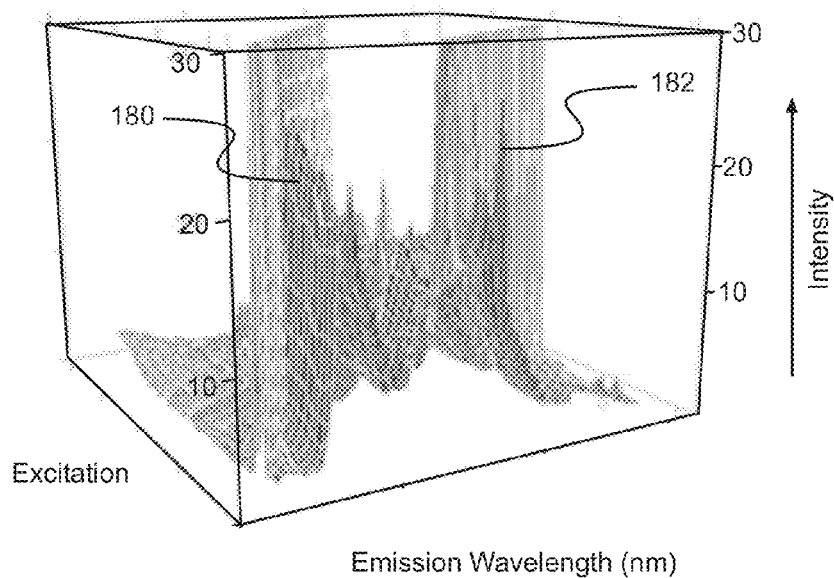
FIG. 25 is a three dimensional fluorescence spectrum of solid benzoxale.
Figure 26:
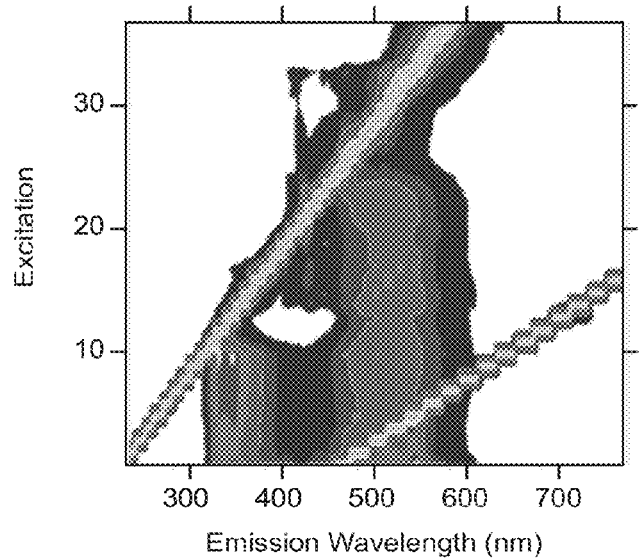
FIG. 26 is a two dimensional contour plot of the fluorescence spectrum of solid benzoxazole.

The three dimensional fluorescence spectrum of solid benzoxale is displayed in FIG. 25. A two dimensional contour plot of the same data is displayed in FIG. 26. The three dimensional plot includes three independent axis: excitation, emission wavelength, and intensity. There are two high intensity planes in the spectra that are artifacts of the measurement. One starts at the lowest excitation and emission wavelength and continues to increase in both of these variables; this is the wavelength of the excitation light source. The second high intensity plane starts at the lowest excitation and an emission wavelength of 470 nm; this plane is a 2 to 1 overtone of the light source wavelength. The important peaks to note are the peaks in the data at emission wavelengths of ~360 nm and ~550 nm, indicated at 180 and 182 in FIG. 25.

Figure 27:
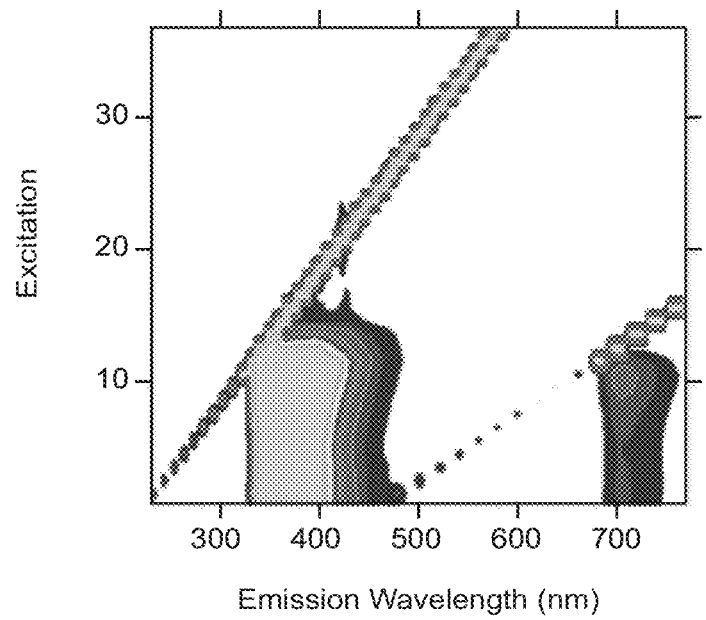
FIG. 27 is a two dimensional contour plot of the fluorescence spectrum of solid 2-phenylbenzoxazole.
Figure 28:
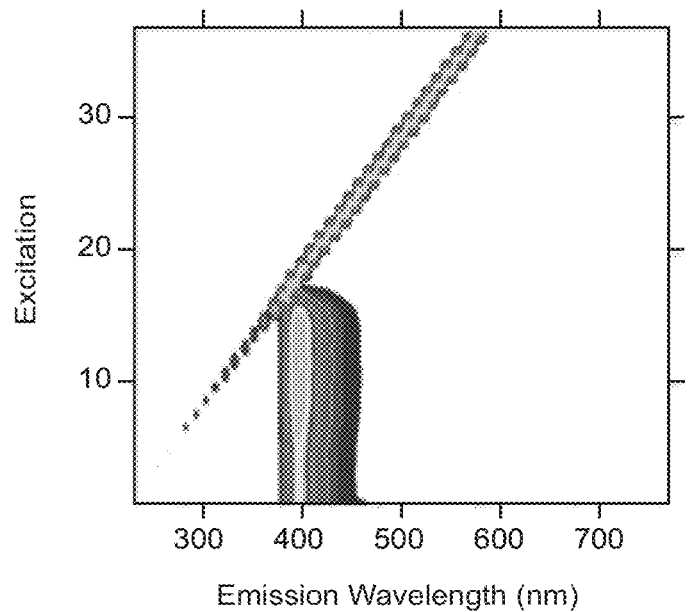
FIG. 28 is a two dimensional contour plot of the fluorescence spectrum of solid 2,6-diphenyl[1,3]oxazolo[4,5-f][1,3]benzoxazole.
Figure 29:
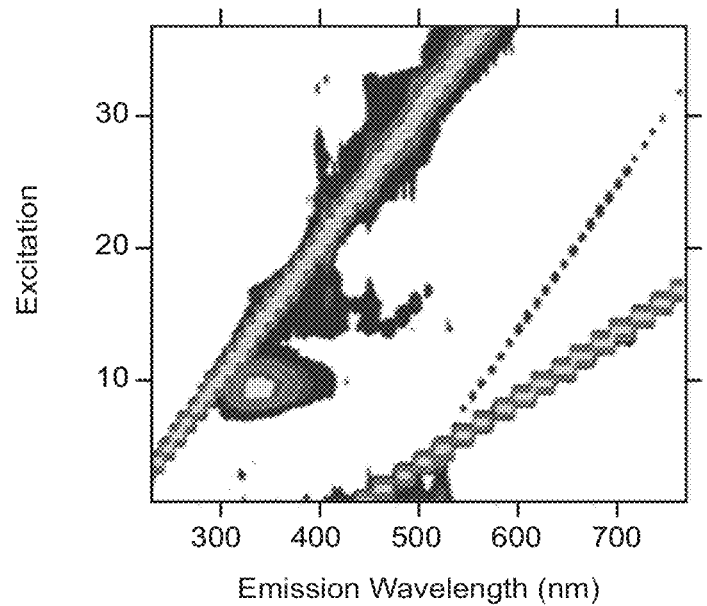
FIG. 29 is a two dimensional contour plot of the fluorescence spectrum of solid 2-aminophenol.
Figure 30:
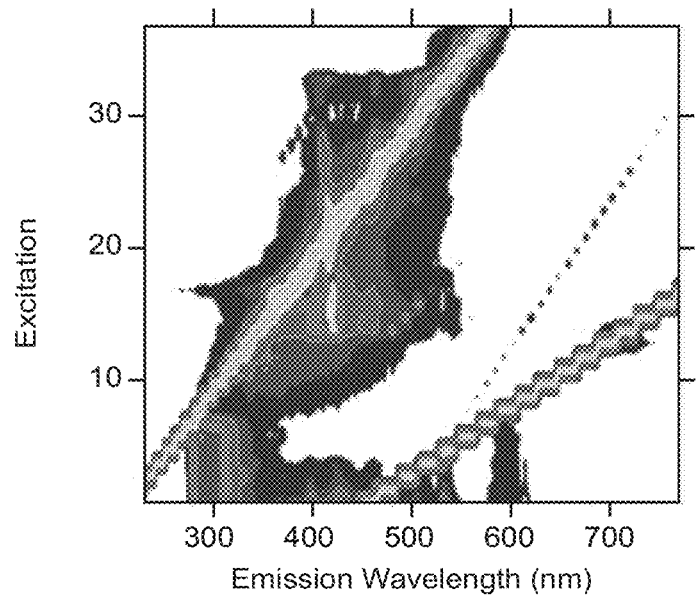
FIG. 30 is a two dimensional contour plot of the fluorescence spectrum of solid 4,6-diaminoresorcinol dihydrochloride.

The remainder of the solid model compounds two dimensional contour plot fluorescence spectra are displayed in FIG. 27 to FIG. 30. FIG. 27 is a two dimensional contour plot of the fluorescence spectrum of solid 2-phenylbenzoxazole. FIG. 28 is a two dimensional contour plot of the fluorescence spectrum of solid 2,6-diphenyl[1,3]oxazolo[4,5-f][1,3]benzoxazole. FIG. 29 is a two dimensional contour plot of the fluorescence spectrum of solid 2-aminophenol. FIG. 30 is a two dimensional contour plot of the fluorescence spectrum of solid 4,6-diaminoresorcinol dihydrochloride.

Figure 31:
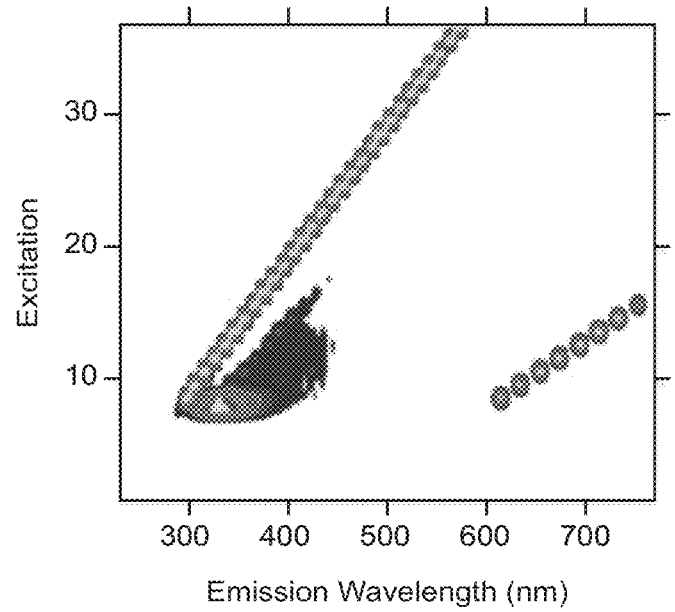
FIG. 31 is a two dimensional contour plot of the fluorescence spectrum of benzoxazole in methanol.
Figure 32:
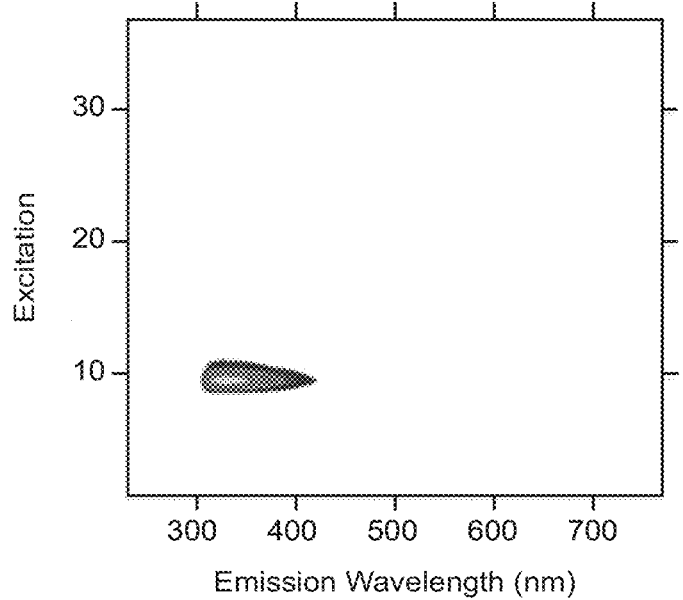
FIG. 32 is a two dimensional contour plot of the fluorescence spectrum of solid 2-phenylbenzoxazole in methanol.
Figure 33:
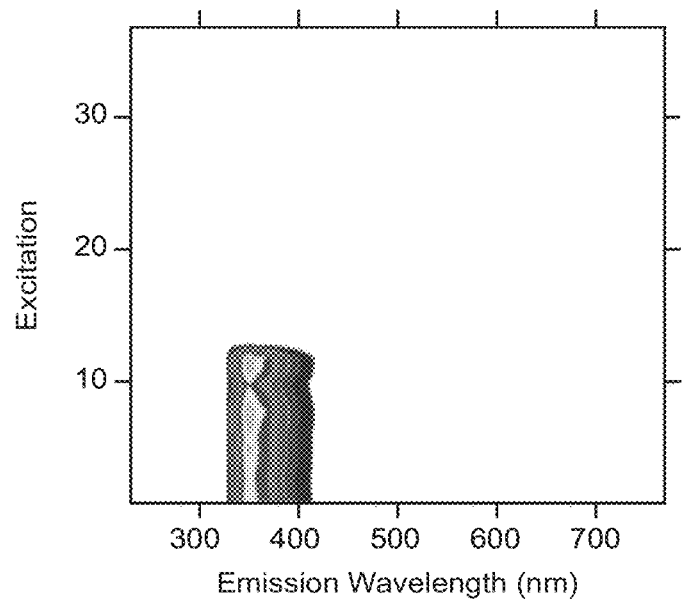
FIG. 33 is a two dimensional contour plot of the fluorescence spectrum of 2,6-diphenyl[1,3]oxazolo[4,5-f][1,3]benzoxazole in methanol.
Figure 34:
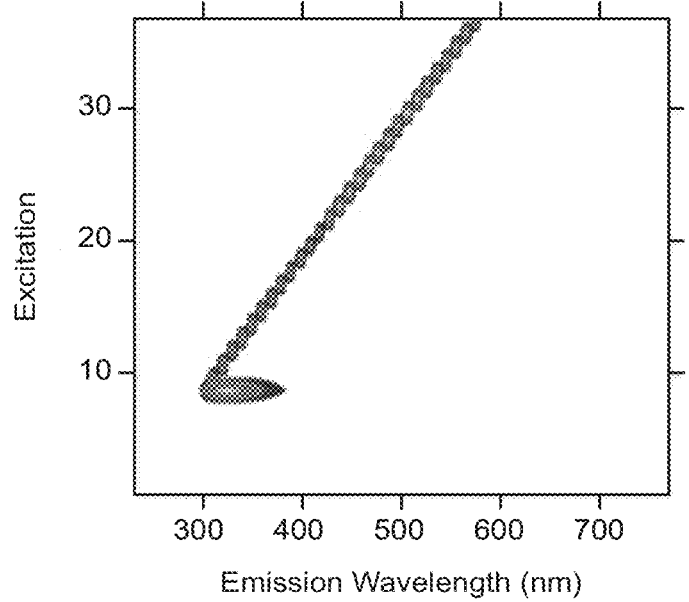
FIG. 34 is a two dimensional contour plot of the fluorescence spectrum of 2-aminophenol in methanol.
Figure 35:
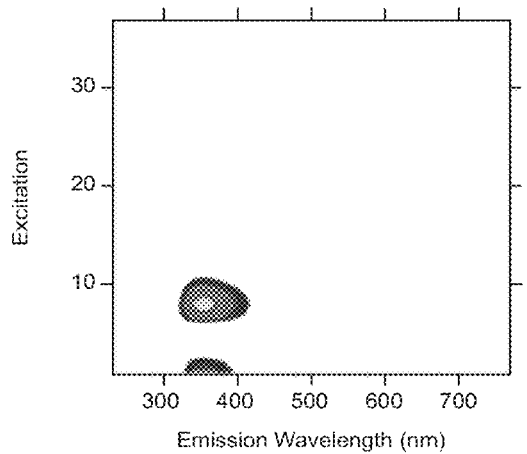
FIG. 35 is a two dimensional contour plot of the fluorescence spectrum of 4,6-diaminoresorcinol dihydrochloride in methanol.

The same model compounds, as shown in FIGS. 17a-17f, were dissolved in methanol and again measured for their fluorescence spectra. It was found that washing the PBO fibers with methanol was an important step in the procedure, so it was also important that the fluorescence spectra library was updated with the model compounds in methanol. The spectra for the compounds dissolved in methanol are displayed in FIG. 31 through FIG. 35. In particular, FIG. 31 is a two dimensional contour plot of the fluorescence spectrum of benzoxazole in methanol. FIG. 32 is a two dimensional contour plot of the fluorescence spectrum of solid 2-phenylbenzoxazole in methanol. FIG. 33 is a two dimensional contour plot of the fluorescence spectrum of 2,6-diphenyl[1,3]oxazolo[4,5-f][1,3]benzoxazole in methanol. FIG. 34 is a two dimensional contour plot of the fluorescence spectrum of 2-aminophenol in methanol. FIG. 35 is a two dimensional contour plot of the fluorescence spectrum of 4,6-diaminoresorcinol dihydrochloride in methanol.

Figure 36:
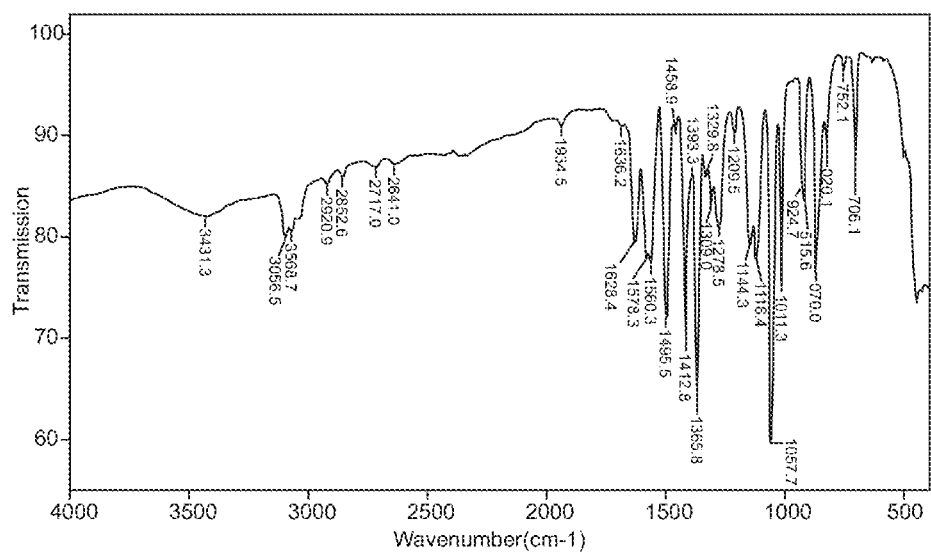
FIG. 36 is a FTIR spectrum of untreated/non-aged PBO fiber (AS0911)
Figure 37:
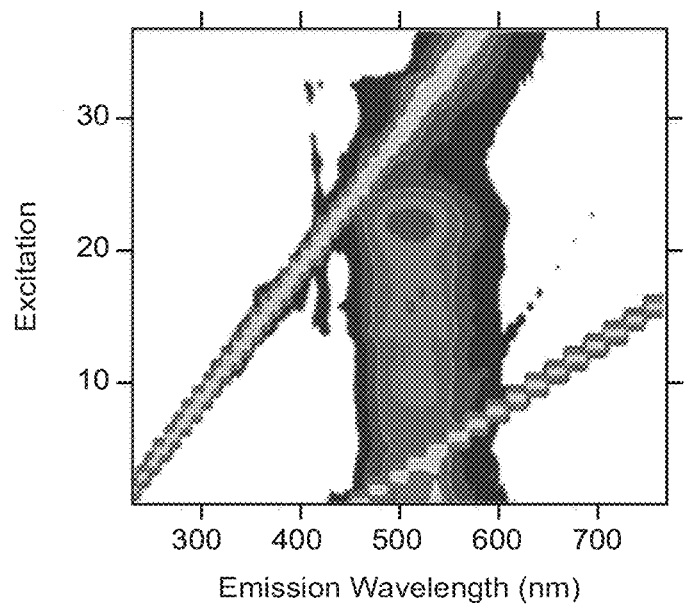
FIG. 37 is a two dimensional contour plot of the fluorescence spectrum of untreated/non-aged PBO fiber (AS0911)

Untreated and non-aged PBO fiber (AS0911) was analyzed by FTIR and fluorescence spectroscopy to establish baseline fingerprints. The FTIR and fluorescence spectra are shown in FIG. 36 and FIG. 37, respectively. The peak between emission wavelengths of 500-600 nm is similar to one of the peaks seen for solid benzoxazole. The benzoxazole molecule makes up part of the PBO polymer backbone structure.

The PBO fibers were washed with methanol, and the methanol wash was analyzed by fluorescence spectroscopy. The fluorescence spectrum is displayed in FIG. 38. The fluorescence of the methanol wash is different from the fiber. This indicates that methanol washes off degradation products from the outside of the fiber, but does not dissolve the fiber itself. The ~340 nm peak does not show up in the fiber spectrum because it is at very low intensity due to the number of degradation molecules on the surface of the fiber being much less than the number of fiber molecules. The fluorescence fingerprint did not match any of the model compounds.

Figure 39:
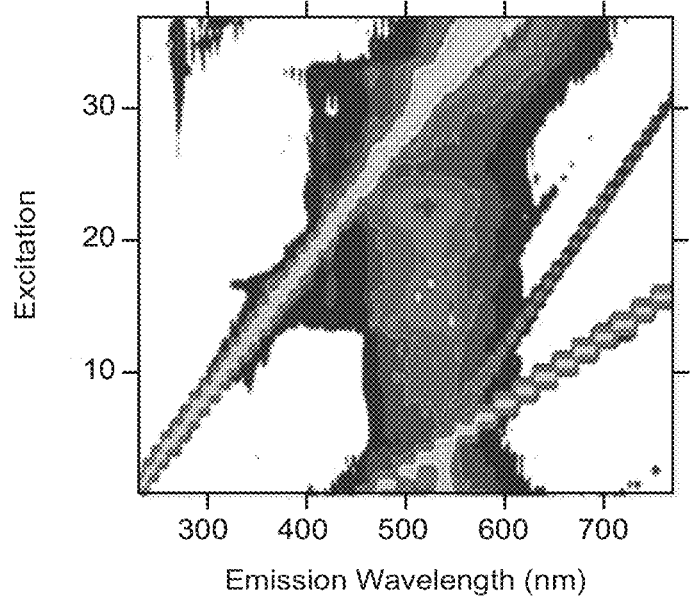
FIG. 39 is a two dimensional contour plot of the fluorescence spectrum of B+1' treated and 450 day aged (T/RH) aged PBO fiber (AS0910)

The PBO fibers were aged at high temperature and humidity to determine their degradation mechanism. Once the degradation mechanism is well understood, then a chemically sound degradation mitigation procedure can be implemented. PBO fibers were stored in a Webber Chamber at 70° C. and 90% RH to accelerate their natural degradation process. A PBO fiber sample (AS0910) was treated with additive B for 24 hours at 50° C. and 1 hour at 110° C. in an atmosphere of 2500 psig $CO_2$ (B+1 treatment) and then placed in the T/RH chamber to age. After 450 days in the T/RH chamber the fibers were taken out and analyzed by fluorescence spectroscopy, as shown in FIG. 39. The spectrum is similar to the untreated/non-aged fibers, except that the major peak was more spread out.

Figure 38:
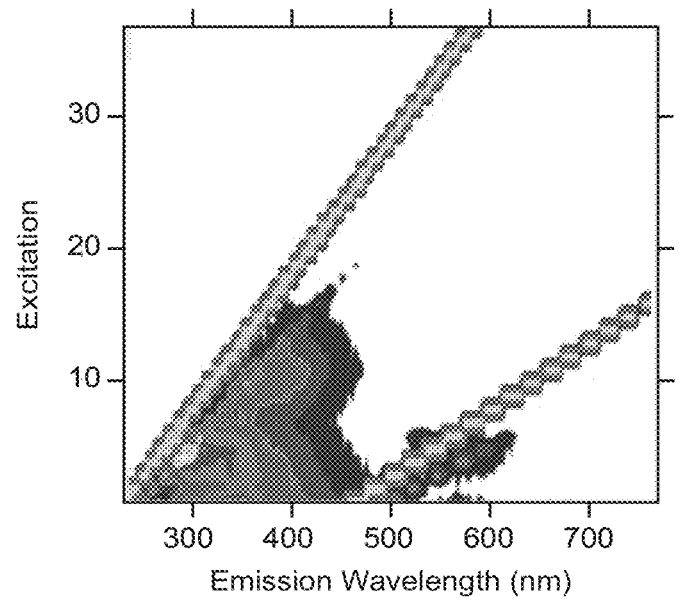
FIG. 38 is a two dimensional contour plot of the fluorescence spectrum of the methanol wash of untreated/non-aged PBO fiber (AS0911)
Figure 40:
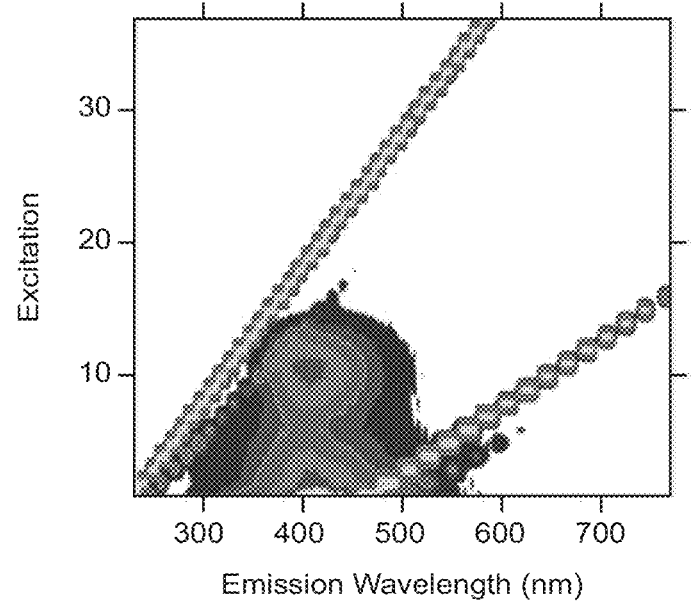
FIG. 40 is a two dimensional contour plot of the fluorescence spectrum of B+1' treated and 450 day aged (T/RH) aged PBO fiber (AS0910) methanol wash.

The PBO fibers were washed with methanol and the fluorescence spectrum was captured on the methanol wash, as displayed in FIG. 40. There are two peaks that center at the emission wavelength of 420 nm. These peaks are likely due to the degradation product of the high temperature/high humidity aging. None of the model compounds analyzed have peaks at the same emission wavelength as the T/RH degradation products of the PBO fiber, so the products were further analyzed using mass spectra techniques to determine their molecular structure. The two well defined peaks near 420 nm emission wavelength that were not visible in the spectrum for the unaged sample, as shown in FIG. 38.

Figure 41:
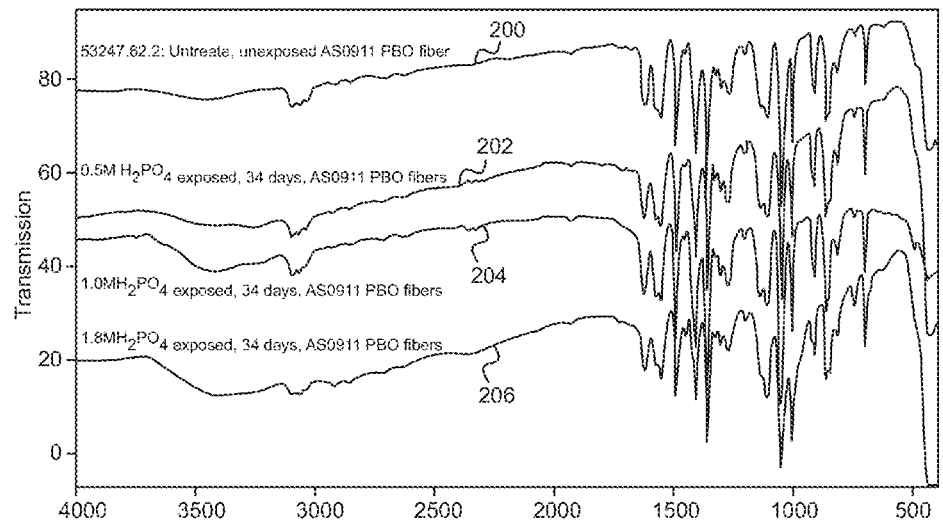
FIG. 41 is a FTIR transmittance spectra of untreated and 34 day phosphoric acid soaked PBO fibers (AS0911)

PBO fibers (AS0911) were aged in phosphoric acid to further increase the rate of accelerated aging from the T/RH aging. PBO fibers were soaked in phosphoric acid at three concentrations (0.5, 1.0, and 1.8M). The fibers were pulled out of the acid and analyzed at three time points (12, 34, and 70 days). The fibers were analyzed using FTIR transmission spectroscopy. As illustrated in FIG. 41, the spectrum for untreated PBO fibers is indicated at 200, the spectrum for PBO fibers exposed to 0.5M phosphoric acid for 34 days is indicated at 202, the spectrum for PBO fibers exposed to 1.0M phosphoric acid for 34 days is indicated at 204, and the spectrum for PBO fibers exposed to 1.8M phosphoric acid for 34 days is indicated at 206. All of the spectra show the same peaks in the same ratios. This indicates that there is no molecular difference between the bulk of the untreated and phosphoric acid soaked fiber. This may indicate that the potential degradation of the fiber is occurring primarily at the surface of the fiber in this experiment.

Figure 42:
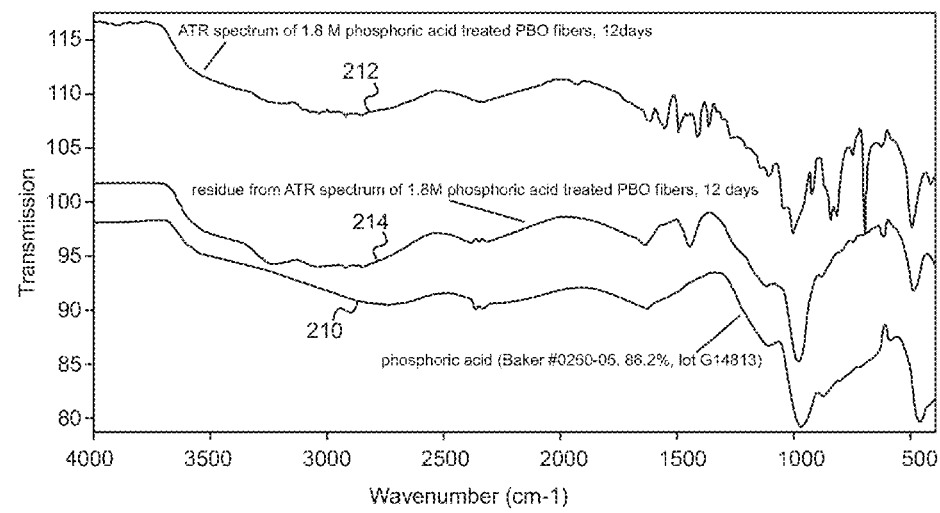
FIG. 42 is an infrared ATR spectra and residue from 1.8M phosphoric acid soaked PBO fiber (AS0911) along with a spectra of phosphoric acid.

Infrared ATR was used to analyze the surface of the untreated and phosphoric acid soaked fibers. The spectra from these analyses are displayed in FIG. 42. In particular, the spectrum for phosphoric acid is shown at 210, the spectrum for PBO fibers treated with 1.8M of phosphoric acid for 12 days is shown at 212, and the spectrum for the residue from the ATR spectrum of PBO fibers treated with 1.8M of phosphoric acid for 12 days is shown at 214. The spectra from the fiber 212 and the residue of the fiber 214 display characteristic bands of phosphoric acid. This surface technique shows that the surface of the fiber is covered with phosphoric acid. This result indicates that the phosphoric acid soaking of PBO fibers affects the surface to a greater extent than the bulk. This is likely due to the phosphoric acid only being absorbed into the surface layer, due to the duration of the soak, and rate of diffusivity of phosphoric acid into the PBO fiber at ambient conditions.

Figure 43A:
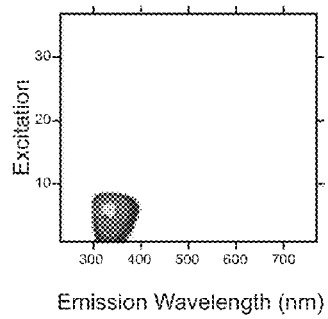
FIG. 43a illustrates a fluorescence spectra of PBO fiber with methanol washes after aging in 0.5M phosphoric acid for 12 days.
Figure 43B:
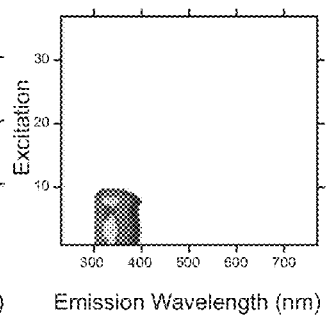
FIG. 43b illustrates a fluorescence spectra of PBO fiber with methanol washes after aging in 0.5M phosphoric acid for 34 days.
Figure 43C:
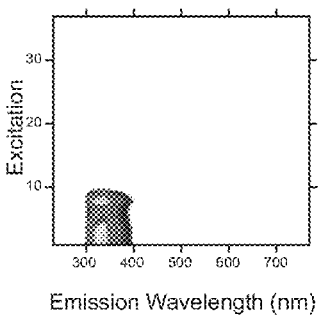
FIG. 43c illustrates a fluorescence spectra of PBO fiber with methanol washes after aging in 0.5M phosphoric acid for 70 days.
Figure 44A:
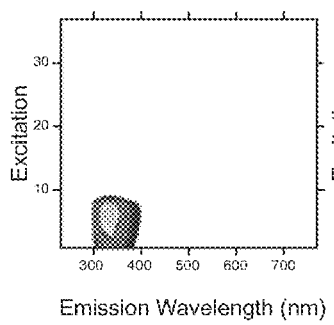
FIG. 44a illustrates a fluorescence spectra of PBO fiber with methanol washes after aging in 1.0M phosphoric acid for 12 days.
Figure 44B:
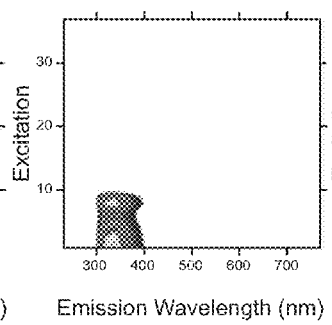
FIG. 44b illustrates a fluorescence spectra of PBO fiber with methanol washes after aging in 1.0M phosphoric acid for 34 days.
Figure 44C:
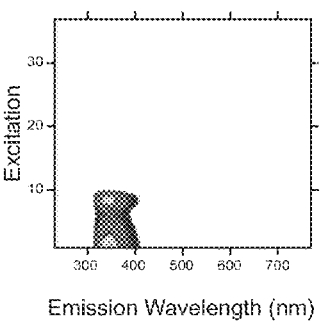
FIG. 44c illustrates a fluorescence spectra of PBO fiber with methanol washes after aging in 1.0M phosphoric acid for 70 days.
Figures 45A, 45B, 45C:
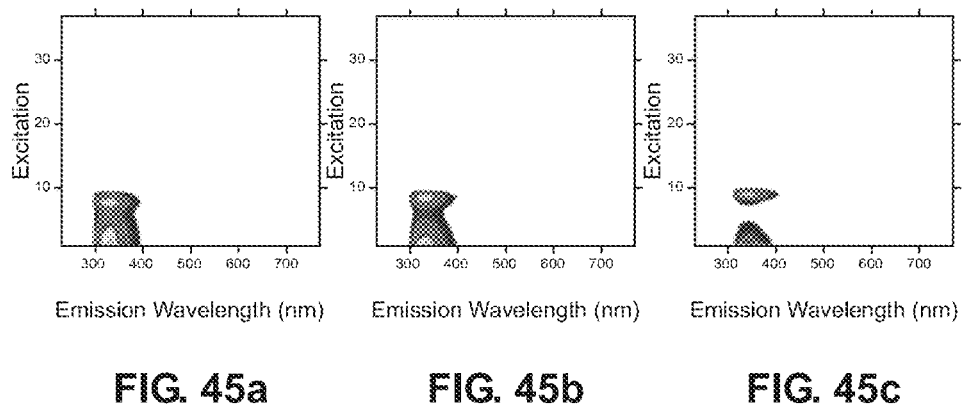
FIG. 45a illustrates a fluorescence spectra of PBO fiber with methanol washes after aging in 1.8M phosphoric acid for 12 days.
FIG. 45b illustrates a fluorescence spectra of PBO fiber with methanol washes after aging in 1.8M phosphoric acid for 34 days.
FIG. 45c illustrates a fluorescence spectra of PBO fiber with methanol washes after aging in 1.8M phosphoric acid for 70 days.

The PBO fibers were washed with methanol and analyzed by fluorescence spectroscopy to determine if degradation products undetected by FTIR could be detected. Fluorescence is more sensitive to low concentrations of molecules than infrared techniques. Fluorescence spectra of PBO fiber methanol washes after aging in 0.5M phosphoric acid for 12 days, 34 days and 70 days are shown in FIGS. 43a, 43b, and 43c, respectively. FIGS. 44a, 44b and 44c illustrate fluorescence spectra of PBO fiber methanol washes after aging in 1.0M phosphoric acid for 12 days, 34 days and 70 days, respectively. Further, FIGS. 45a, 45b and 45c illustrate fluorescence spectra of PBO fiber methanol washes after aging in 1.8M phosphoric acid for 12 days, 34 days and 70 days, respectively. All peaks in all of the spectra are at an emission wavelength of ~350 nm. The fluorescence spectra of fibers aged for a short time in a low molar acid concentration display a single peak, such as in FIG. 43a. However, as the time and/or acid concentration increased, the lone peak separated into two, such as in FIG. 45c. The PBO fiber degradation analysis via fluorescence spectroscopy appeared to exhibit a trend with respect to time, indicating that an unknown fiber could be characterized for extent of degradation using this technique.

Figure 46:
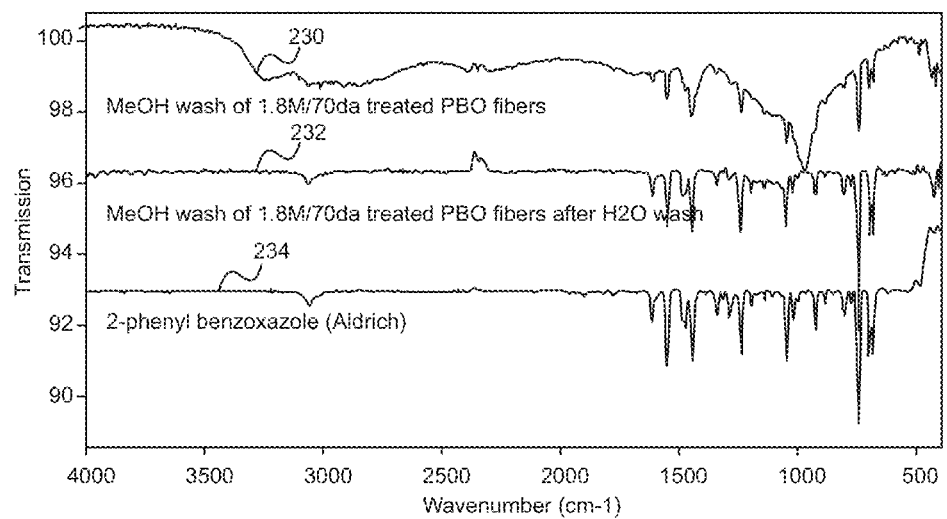
FIG. 46 is a FTIR spectra of a methanol wash of PBO fiber after phosphoric acid aging.

To determine what the degradation product was, the methanol wash was analyzed using FTIR. The FTIR spectra are presented in FIG. 46. The FTIR spectrum of the 1.8M, 70-day, acid-aged PBO fiber methanol wash is indicated at 230. Spectrum 230 did not match the spectra of any of the model compounds, but instead appeared to be a mixture of several molecules. To separate the molecules, the methanol wash was treated with water, to remove any water-soluble molecules. The remaining methanol solution was analyzed again by FTIR, as indicated at 232, and was found to be a match to the FTIR spectrum of 2-phenyl benzoxazole, as indicated at 234.

One of the degradation products of phosphoric-acid-aged PBO fiber is 2-phenyl benzoxazole.

Figures 47A, 47B, 47C:
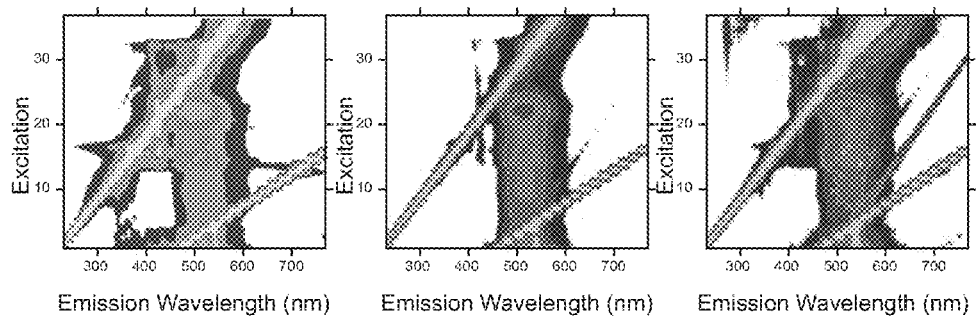
FIG. 47a is a two dimensional contour plot of the fluorescence spectrum of PBO fiber (AS0911) after a 1.8M phosphoric acid soak for 70 days.
FIG. 47b is a two dimensional contour plot of a fluorescence spectrum of PBO with no treatment and no aging.
FIG. 47c is a two dimensional contour plot of a fluorescence spectrum of PBO fiber with B+1' treatment and aged for 450 days.

Following the identification of the phosphoric acid soak degradation product, the remaining PBO fiber was analyzed. The fiber that was soaked in 1.8M phosphoric acid for 70 days was washed with methanol and the fiber was analyzed by fluorescence spectroscopy, as shown in FIG. 47a. It was found that the spectrum looked much like a non-aged fiber, as shown in FIG. 47b, but even more like a fiber that had been aged in T/RH for 450 days, as shown in FIG. 47c. These results indicate that even though the phosphoric acid soak degradation product was found on the surface of the fiber, there may have been some degradation of the bulk properties of the fiber as well.

Mass Spectra Studies were performed on T/RH-aged, untreated and B+1'-treated PBO fibers to postulate a degradation product. Untreated AS0910 fibers (97-2) and B+1-treated AS0910 fibers (97-3) were both exposed to 70° C./90% RH for 448 days. These fibers were then removed from the aging studies, washed with methanol, and the methanol extracts were then injected into a liquid chromatograph (LC)-mass spectral (MS) instrument (as specified in Table 4) for analysis.

TABLE 4

LC/Mass Spectrum Instrument Specifications.

| LC/MS/MS System | |
| --- | --- |
| HPLC | Agilent 1100 quaternary |
| Mass Spectrometer | Micromass Quattro II with Z-spray source |
| Mass Spectrometer Source | Electrospray, positive ion |
| Desolvation gas | Nitrogen at approximately 500 L/h |
| Source Temperature setting | 100° C. |
| Desolvation Temp setting | 250° C. |
| Mass Spec Resolution | Unit |
| Mass Spec software | Micromass MassLynx version 4.0 |
| Fluorescence Detector | Waters 474 |
| Analytical Column | Phenomenex Synergi Fusion-RP, 2 × 150 mm, 4 μm; fitted with MacMod Column Saver pre-filter |
| Column Temperature | Ambient |
| Mobile Phase Components | A = 0.1% formic acid in water<br>B = 0.1% formic acid in methanol |

| Gradient Profile | Time, min | % B |
| --- | --- | --- |
| | 0 | 60 |
| | 0.5 | 60 |
| | 3 | 100 |
| | 12 | 100 |
| | 12.1 | 60 |
| | 20 | 60 |
| Injection Volume | 5 μL | |
| Flow Rate | 0.25 mL/min, no split to MS | |
| Flow Path | HPLC → Fluorescence Detector → Mass Spec | |
| Run Time | 20 Minutes | |

Figure 48:
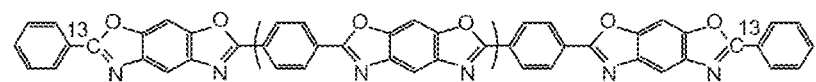
FIG. 48 illustrates the basic molecular structural components of a PBO fiber.
Figure 49A:
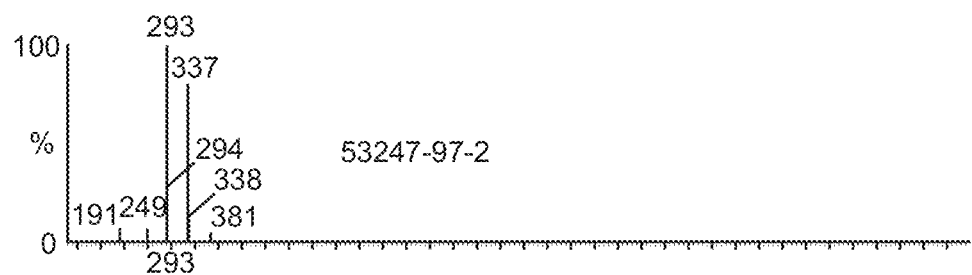
FIG. 49a illustrates the mass spectra analysis fragments from a methanol wash of as-received fibers (97-2)
Figure 49B:
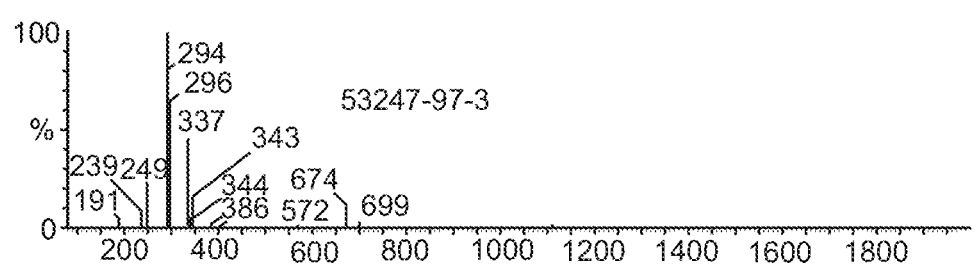
FIG. 49b illustrates the mass spectra analysis of B+1-treated fibers (97-3) aged for 448 days.

The basic molecular structural components of a PBO fiber are shown in FIG. 48. The mass spectra analysis fragments from the methanol wash of the as-received fibers (97-2) are shown in FIG. 49a and the mass spectra analysis of B+1'-treated fibers (97-3) aged for 448 days are shown in FIG. 49b.

Three major/minor mass spectra fragment peaks: 249,293/294 and 337/338 were observed in both samples along with several possibly related minor peaks in sample 97-3 (572, 674 and 111). The area under the curve for peaks 249, 293, and 337 (Table 5) and their % differences indicate that there may have been more fragmentation amounts of material occurring with the 97-2 sample than the B+1 treated sample (97-3).

TABLE 5

Area Under the Curve for Mass Peaks 249, 293, and 337.

| Mass Peaks | 97-2 Area | 97-3 Area | % Difference 97-2 & 97-3 Areas |
| --- | --- | --- | --- |
| 249 | 1628 | 1296 | 20% |
| 293 | 6100 | 5592 | 8% |
| 337 | 5177 | 4755 | 8% |

Figure 50:
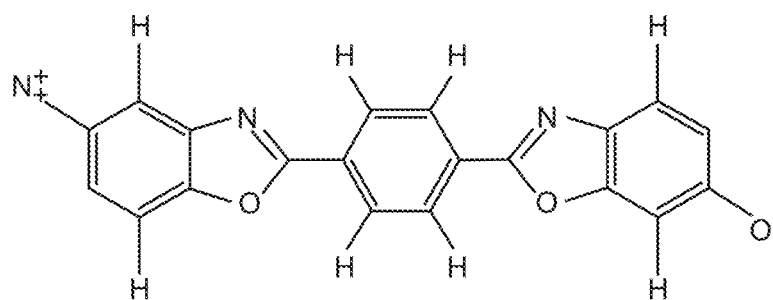
FIG. 50 illustrates the chemical structure for Mass Spectra Peaks 337/338.
Figure 51:
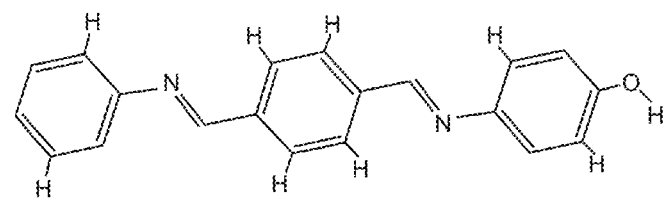
FIG. 51 illustrates the chemical structure for Mass Spectra Peaks 293/294.

From the results of the mass spectra, as shown in FIGS. 49a and 49b, one can postulate what the molecular structures might look like for each of the more significant peaks identified in the analysis. For example, mass spectra 337/338 could have a structure represented in FIG. 50 while peaks 293/294 could have the structure shown in FIG. 51.

Peaks 337×2=674; 293×2=586-nitrogen (14)=572; and 1111/2=555+OH (17)=572 ($C_{35}H_{16}N_4O_5$) are represented as small peaks in FIG. 49b. This could indicate that there may be a relationship among all these peaks and structures. There is no such relationship with the mass peak 249 which may have a different origin and structure than the other fragments.

Figure 52A:
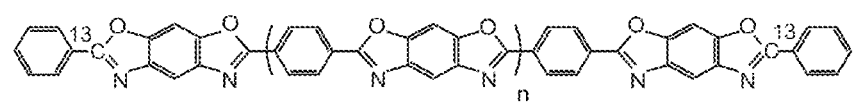
FIG. 52a is a structure for PBO.
Figure 52B:
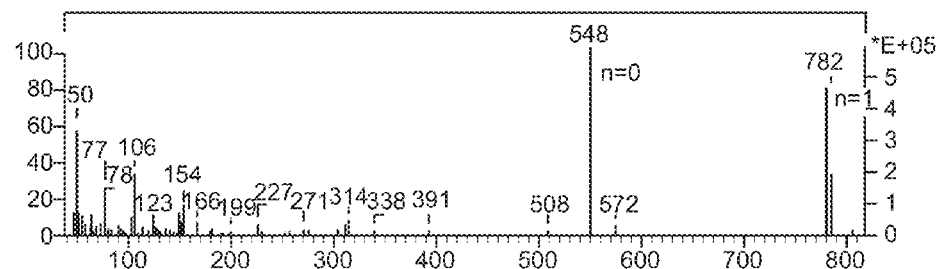
FIGS. 52*b* and 52*c* illustrate Mass Spectra of PBO Intermediate Molecular Structures.
Figure 52C:
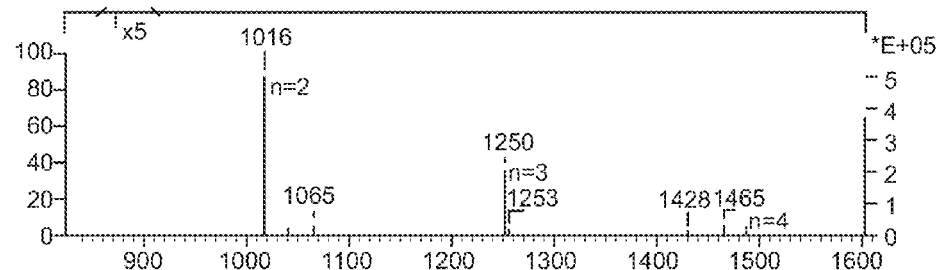

Several model compounds of the PBO structure were synthesized and then analyzed with a mass spectrometer as set forth in an article (So, 1998). The results from this study are shown in FIGS. 52b and 52c. FIG. 52a is a structure for PBO. The major peaks identified in FIGS. 52b and 52c (So, 1998) (1250, 1016, 782, 548, 314) show a pattern in that a simple mass difference of 234 for each major peak accounts for the next corresponding lower major mass peak in the spectra (1250−1016=234; 1016−782=234; 782−548=234; 548−314=234).

A possible new way to determine the end of life of a bulletproof jacket that has seen an extended exposure to T/RH has been determined. A methanol extraction of the fibers results in a compound that has a 400 nm fluorescence peak which may be used to quantify the amount of compound(s) present in the fibers and determine its exact structure from FTIR and mass spec analysis. At the very least we will be able to compare a field sample mass spec with the mass spectra peaks we observed by aging fibers at T/RH conditions. This would result in a relationship between artificial aging and actual field sample environments.

In one embodiment, degradation products for acid-aged and T/RH-aged fibers were identified using fluorescence spectroscopy and liquid chromatography/mass spectroscopy, respectively. It was found by fluorescence spectroscopy and confirmed by infrared transmission spectroscopy that one of the degradation products of phosphoric acid treated PBO fiber was 2-phenyl benzoxazole (one of the model compounds). The PBO fiber degradation analysis via fluorescence spectroscopy appeared to exhibit a trend with respect to time, indicating that an unknown fiber could be characterized for extent of degradation using this technique. The phosphoric acid soak degradation product was found primarily on the surface of the fiber, but there was some degradation evidence of the fibers' bulk properties as well. A methanol wash technique and fluorescence spectroscopy analysis protocol was proven effective to study the PBO fiber phosphoric acid aged degradation products.

Fluorescence spectroscopy was used to identify a different degradation product for the T/RH-aged PBO fiber, but in this case the fluorescence pattern did not match one of the model compounds, and infrared transmission spectroscopy could not isolate the exact molecule. The T/RH-aged PBO fiber mass spectra results are very preliminary but the literature results for PBO model compounds suggest that this should be one of the best methods to determine what degradation products or mass spectra fragments are being produced from the effects of accelerated aging on both the untreated and treated fibers. If the mass spectra results for the aged treated fibers are correct, in that there appears to be less fragmentation or damage with these samples than the untreated fibers, then this could also correlate with the mechanical strength data that shows less degradation with the epoxy silane treatment than no treatment at all.

Temperature, humidity, and acid exposure of PBO fiber were analyzed to identify and characterize the degradation mechanism. The PBO fiber treatment procedure was carefully planned for repeatability from batch to batch. Some of the variables considered were stress on the fiber during transfer, concentration of additive B in $scCO_2$, and timing and storage of fibers before and after treatment. PBO fiber treatment was performed by exposing the fibers to an atmosphere of $scCO_2$ saturated with additive B.

In preparation for $scCO_2$ treatment, the PBO fiber to be treated was transferred from the source spool to stainless steel (SS) spools suitable for $scCO_2$ processing. This was performed with a custom built winding system that allows the loading spool to rotate at variable speeds while a carriage traverses the length of the loading spool at variable speeds determining the winding angle of the fiber. The speed of rotation of the loading spool, and the speed of the carriage are independently controlled to provide greater control of winding angle. The winding and carriage speeds were selected such that a large winding angle was achieved as to create the greatest angle between layers of fiber to minimize nesting of one roving into another and maximize porosity for $CO_2$ penetration. Each SS spool was loaded with ~937" of PBO fiber roving. Once loaded, the spools are transferred into the high pressure vessel for $scCO_2$ processing.

During the $scCO_2$ PBO fiber processing, the SS spools were loaded into the autoclave along with the specified amount of additive B. In some embodiments, the amount of additive B added to the autoclave was 10 wt. % of the PBO fiber. Depending on the free volume in the autoclave, this approach gives a variable concentration of additive B in the $scCO_2$ atmosphere. Additive B has a saturation percentage in $scCO_2$, so it is important to include enough additive B in the autoclave to reach saturation and ensure that the fiber is in contact with the maximum concentration of additive B possible. In another embodiment, the amount of additive B added to the autoclave was determined by the free volume in the autoclave, and not the weight of the fiber. This optimization of the fiber treatment allows for the fiber to interact with the same concentration of additive B. The fibers were pressurized to 2,500 psig and heated to 50° C. and held for 24 hours. The system temperature was then increased to 110° C. and held at 110° C. and 2,500 psig for an additional hour, at which time the pressure was released and the fiber was removed from the autoclave. The name for this treatment was B+1', due to incorporating additive B and applying high temperature for an additional 1 hour, after the 24 hour soak. Once the SS spools were removed from the autoclave, the fibers were transferred to black plastic spools for storage or accelerated aging.

Accelerated aging of PBO fibers was accomplished in a Webber Chamber. Temperature and humidity were set and maintained at 70° C. and 90%, respectively. Minimal light was allowed in the chamber at any given time. Fibers that were not aged in an accelerated fashion were placed in a desiccant cabinet maintained at 23° C.

Additional information was collected on the physical and morphological changes of the PBO fibers. Scanning Electron Microscopy (SEM) images were collected of treated and untreated fibers that were both unexposed and exposed to elevated temperature and relative humidity to provide visual data on the changes in morphology due to various effects.

Representative PBO fibers were cut and placed on pure carbon adhesive tabs fixed to aluminum stubs. All samples were sputter coated with gold. Each sample was examined in a JEOL JSM-7600F field emission scanning electron microscope. A variety of accelerating voltages and magnifications were used to image the PBO fibers.

An SEM micrograph of the AS0911 PBO fiber is shown in FIG. 53. This image was collected on an unexposed, untreated fiber sample to document the baseline morphology. The only observable feature from this baseline sample is a simple kink band. Kink bands in PBO fibers have been observed in the literature (H. G. Chae, 2006). Kinking is a non-catastrophic failure under compressive stress that is common in rigid-rod polymeric fibers.

FIG. 54a shows a treated, 120-day exposed PBO fiber sample and FIG. 54b shows an untreated, 120-day exposed PBO fiber sample. Both of these images show the presence of kink bands similar to the baseline sample of FIG. 53. Also, the treated sample has a similar, smooth, defect-free surface morphology to the baseline sample. However, the untreated sample has a very different surface morphology. It can be seen in FIG. 54b that there are long defects parallel to the fiber axis that are clearly observable in the untreated sample. These defects are in agreement with observations by Walsh and co-workers (P. J. Walsh, 2006).

Walsh focused on the physical aspects of fiber degradation because they hypothesized that any environmental factor, which can loosen the structure of PBO fibers, such as introducing a defect on the fiber surface or inside the fiber, weakening the interfacial adhesion between fibrils and crystals, will decrease the mechanical properties of PBO fiber. This is plausible since defects and voids from processing serve as fracture initiation sites. Furthermore, as Walsh pointed out, relatively weak van der Waals forces acting between chains can allow slippage of fibrils. Therefore, the presence of microvoids or the interconnectivity between fibrils and microvoids may alter the morphology and influence the mechanical properties of PBO fibers.

Walsh compared SEM micrographs of fiber surfaces of undegraded PBO fiber with fiber exposed to liquid-water for 270 days at 50° C. and PBO AS fiber exposed to 90% relative humidity at 50° C. for 270 days. In both exposures, the development of long defects parallel to the fiber axis was observed. It was postulated that these surface defects were a result of voids increasing in size with water exposure and breaking through the fiber surface. This change in fiber structure was attributed to causing the drop in mechanical properties.

It was also suggested that even small concentrations of phosphoric acid may accelerate the growth of defects and loss of strength by separating fibrillar elements within the fiber structure. Infrared analysis evidence suggested that a chemical reaction was occurring upon exposure to phosphoric acid. Although, the exact chemical degradation mechanism could not be determined, it was suggested that hydrolysis of the oxazole ring is the most likely route.

Information on the physical and morphological changes of the PBO fibers was gathered via SEM. It was seen from this visual evidence that the surface morphology of the treated samples (FIG. 54a) was nearly identical to that of the untreated and non-aged samples (FIG. 53) even after 120 days of exposure to elevated temperature and relative humidity. More striking was the difference between treated and untreated samples (FIGS. 54a and 54b). The untreated samples had observable, long defects parallel to the fiber axis after 120 days of exposure, as shown in FIG. 54b, that were not present in the treated samples during the same duration of exposure, as shown in FIG. 54a. These observations were confirmed in the literature where Walsh and co-workers (P. J. Walsh, 2006) postulated that these surface defects were a result of voids increasing in size with water exposure and breaking through the fiber surface that caused a drop in mechanical properties. Therefore, the treatments applied to the PBO fibers prevent the formation of surface defects by either suppressing void growth or preventing water diffusion into the fiber.

Another aspect of the invention is directed to employing the modified PBO fibers in lightweight soft armor systems, such as combat helmets and other body armor. The typical energy absorbing mechanism for fibers is dependent on their ability to have high strength and high elongation to failure. It is well known that the strain is equal to the impact velocity divided by the sonic velocity of the fiber. It is also well known that the sonic velocity, c, is related to the modulus of the fiber, E, and the density of the fiber, $\rho$, as:

$$c = \sqrt{\frac{E}{\rho}}$$

Therefore, the densities of the baseline and the exposed samples (treated and untreated) need to be collected so that the sonic velocities of the fibers can be calculated and correlated to the morphology observations. Additionally, observed changes in mechanical properties and sonic velocity need to be correlated with ballistic performance in a similar manner reported in the literature by Holmes and co-workers (G. A. Holmes J. S., 2010).

In addition, the mechanical properties of three sets of PBO fibers were analyzed: untreated fiber aged at 70° C./90% RH, fiber treated in scCO$_2$ B+1' then aged at 70° C./90% RH, and untreated fiber aged in 1.8M phosphoric acid. Aging time was measured in days. Further, baseline samples of untreated and scCO$_2$/B+1' treated fiber were tested without aging and are considered "Day 0" data. Fibers were pulled in tension until failure with an Instron and the modulus, tenacity, and strain at maximum load were analyzed.

In preparation for tensile testing, 43.2 cm length sections of PBO roving were spooled off the black spools, and taped at both ends to create tabs. Each section of roving, now at 40.6 cm, due to 1.3 cm of tape at both ends, was twisted 16 complete times to provide a twist factor of 5.1 as was determined to be optimal. These samples were then taped, at the tabs, to a piece of cardboard and placed in a desiccant cabinet at 23° C. overnight to acclimate prior to testing.

Figure 55:
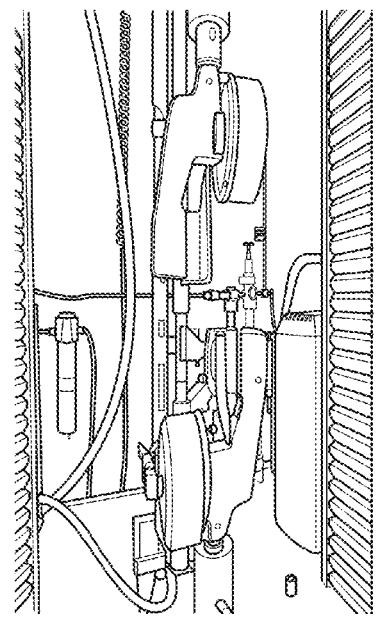
FIG. 55 is an image of an Instron set-up with PBO fiber roving loaded.

Tensile testing was performed using an Instron 5564 tabletop tensile tester with a 1 kN load cell. Tests were conducted on twisted roving specimens using a crosshead velocity of 10 mm/min and a gauge length of 122 mm total length or 25.4 mm grip distance. FIG. 55 shows a picture of the PBO fiber roving loaded on to the Instron set-up for tensile testing.

Figure 56:
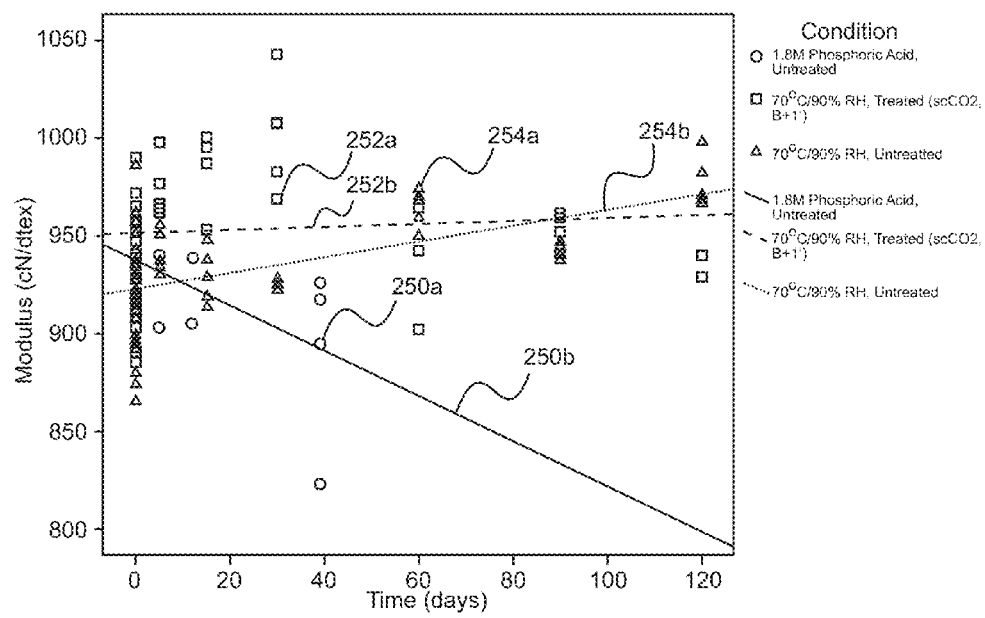
FIG. 56 is a plot of the modulus of aged PBO fiber (AS0911) as a function of aging time for three different treatments.
Figure 57:
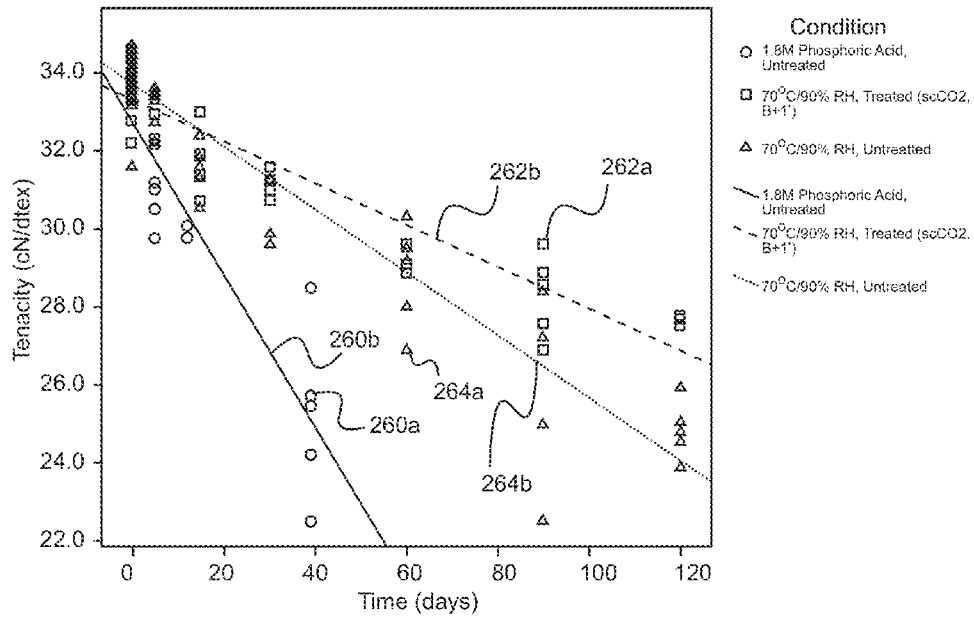
FIG. 57 is a plot of the tenacity of aged PBO fiber (AS0911) as a function of aging time for three different treatments.
Figure 58:
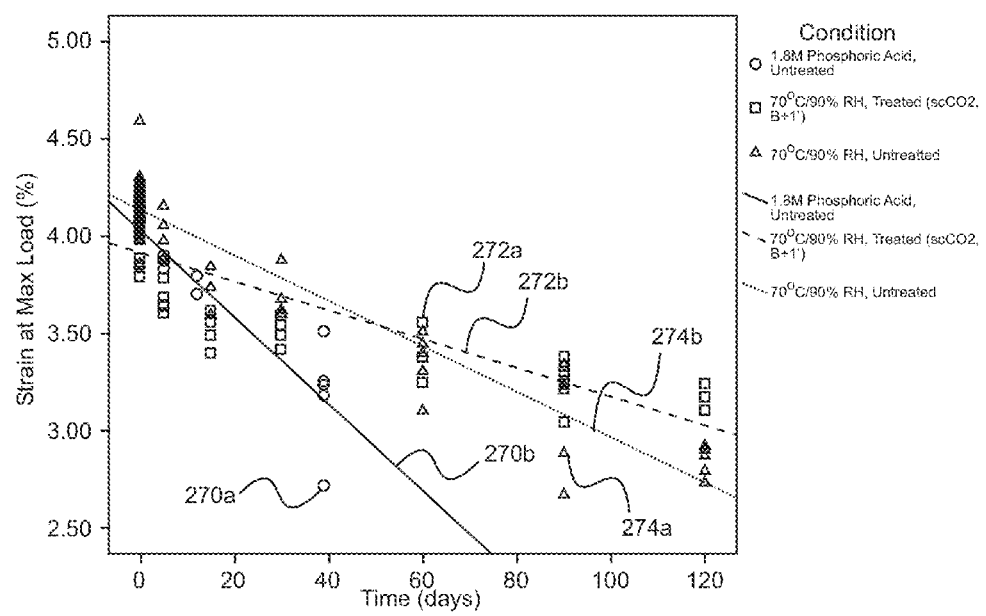
FIG. 58 is a plot of the strain at max load of aged PBO fiber (AS0911) as a function of aging time for three different treatments.

Plots of the fiber modulus, tenacity, and strain at max load versus time are shown in FIGS. 56, 57 and 58, respectively. In FIG. 56, representative data point 250a and corresponding slope line 250b indicate fibers aged in 1.8M phosphoric acid. The representative data point 252a and corresponding slope line 252b indicate treated fibers aged at 70° C./90% RH. In addition, the representative data point 254a and corresponding slope line 254b indicate untreated fibers aged at 70° C./90% RH. The modulus, tenacity, and strain all decrease dramatically over time for fibers aged in phosphoric acid as compared to fibers aged at 70° C./90% RH. The slopes of the lines for fibers aged in phosphoric acid show a statistically significant difference (alpha=0.05) from the slopes of the other fibers.

A comparison of the B+1' treated and untreated fiber is more complex. The modulus of all fibers aged at 70° C./90% RH (treated and untreated) increases slightly with time. For the treated fibers, this increase is not statistically significant, but it is statistically significant for the untreated samples. However, the graph in FIG. 56, and related analysis, includes all baselines as Day 0 data. If only the baselines run on the actual Day 0 of the testing are used for Day 0 in the regression analysis, then the slopes for treated and untreated samples are not statistically significant (essentially zero slope) and are not significantly different from each other. The slopes shift because original untreated Day 0 data mean modulus is nearly two standard deviations above the overall baseline mean, while the treated Day 0 mean modulus is less than 0.5 standard deviations above the overall baseline mean. One explanation for this difference is that the samples came from the outermost layer of the spool, which could have experienced different aging conditions (e.g., UV), compared to the fibers protected underneath. The modulus data also are noisy, with the range of observations greater than 10% of the mean modulus for both treated and untreated samples.

The choice of whether to include all baseline tests as Day 0 data has less impact on tenacity because the Day 0 data are clustered much more tightly. All of the conditions showed a decrease in tenacity with aging time. As shown in FIG. 57, there is a clear progression in the rate of decrease of tenacity. In particular, FIG. 57 shows representative data point 260a and corresponding slope line 260b that indicate fibers aged in 1.8M phosphoric acid. The representative data point 262a and corresponding slope line 262b indicate treated fibers aged at 70° C./90% RH. In addition, the representative data point 264a and corresponding slope line 264b indicate untreated fibers aged at 70° C./90% RH. The B+1' treated samples had the slowest rate of decrease, as indicated by 262b, followed by the untreated samples aged at 70° C./90% RH, as indicated at 264b. The samples aged in phosphoric acid showed the greatest rate of decrease, as shown at 260b, with a slope more than double the slope of the untreated samples. All of the differences in slope were statistically significant, thus indicating that the scCO$_2$ B+1' treatment had a significant effect of decreasing the rate at which fiber tenacity decreases.

The strain, as shown in FIG. 58, like the tenacity, showed little difference between the analysis with or without all of the baselines as Day 0 data. Similar to tenacity, the strain for all sample conditions decreases with time. In particular, FIG. 58 shows representative data point 270a and corresponding slope line 270b that indicate fibers aged in 1.8M phosphoric acid. The representative data point 272a and corresponding slope line 272b indicate treated fibers aged at 70° C./90% RH. In addition, the representative data point 274a and corresponding slope line 274b indicate untreated fibers aged at 70° C./90% RH. The B+1' treated fibers, as indicated at 272b, have the slowest rate of decrease, followed by the untreated fibers, as indicated at 274b. The fibers aged in phosphoric acid have the greatest rate of decrease in strain, as indicated at 270b. All of the differences in slope were statistically significant. The fit lines for the treated and untreated fibers aged at 70° C./90% RH crossed over near 60 days, with the strain being slightly lower on average in the treated fibers at shorter times. At 120 days, the treated samples were clearly higher in strain than the untreated samples. These data indicate again that the scCO$_2$ B+1' treatment had a significant effect on extending the life of the fiber due to a slower rate of decease of the percent strain at max load.

Examination of the Day 0 data in FIGS. 56-58 also raises the question of differences between the treated and untreated baselines, which appear as Day 0 data in the figures. The baselines were collected over a period of two months leading up to the start of the aging tests. As shown in Table 6 below, there are small but statistically significant differences between the means of the treated and untreated data. The treated fibers have a higher modulus and lower tenacity and strain than the untreated fibers. The differences in modulus and tenacity are significant at the 95% confidence level. The difference in the strain is significant at the 99.9% confidence level.

TABLE 6

Comparison of means of baseline data

| Variable | Mean, B + 1' Treated | Mean, Untreated | t-test for difference (values <0.05 are significant) |
|---|---|---|---|
| Modulus ($cN/dtex$) | 936.3 | 921.3 | 0.042 |
| Tenacity ($cN/dtex$) | 33.62 | 33.98 | 0.037 |
| Strain at Max Load (%) | 4.035 | 4.187 | <0.001 |

Figure 59:
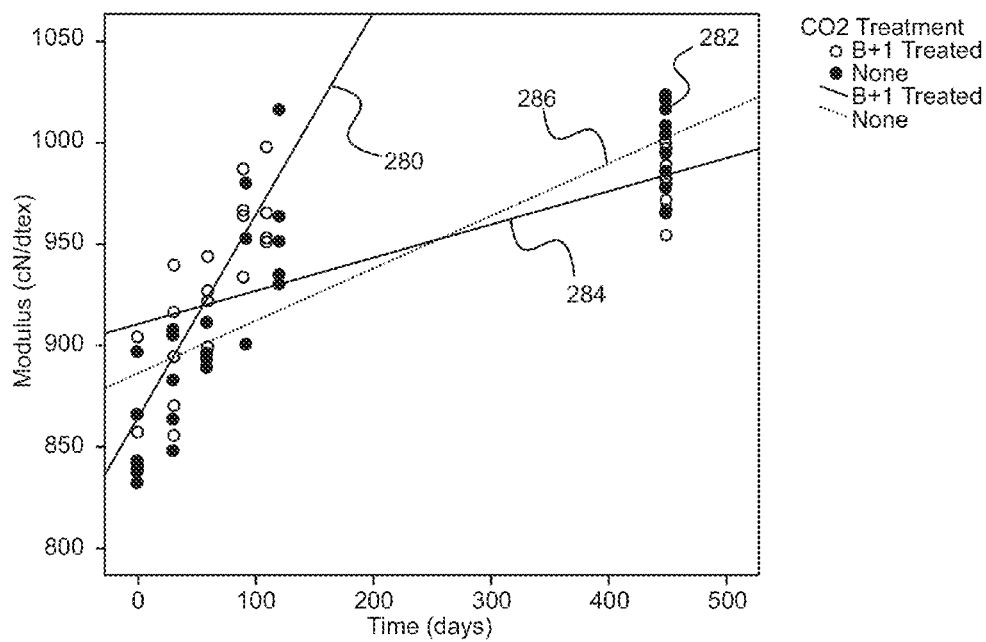
FIG. 59 is a plot of the modulus versus aging time of PBO fiber (AS0910) aged up to 448 days.
Figure 60:
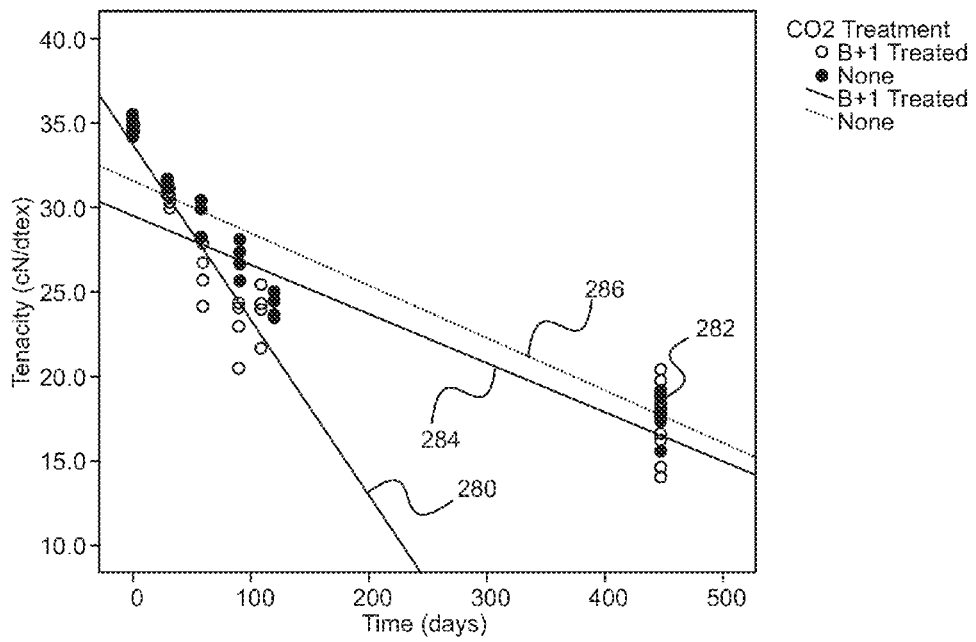
FIG. 60 is a plot of the tenacity versus aging time of PBO fiber (AS0910) aged up to 448 days.
Figure 61:
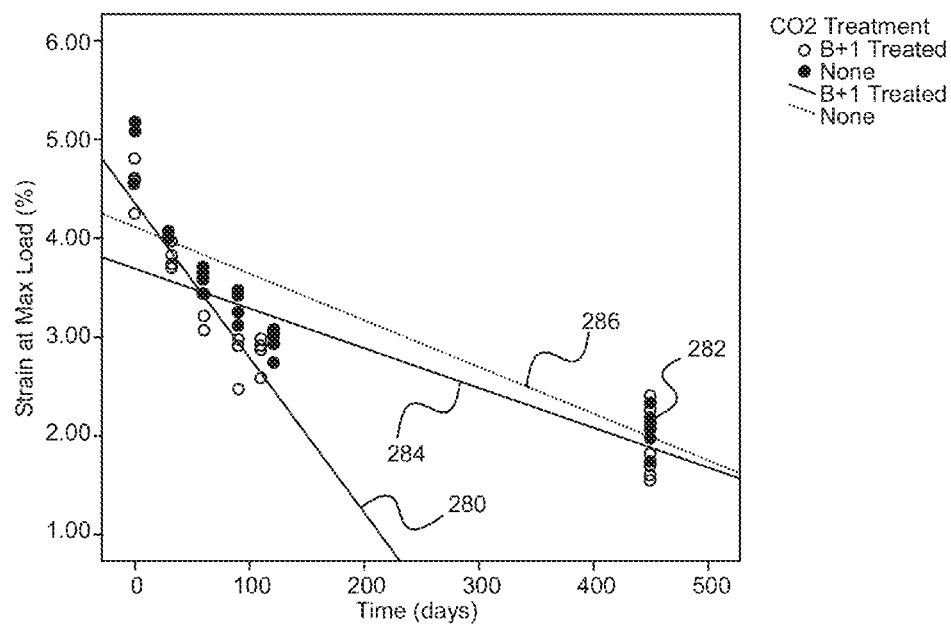
FIG. 61 is a plot of the strain at max load versus aging time of PBO fiber (AS0910) aged up to 448 days.
Figure 62:
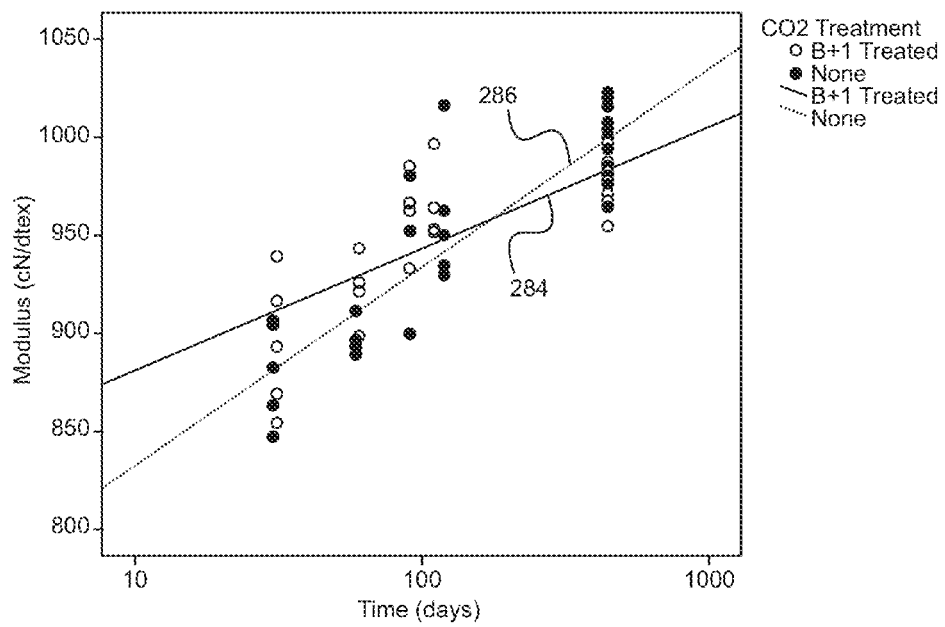
FIG. 62 is a plot of the modulus versus aging time on a log scale for PBO fibers (AS0910) aged up to 448 days.
Figure 63:
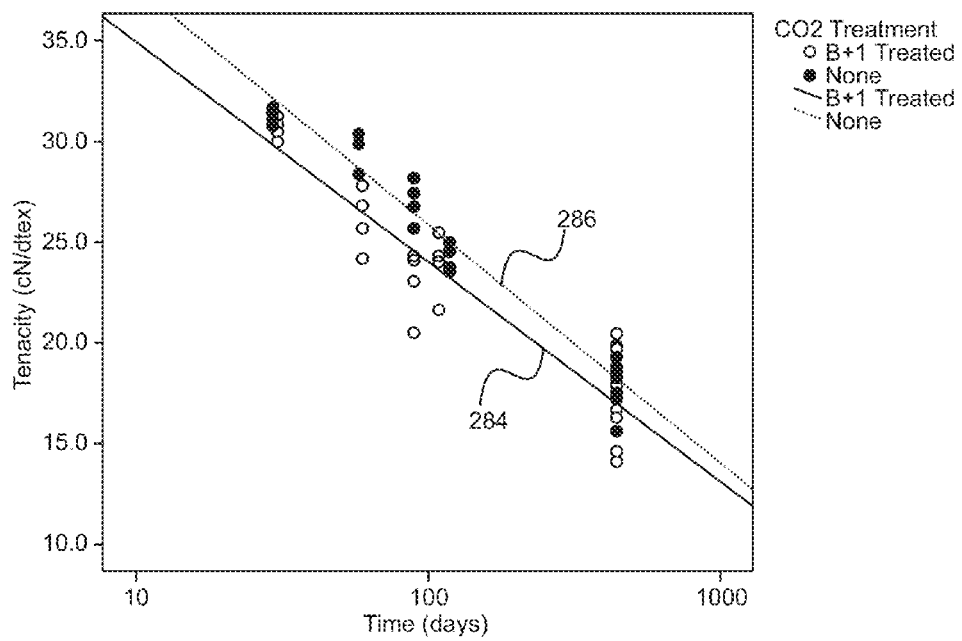
FIG. 63 is a plot of the tenacity versus aging time on a log scale for PBO fibers (AS0910) aged up to 448 days.
Figure 64:
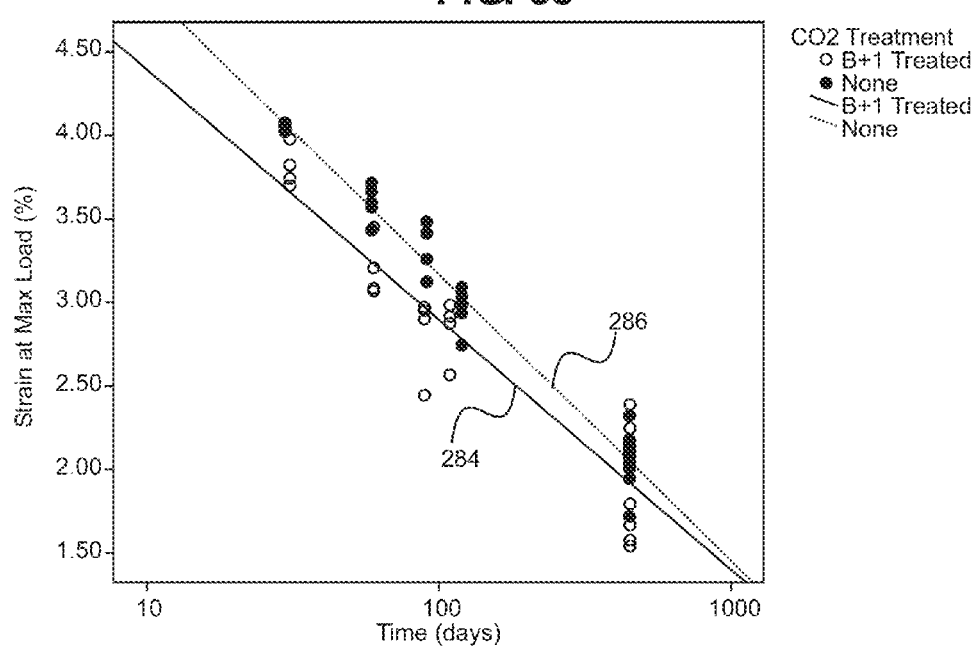
FIG. 64 is a plot of the strain versus aging time on a log scale for PBO fibers (AS0910) aged up to 448 days.

At the end of one study, a small number of treated and untreated samples were left in the chambers to continue aging at 70° C./90% RH for longer times. The intention was to see if the trends observed after 120 days of aging continued. This extended the aging time from 120 days to 448 days. In all cases, the rate of change slowed down with time of aging. The modulus, tenacity, and strain of the fibers are shown as a function of linear time in FIG. 59, FIG. 60, and FIG. 61. Line 280 in each figure is a trend line for the treated fiber data up to 120 days showing a linear extrapolation of the data to longer times. The actual data plotted at 448 days, as indicated at representative point 282, show that the rate of change slowed with time. Each of FIGS. 59-61 also includes line 284, which shows B+1 treated fibers, and line 286, which shows untreated fibers. The data is shown in a log time scale of modulus, tenacity and strain, as shown in FIGS. 62-64, respectively. Again, the B+1 treated fibers are indicated by line 284 and the untreated fibers are indicated by line 286 in each figure. The Day 0 data were omitted from plots and calculations using log time because log(0) is mathematically undefined. Using a log transform of the response variables (modulus, tenacity and strain) did not significantly improve the analysis, so the responses were analyzed without transformation.

The three plots on a log time scale in FIGS. 62-64 have regression lines plotted based on log time. The fibers' modulus increased with aging time in two studies. The modulus increase showed higher statistical significance in the first study. The slope of the treated fibers is significantly lower than the untreated fibers, indicating that the modulus of treated samples increased less than the modulus of untreated samples.

The fibers' tenacity decreases with aging time. In the case of the first study, the fibers showed there is no statistically significant difference between the fit lines on the log time plot. The treated fibers start at a slightly lower tenacity, and the slope is slightly less negative than the untreated fibers, but neither difference is statistically significant.

The fibers' strain also decreases with aging time. The strain of the treated fibers starts at a slightly lower value and the slope is less negative than the untreated samples. In contrast with the tenacity, however, the difference in the slope and the intercept are statistically significant at the 95% level for strain.

The modulus, tenacity, and strain at max load for PBO fiber samples were statistically analyzed. Three sets of fibers were compared: untreated fiber aged at 70° C./90% RH, $scCO_2$ B+1 treated fibers aged at 70° C./90% RH, and untreated phosphoric acid soaked fibers. The statistical data show that the modulus with respect to time for the B+1' treated versus untreated PBO fiber samples (AS0911) are not statistically different from each other when all baseline data is included. The modulus for the phosphoric acid treated fibers decreases statistically significantly faster than the B+1' treated or untreated fibers. The tenacity of the PBO fiber decreased for all samples with respect to time, and the difference in the slope was statistically significant between the three sets of fibers. The phosphoric acid soaked fibers deceased at the highest rate, the untreated fibers decreased at a slower rate, and the B+1' treated fibers decreased the slowest. This data indicated that the $scCO_2$ B+1' treatment had a significant effect of decreasing the rate at which fiber tenacity decreases. The strain at max load data show the same trends (all decreasing with time) and same order as the tenacity data. Similarly, the $scCO_2$ B+1' treatment had a significant effect of decreasing the rate at which fiber stain at max load decreases. Two out of the three characteristics of the fiber statistically analyzed show that the $scCO_2$ B+1' treatment makes a significant difference in extending the useful life of the fiber when compared to untreated fiber.

The PBO fibers tensile properties from one experiment were revisited due to adding a data point after 448 days of 70° C./90% RH aging during a subsequent experiment. The statistical analysis, including this new data point, showed that the fibers' rate of change for all three properties (modulus, tenacity, strain) decreased with time. The differences in the rates of change for the untreated versus $scCO_2$ B+1 treated modulus and tenacity were shown not to be statistically significant, but the difference in the rate of change of the strain at max load between the two sets of fibers was shown to be statistically significant. The treated fiber had a slower decrease than the untreated fiber in the strain at max load, again reinforcing the efficacy of the $scCO_2$ B+1 treatment. The B+1 treatment was optimized in the subsequent experiment to ensure the maximum amount of B was diffusing into the fibers during treatment. This could explain why there was a statistically significant difference between treated/untreated rate of decrease of tenacity for fibers of the first experiment versus the fibers of the second experiment. Overall, this statistical data shows that the $scCO_2$ B+1' treatment increases the useful life of the PBO fiber.

Accelerated aging was performed on treated specimens using supercritical CO2 (scCO2) as the carrier. In general, treatment with 3-glycidoxypropyldimethoxymethylsilane resulted in properties that were lower initially, before aging, but the properties improved during aging or were neutral compared to the baseline. At 60 days, the properties had generally reached parity with the baseline and were predicted to continue improving. This was the only treatment that consistently showed a statistically significant improvement with aging time. The other treatments had a neutral or negative effect.

The most promising secondary treatment process was the infusion of active chemicals using scCO2 and various chemical additives to interact with or remove the residual acid in the fibers. Two commercial fiber roving samples from Toyobo were obtained. One sample was designated as-spun (AS) and the other, high modulus (HM). The difference between these two samples is the HM product is actually the AS product after heat treatment, which results in a higher modulus fiber. Due to limited material availability of HM fibers at the time of testing, this infusion was carried out on AS fibers. Additives considered to interact with or remove residual acid or protect the AS fibers are listed in Table 7:

| Additive code | Additive | BP (° C.) | FP (° C.) | Stage 1 soak temp (° C.) | Stage 1 soak press (psig) | Stage 1 soak time (hr) | Stage 2 soak temp (° C.) | Stage 2 soak press (psig) | Stage 2 soak time (hr) |
|---|---|---|---|---|---|---|---|---|---|
| A | (3-(methylamino)propyl)trimethoxysilane, 97% | 106 | 82 | 50 | 2500 | 24 | NA | NA | NA |
| B | 3-glycidoxypropyldimethoxymethylsilane, 97% | 100 | 105 | 50 | 2500 | 24 | NA | NA | NA |
| C | glycidyl 2,2,3,3-tetrafluoropropyl ether, 97% | 50 | 79 | 40 | 2500 | 24 | NA | NA | NA |
| A + 1 | (3-(methylamino)propyl)trimethoxysilane, 97% | 106 | 82 | 50 | 2500 | 24 | 110 | 2500 | 1 |
| B + 1 | 3-glycidoxypropyldimethoxymethylsilane, 97% | 100 | 105 | 50 | 2500 | 24 | 110 | 2500 | 1 |
| D | scCO$_2$ only | NA | NA | 50 | 2500 | 24 | NA | NA | NA |
| E | scCO$_2$ with H$_2$O quench | NA | NA | 50 | 2500 | 24 | NA | NA | NA |

Approximately 300 in. of AS roving was placed into a small aluminum pan and 10% by weight additive added to the pan. Three pans were processed per run. As can be seen from Table 7, there were a total of seven runs. Five of which had additives (A, B, C, A+1, B+1); the remaining two were processed with scCO2 only (D, E). The difference between D and E was that E had a water quench. The water quench was accomplished by submerging the aluminum pan containing the scCO2 processed AS roving into a 500 ml. beaker of distilled ice water for 30 seconds immediately after processing. The water saturated pan was patted dry and then placed into a sealed desiccated jar for further drying.

The specimens were loaded into the pressure vessel (i.e., autoclave) and sealed. A syringe pump was used to charge the autoclave with CO2 from a tank until the desired autoclave pressure was achieved. The autoclave was heated and pressurized as shown in Table 7.

After venting and removal from the autoclave, specimens were store in desiccated jars and allowed to dry for several days. Moisture level was not monitored at the time of drying. Dry samples were then reeled onto small spools and stored in a constant temperature-RH room before exposure and tensile testing.

AS PBO fiber from Toyobo was subjected to accelerated aging and then tensile tested to determine modulus and strength as a function of aging time. Samples were aged in temperature and humidity-controlled ovens at 90% RH and 70° C. Four response variables derived from the tensile tests were analyzed for statistical significance: Modulus, Tenacity at maximum load, Tensile Stress at maximum load (derived from Tenacity), and Tensile Strain at maximum load. In addition to accelerated aging experiments, tests were done using supercritical CO2 to apply various treatments in an attempt to reduce or prevent degradation when exposed to moisture.

Tensile testing was performed using an Instron 5564 tabletop tensile tester with a 1 kN load cell. Tests were conducted on twisted roving specimens using a crosshead velocity of 10 mm/min and a gauge length of 122 mm total length or 25.4 mm grip distance. AS roving size was listed as 1670 dtex for AS per Toyobo packing list. A brief twist factor (TF) study was completed on the AS roving to determine the best twist factor for the flat untwisted roving. The highest tenacity or strength was observed at a TF of 5.1 or 1 twist per inch of roving. All as-received and conditioned rovings were placed in a constant temperature-RH room for storage or overnight to acclimate before tensile testing. Young's Modulus (2% off-set), Tenacity, Stress, and Strain from a minimum of five tests per run were reported for data analysis.

All response variables for the AS roving at 70° C. had a statistically significant correlation to Days and log (Days). Modulus had the weakest correlation. Strain had the strongest correlation, with the highest correlation coefficient. Strain also had significant correlation to Modulus, Tenacity, and Stress. An ANOVA procedure confirmed that there were statistically significant differences among the data from different Days, although not every single day was different from every other when compared pair-wise.

Figure 65:
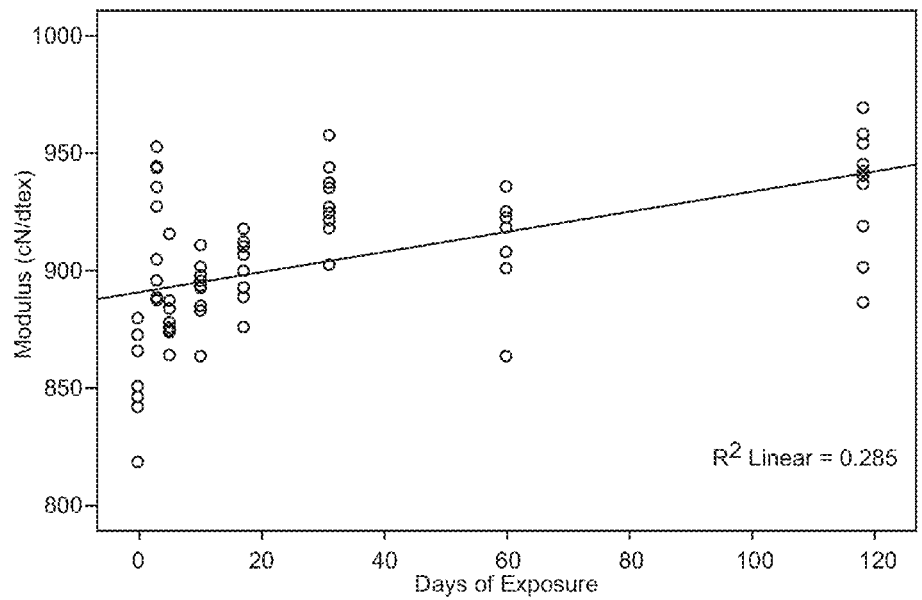
FIG. 65 is a plot of the modulus for AS roving aged at 70° C., with linear regression.

The Modulus went up with aging time. However, as shown in FIG. 65, the Modulus at 60 days was only slightly lower than 31 days. FIG. 65 is a plot of the modulus for AS roving aged at 70° C., with linear regression. The Modulus for these samples continued the upward trend in the additional data collected at 118 days. The data set at 3 days also was well above the trend line for the remaining data. Clearly, the Modulus data were much noisier than the other response variables.

Figure 66:
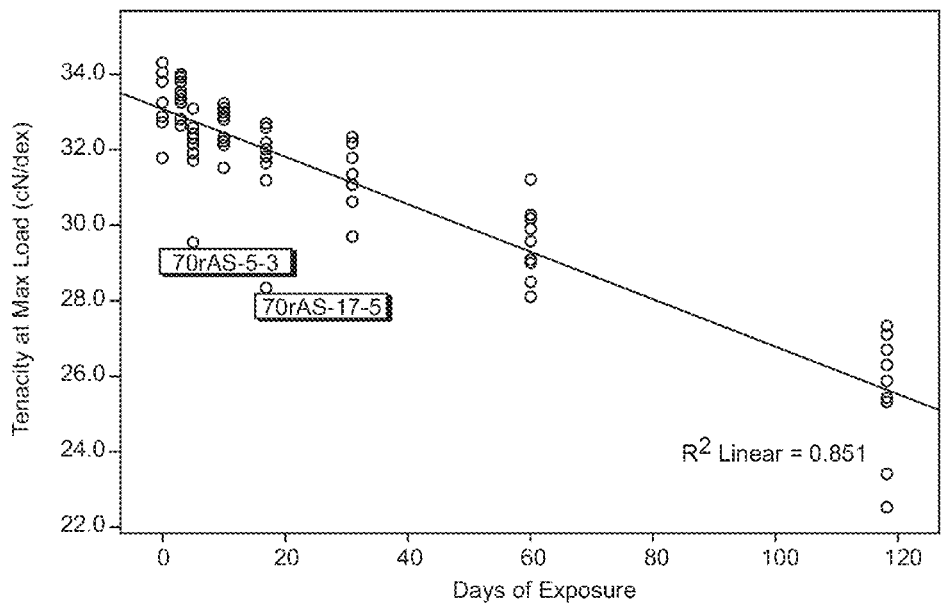
FIG. 66 is a plot of tenacity for AS roving aged at 70° C., with linear regression.

The remaining response variables all decrease with time and have high correlation. As an example, Tenacity is shown in FIG. 66 with the linear regression fit line. Tenacity and Strain have the highest R2. All models are statistically significant with P<<0.001. Linear time fits much better than log time. There is no clear explanation for why this is the case.

The reduction in properties over time due to exposure to heat and humidity is a serious problem for PBO fiber. Treatments using scCO$_2$ were explored to attempt to reduce this effect. Samples were treated with one of seven different treatment conditions and compared to baseline samples that were not treated with scCO$_2$. Specimens were aged at 70° C. and 90% RH.

In general, treatment "scCO$_2$ additive B+1" [3-glycidoxypropyldimethoxymethylsilane]resulted in properties that were lower initially, before aging, but the properties improved during aging or were neutral compared to the baseline. At 60 days, the properties had generally reached parity with the baseline and were predicted to continue improving. This was the only treatment that consistently showed a statistically significant improvement with aging time. The other treatments had a neutral or negative effect.

Figure 67:
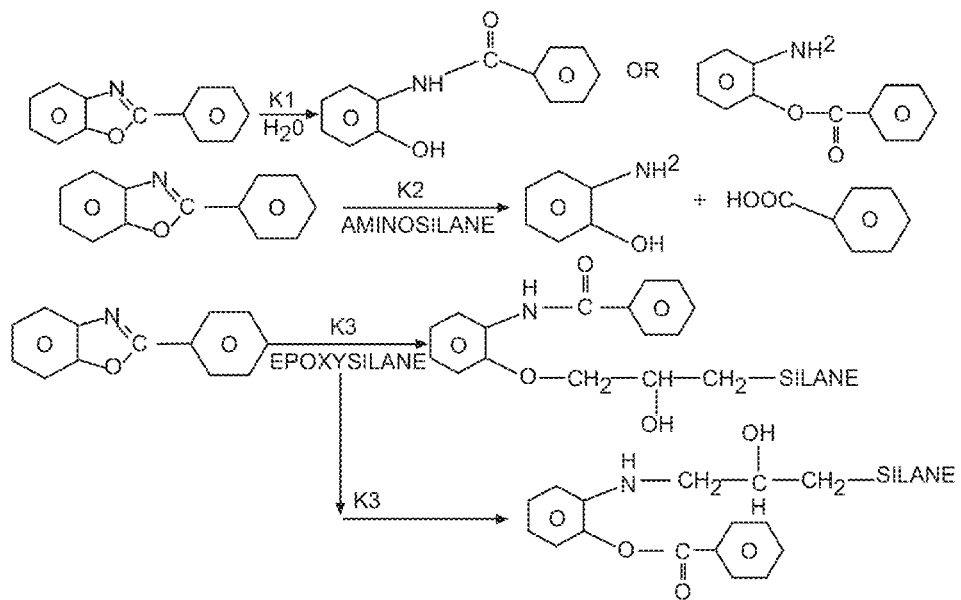
FIG. 67 illustrates a proposed PBO fiber degradation mechanism.
Figure 68:
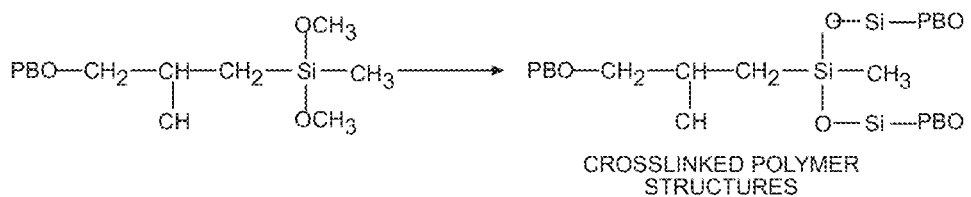
FIG. 68 illustrates a crosslinking reaction among PBO chains that increases the modulus.
Figure 69:
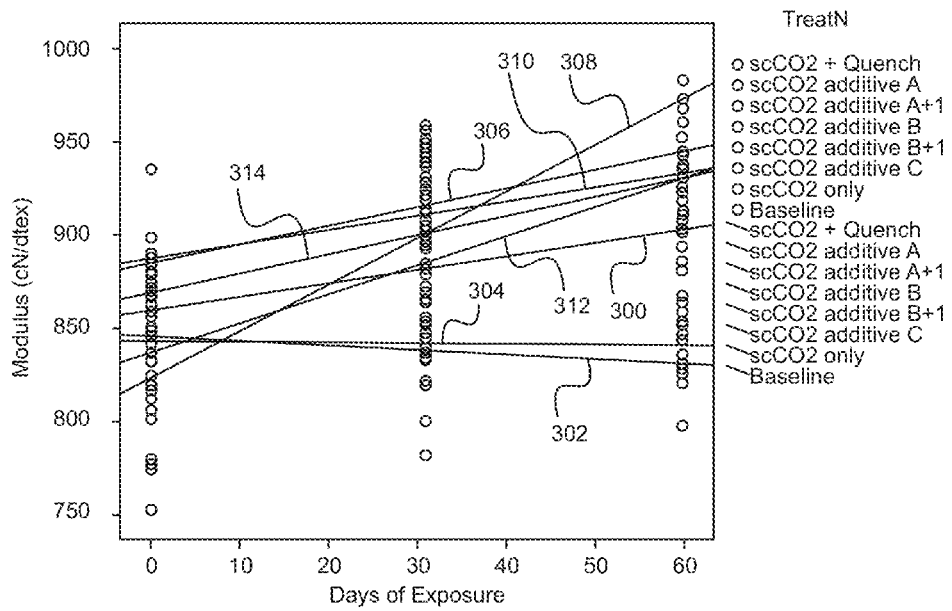
FIG. 69 is a plot of the modulus of rovings aged at 70° C. and 90% RH.
Figure 70:
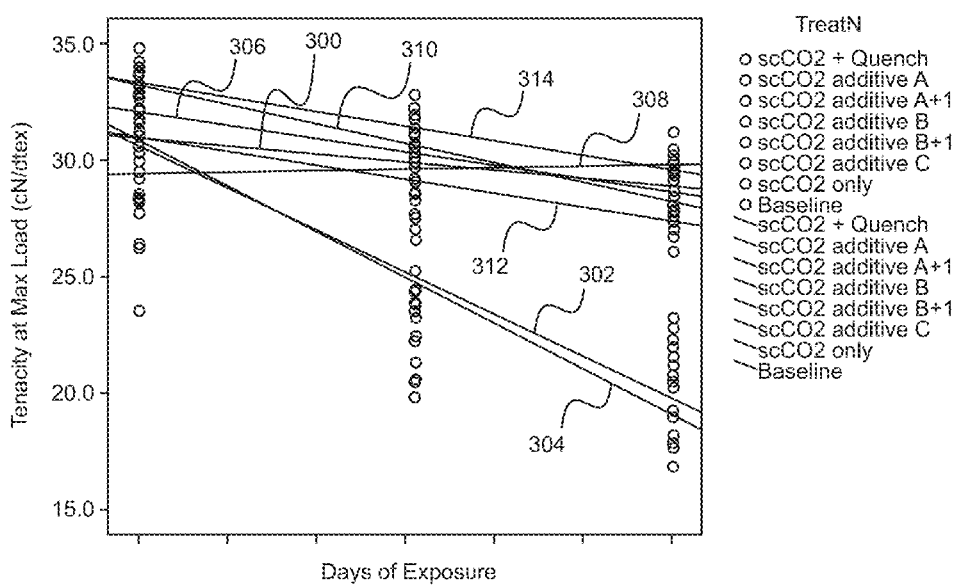
FIG. 70 is a plot of the tenacity of rovings aged at 70° C. and 90% RH.
Figure 71:
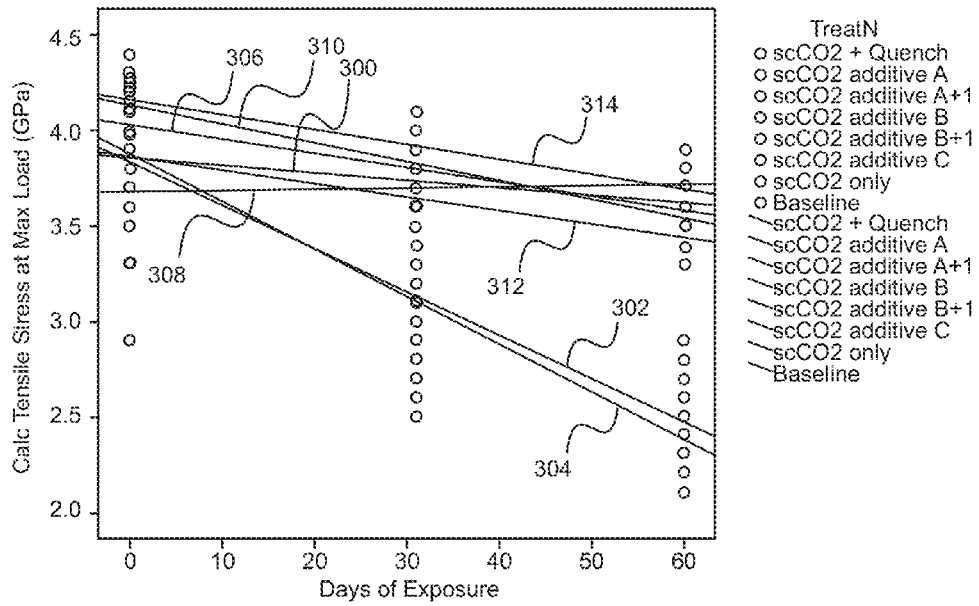
FIG. 71 is a plot of the stress of rovings aged at 70° C. and 90% RH.
Figure 72:
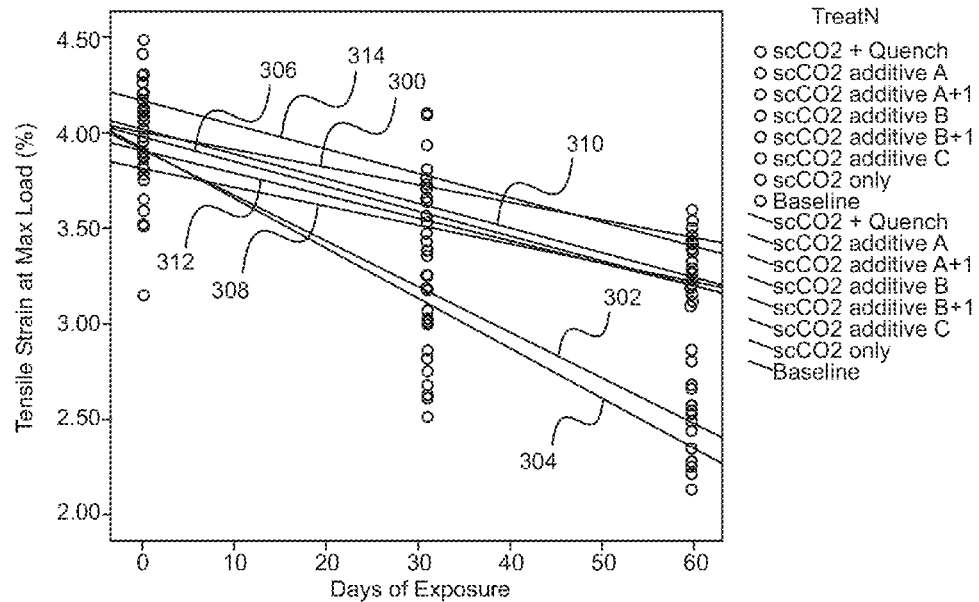
FIG. 72 is a plot of the strain of rovings aged at 70° C. and 90% RH.

The mechanism to explain why the PBO fiber degrades faster in the presence of an amine silane and not with the epoxy silane is shown in FIG. 67. Water alone causes some degradation of the PBO fiber in a certain time frame ($K_1$). The amino silane compound catalyzes the degradation rate ($K_2$) faster than water alone ($K_1$). It is possible that in the presence of an epoxy silane and moisture the PBO begins to hydrolyze but the reactive epoxy ring of the silane reacts with the phenolic or amine group of the degraded polymer which caps the degraded intermediates. The silane portion of the molecule can then hydrolyze and form a crosslink site with other degraded PBO chains resulting in a crosslink site that increases the modulus of the total system as hypothesized in FIG. 68.

One group of samples was aged at 70° C. and 90% RH. All treatments resulted in properties that were the same or lower on average than the baseline samples at Day 0, before aging took place. Among the Day 0 data, only treatment "$scCO_2$ additive B+1" produced properties that were lower by statistically significant amounts.

The principal tool for analyzing the data was linear regression, to evaluate the effects of both treatment and time as well as the interaction between treatment and aging time. The results are shown graphically in FIGS. 69-71. Statistically significant effects are called out in Tables 8 and 9. In particular, FIGS. 69, 70, 71 and 72 illustrate the modulus, tenacity, stress and strain, respectively, of rovings aged at 70° C. and 90% RH. Each figure includes a line 300 indicating quenched fibers, line 302 for fibers with additive A, line 304 for fibers with additive A+1, line 306 for fibers with additive B, line 308 for fibers with additive B+1, line 310 for fibers with additive C, and line 312 for untreated fibers. A baseline is indicated at 314.

Table 8 summarizes the effect of each treatment by itself (main effects), taking all days together and neglecting the interaction with aging time. As noted above, all samples at Day 0 are statistically the same or lower than the baseline data. The regression analysis shows that this is also true for longer times. In cases where the average is slightly higher for treated samples, it is not statistically significant.

Table 9 summarizes the interaction between treatment and aging time. This can be visualized as the change in slope based on treatment. All interaction effects were calculated relative to the baseline. In all cases, additive A or additive A+1 has a strong negative interaction, causing the slope to get steeper and leading to a faster decline in properties. This is clearly illustrated in FIGS. 69-71, where the slopes for A and A+1 are shown 302 and 304. Treatment with B+1, as indicated at 308, produces a higher slope in all responses except Strain, where the treatment effect was not significant. In the case of Tenacity and Stress, the slope for the B+1 data is positive, indicating that these get better while all of the others get worse with aging time. For Modulus, the slopes for most conditions are already positive, but the B+1 slope is steeper for a faster increase.

TABLE 8

Summary of treatment main effects in regression analysis for aging at 70° C.

|  | Modulus | Tenacity | Stress | Strain |
|---|---|---|---|---|
| Higher than Baseline |  |  |  |  |
| Not Statistically Different | $scCO_2$ + quench | $scCO_2$ + add. B | $scCO_2$ + add. B | $scCO_2$ + quench |
|  | $scCO_2$ + add. B | $scCO_2$ + add. C | $scCO_2$ + add. C | $scCO_2$ + add. B |
|  | $scCO_2$ + add. C |  |  | $scCO_2$ + add. C |
| Lower than Baseline | scCO2 + add. A | scCO2 + quench | scCO2 + quench | scCO2 + add. A |
|  | scCO2 + A + 1 | scCO2 + add. A | scCO2 + add. A | scCO2 + A + 1 |
|  | scCO2 + B + 1 | scCO2 + A + 1 | scCO2 + A + 1 | scCO2 + B + 1 |
|  | scCO2 only | scCO2 + B + 1 | scCO2 + B + 1 | scCO2 only |
|  |  | scCO2 only | scCO2 only |  |

TABLE 9

Summary of slope changes due to treatment in Regression analysis for aging at 70° C.

|  | Modulus | Tenacity | Stress | Strain |
|---|---|---|---|---|
| Higher than Baseline | $scCO_2$ + B + 1 | $scCO_2$ + B + 1 | $scCO_2$ + B + 1 |  |
| Not Statistically Different | $scCO_2$ + quench | $scCO_2$ + quench | $scCO_2$ + quench | $scCO_2$ + quench |
|  | $scCO_2$ + add. B | $scCO_2$ + add. B | $scCO_2$ + add. B | $scCO_2$ + add. B |
|  | $scCO_2$ + add. C | $scCO_2$ + add. C | $scCO_2$ + add. C | $scCO_2$ + B + 1 |
|  | $scCO_2$ only | $scCO_2$ only | $scCO_2$ only | $scCO_2$ + add. C |
|  |  |  |  | $scCO_2$ only |
| Lower than Baseline | $scCO_2$ + add. A | $scCO_2$ + add. A | $scCO_2$ + add. A | $scCO_2$ + add. A |
|  | $scCO_2$ + A + 1 | $scCO_2$ + A + 1 | $scCO_2$ + A + 1 | $scCO_2$ + A + 1 |

Great strides in the understanding of PBO fiber degradation and how it relates to the long term mechanical properties were made through the studies resulting in the invention. Fundamental understanding of the $scCO_2$ treatment process was gained through computer modeling and experimental evidence. Ultimately, the B+1' treated PBO fiber has better long term mechanical properties when compared to untreated fiber.

Gravimetric measurements showed that the fibers can hold up to 5 wt. % of $CO_2$ at 50° C. and 2500 psig, and that the $CO_2$ can take several hundred hours to diffuse out at ambient conditions. The modeling implemented proved to be valid when compared with measurements made hundreds of hours after the initial $CO_2$ depressurization of the fibers. The study has shown that a very good understanding of the interaction of $scCO_2$ with PBO fibers now exists.

Molecular modeling tools were used to look at the relative behavior of an epoxy silane or dye molecule introduced into PBO. The results suggest that the epoxy silane is less energetically favored in PBO, and that the epoxy silane also introduces larger distortions in the PBO structure. These results indicate that there will likely be less epoxy silane in the PBO than dye, under similar loading conditions. The incorporation of even 2 wt % $CO_2$ can lead to substantial disruption of the order in the PBO fiber. Given the sensitivity of the PBO mechanical properties to disorder in the structure, the addition of the epoxy silane could lead to larger degradation in performance than measured for the dye-infused sample.

A gravimetric approach was used for measuring the desorption of $CO_2$ out of PBO fibers. Diffusion modeling was then fit to the experimental data, and proved to be valid at extrapolated times. From the desorption curves, an absorption curve was also modeled. PBO fibers soaked for greater than 100 hours at 2500 psig and 50° C. in $scCO_2$ were filled with greater than 5 wt. % $CO_2$. Additive B was shown to diffuse into PBO fibers at longer times and higher temperatures. The B+1' treatment was shown to allow between 2-5 wt. % additive B into the PBO fiber after $CO_2$ had diffused out. Fluorescence microscopy showed that a fluorescent dye (Pyridine 1) diffused into the areas on the PBO fibers that have physical defects more than pristine areas on the fiber. It was confirmed by Raman Spectroscopy that the physical defects in the fibers were not chemically different from the remainder of the fiber. From this data it is thought that additive B that is absorbed by PBO fiber favorably partitions to the physical defects. The viscosity of additive B was shown to increase when in the presence of phosphoric acid due to a cross-linking reaction. A viscosity increase was also observed when additive B was put into contact with PBO fiber; it is hypothesized that the residual phosphoric acid in the fiber initiated the cross-linking reaction. The model compounds with amine functionality reacted with additive B. It was inferred from FTIR spectra that additive B substituted the amine protons or hydroxyl groups on the model compound to form a new larger molecule. This larger molecule seemingly gives rise to an increase in viscosity.

It was found by fluorescence spectroscopy and confirmed by infrared transmission spectroscopy that one of the degradation products of phosphoric acid treated PBO fiber was 2-phenyl benzoxazole (one of the model compounds). Fluorescence spectroscopy was able to identify a different degradation product for the T/RH aged PBO fiber, but in this case the fluorescence pattern did not match one of the model compounds, and infrared transmission spectroscopy could not isolate the exact molecule. Liquid chromatography followed by mass spectroscopy was used to help identify potential T/RH aged PBO fiber degradation products.

The T/RH aged PBO fiber mass spectra results can be expanded but the results for PBO model compounds suggest that this should be one of the best methods to determine what degradation products or mass spectra fragments are being produced from the effects of accelerated aging on both the untreated and treated fibers. If the mass spectra results for the aged treated fibers are correct, in that there appears to be less fragmentation or damage with these samples than the untreated fibers, then this could also correlate with the mechanical strength data that shows less degradation with the epoxy silane treatment than no treatment at all. This study has identified a possible new way to determine the end of life of a bullet proof jacket that has seen an extended exposure to T/RH. If our results are correct in that a simple methanol extraction of the fibers results in a compound that has a 400 nm fluorescence peak then we may be able to quantify the amount of this compound(s) present in the fibers and determine its exact structure from FTIR and mass spec analysis. At the very least we will be able to compare a field sample mass spec with the mass spectra peaks we observed by aging fibers at T/RH conditions. To the best of our knowledge, this would be the first relationship between artificial aging and actual field sample environments ever observed to date.

Information on the physical and morphological changes of the PBO fibers was gathered via SEM. It was seen from this visual evidence that the surface morphology of the treated samples was nearly identical to that of the untreated and non-aged samples even after 120 days of exposure to elevated temperature and relative humidity. More striking was the difference between treated and untreated samples. The untreated samples had observable, long defects parallel to the fiber axis after 120 days of exposure that were not present in the treated samples during the same duration of exposure. These observations were confirmed in the literature where Walsh and co-workers (P. J. Walsh, 2006) postulated that these surface defects were a result of voids increasing in size with water exposure and breaking through the fiber surface that caused a drop in mechanical properties. Therefore, the treatments applied to the PBO fibers prevent the formation of surface defects by either suppressing void growth or preventing water diffusion into the fiber.

Further, the ability of these exposed fibers to absorb impact energy make them suitable for use in lightweight soft armor systems. As indicated above, the typical energy absorbing mechanism for fibers is dependent on their ability to have high strength and high elongation to failure. It is well known that the strain is equal to the impact velocity divided by the sonic velocity of the fiber. It is also well known that the sonic velocity is related to the modulus of the fiber and the density of the fiber. Therefore, the densities of the untreated/non-aged PBO fiber and the exposed fibers (treated and untreated), once collected, are relied upon to assure that the sonic velocities of the fibers can be correlated to the morphological observations and ballistic performance, such as in a manner similar to that reported in the literature by Holmes and co-workers (G. A. Holmes J. S., 2010).

Based on the above, it should be readily apparent that the present invention led to a better understanding of the PBO fiber thermodynamics, mass transfer, physics, and chemistry. Major advancements are set forth in connection with the interactions of $scCO_2$ and additive B with PBO fiber through both computer modeling and experimental standpoints. The knowledge gleaned was used to tune the treatment process of the PBO fibers. Degradation products of both temperature/humidity and phosphoric acid aged fibers were identified using analytical techniques, which provide better understanding of the degradation mechanism. SEM micrographs of PBO fibers before and after aging offered visual evidence of the failure mode. Tensile testing of the PBO fibers indicated that the B+1' treatment makes a statistically significant difference in extending the useful life of the fiber.

In summary, the invention relates to poly(p-phenylene-2,6-benzobisoxazole) (PBO) fibers with improved mechanical properties when exposed to high temperature and high relative humidity. This additional work was done to further develop the secondary treatment process to improve the mechanical properties of PBO fibers when exposed to high temperature and high RH. The effects of different epoxy silanes, amines, and amino silanes on the degradation of PBO model compounds were examined to identify reactions taking place that led to the degradation of the PBO fiber and what reaction pathways stabilize the fiber and prevent it from degrading further from physical and/or chemical failure mechanisms. Various $scCO_2$ processing conditions were also studied to determine which had a great effect on the PBO fiber. The results showed that chemical modifications to PBO fibers using a unique combination of active infusing chemicals and a supercritical infusion process can improve the long-term mechanical properties of PBO, which can be particularly beneficial in connection with producing a body member adapted to be worn by a person, such as a helmet or a vest, as part of a lightweight armor system. A method was developed to infuse the PBO fiber with up to 5 wt. % of CO2. Further, a fluorescence microscopy technique was developed to show physically defected areas. This technique shows that additive B is most likely absorbed by PBO fiber in the area of physical defects. A method was developed to absorb up to 5 wt. % additive B (3 glycidoxypropyl methyldimethoxysilane) and remained sorbed in or on the fiber after the CO2 had diffused out. In addition, a method was developed to react additive B with the residual phosphoric acid in the fiber to slow the degradation of PBO. Spectroscopic techniques were used to analyze the degradation of fibers to isolate the fiber degradation mechanism. This could be a possible new way to determine the end of life of a bullet proof jacket that has seen an extended exposure to T/RH. The treatments applied to the PBO fibers prevent the formation of surface defects by either suppressing void growth or preventing water diffusion into the fiber. Tensile testing of aged fibers indicated that the B+1' treatment makes a statistically significant difference in extending the useful life of the fiber when compared to untreated fiber.

Although described with respect to preferred embodiments of the invention, it should be understood that various changes and/or modifications could be made to the invention without departing from the spirit thereof. Therefore, the specific embodiments disclosed herein are to be considered illustrative and not restrictive. Instead, the invention is only intended to be limited by the scope of the following claims.

We claim:

1. A method of treating fibers to alter a resistance to high temperatures and relative humidity, the method comprising:
    exposing poly(p-phenylene-2,6-benzobisoxazole) (PBO) fibers to a supercritical atmosphere of $CO_2$ saturated with an epoxy silane;
    subjecting the PBO fibers to a first pressurizing and heating stage at a first temperature for a first period of time;
    subjecting the PBO fibers to a second pressurizing and heating stage including increasing the temperature to a second temperature and holding at the second temperature for an additional period of time; and
    depressurizing the PBO fibers.

2. The method of claim 1, wherein the epoxy silane is 3-glycidoxypropyl methyldimethoxysilane.

3. The method of claim 2, wherein 3-glycidoxypropyl methyldimethoxysilane is added in an amount of approximately 10 wt %.

4. The method of claim 1, wherein the second temperature is more than double the first temperature.

5. The method of claim 4, wherein the first temperature is 50° C.

6. The method of claim 5, wherein the second temperature is 110° C.

7. The method of claim 1, wherein the first period of time is 24 hours.

8. The method of claim 7, wherein the second period of time is 1 hour.

9. The method of claim 8, wherein the first pressurizing and heating step includes a pressure of 2,500 psi.

10. The method of claim 9, wherein the second pressurizing and heating step includes a pressure of 2,500 psi.

11. The method of claim 10, wherein the supercritical $CO_2$ and epoxy silane create a reaction with residual phosphoric acid in the PBO fibers.

12. The method of claim 11, further comprising diffusing the $CO_2$ out of the PBO fibers.

13. The method of claim 12, wherein the PBO fibers include 2-5 wt % of 3-glycidoxypropyl methyldimethoxysilane after diffusing the $CO_2$ out of the PBO fibers.

* * * * *